United States Patent
Miyadera et al.

(10) Patent No.: US 8,488,201 B2
(45) Date of Patent: Jul. 16, 2013

(54) IMAGE FORMING APPARATUS, CORRECTION CONTROL METHOD AND COMPUTER READABLE INFORMATION RECORDING MEDIUM

(75) Inventors: Tatsuya Miyadera, Osaka (JP); Yoshinori Shirasaki, Osaka (JP); Tomohiro Ohshima, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 425 days.

(21) Appl. No.: 12/846,896

(22) Filed: Jul. 30, 2010

(65) Prior Publication Data

US 2011/0026082 A1    Feb. 3, 2011

(30) Foreign Application Priority Data

Jul. 31, 2009  (JP) .................................. 2009-179794
Jul. 26, 2010  (JP) .................................. 2010-166883

(51) Int. Cl.
  *H04N 1/40*   (2006.01)
  *G03G 15/50*  (2006.01)
(52) U.S. Cl.
  USPC ......................................... 358/3.24; 399/43
(58) Field of Classification Search
  USPC ................................................. 358/518, 530
  See application file for complete search history.

(56) References Cited

U.S. PATENT DOCUMENTS

| 8,081,326 B2* | 12/2011 | Okunishi et al. ............. 358/1.13 |
| 2009/0035029 A1 | 2/2009 | Kobayashi |
| 2009/0041484 A1* | 2/2009 | Kitagawa et al. ............... 399/43 |
| 2009/0190940 A1 | 7/2009 | Miyadera |
| 2009/0220878 A1 | 9/2009 | Miyadera et al. |
| 2011/0164895 A1* | 7/2011 | Ishikake et al. .................. 399/88 |

FOREIGN PATENT DOCUMENTS

| JP | 3667971 | 7/2005 |
| JP | 2008-151855 | 7/2008 |
| JP | 2008-197542 | 8/2008 |
| JP | 2009-053668 | 3/2009 |

* cited by examiner

*Primary Examiner* — Barbara Reinier
(74) *Attorney, Agent, or Firm* — IPUSA, P.L.L.C.

(57) ABSTRACT

An image forming apparatus for which a first mode using toners of plural colors including a black toner and a second mode using only the black toner can be set, includes a first printing cumulatively counting part that cumulatively counts a first number of pages for which image forming has been executed by using the toners of plural colors; a first printing determining part that determines whether the first number of pages counted by the first printing cumulatively counting part has exceeded a threshold; and a correction control part that controls not to execute a correcting process for image forming that uses the toners of plural colors but to execute a correcting process for image forming that uses only the black toner, when the second mode has been set in a case where the first printing determining part has determined that the first number of pages has exceeded the threshold.

9 Claims, 33 Drawing Sheets

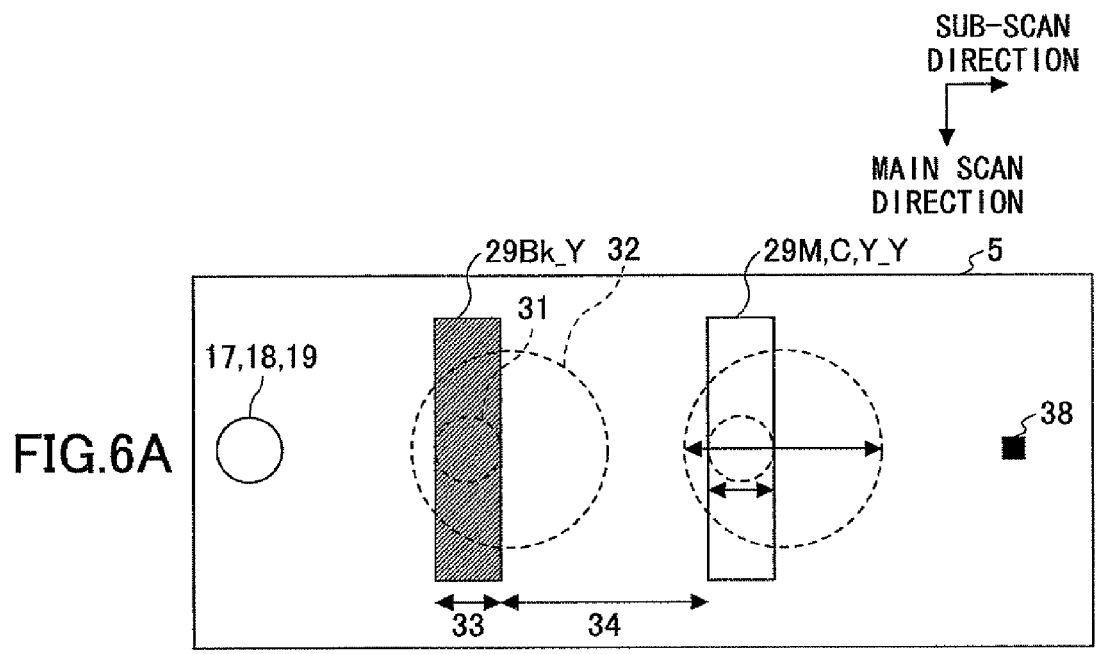
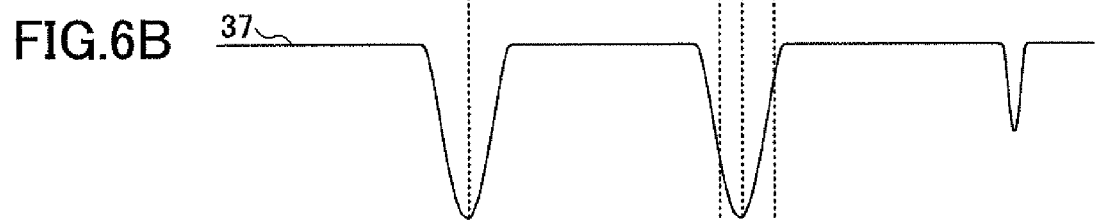
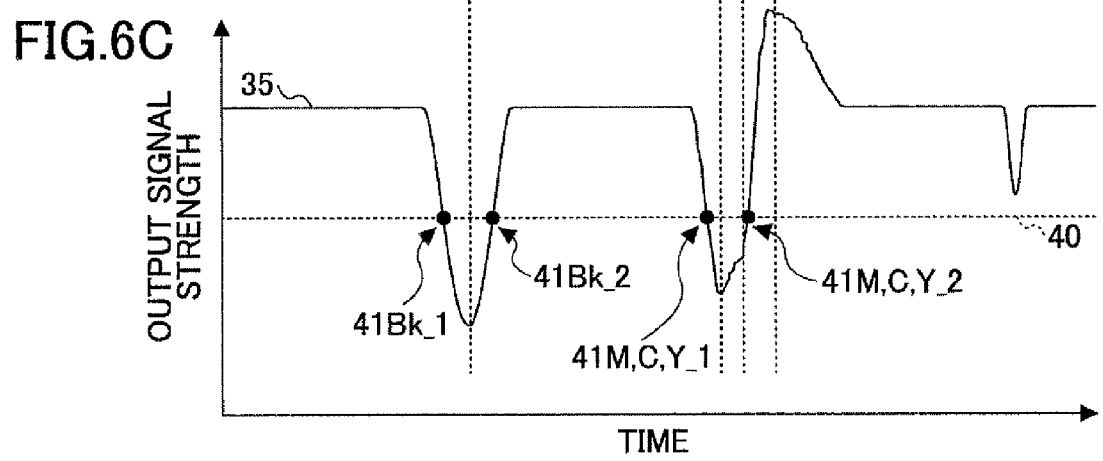

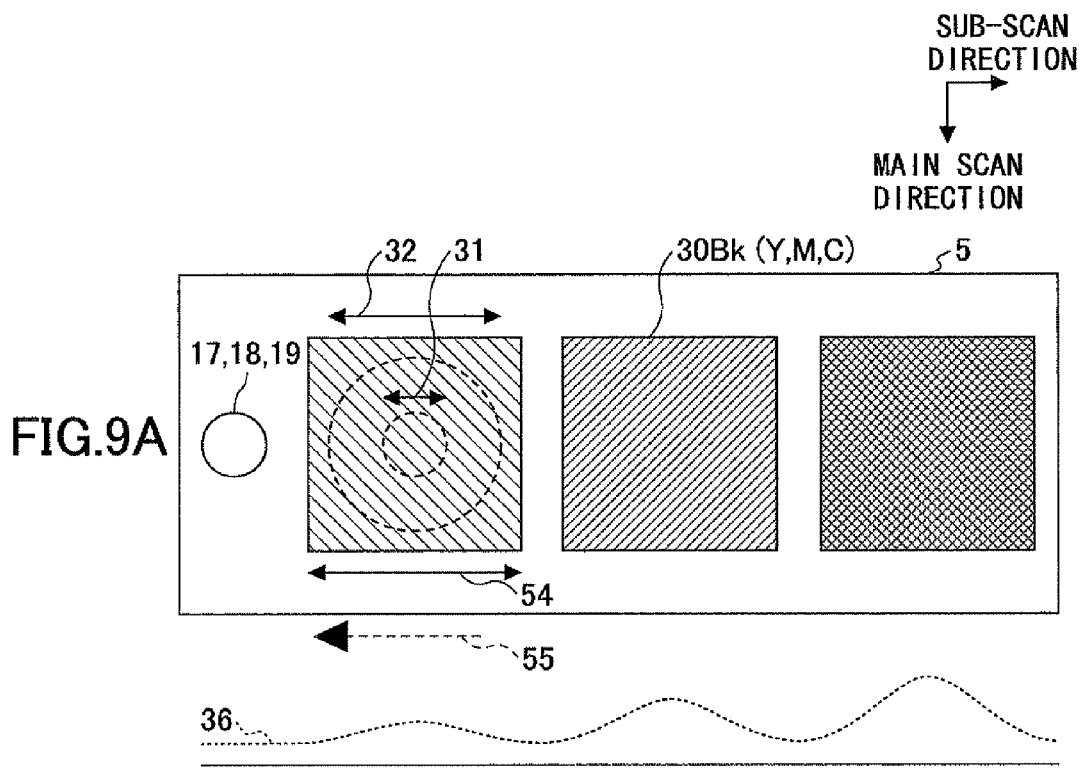
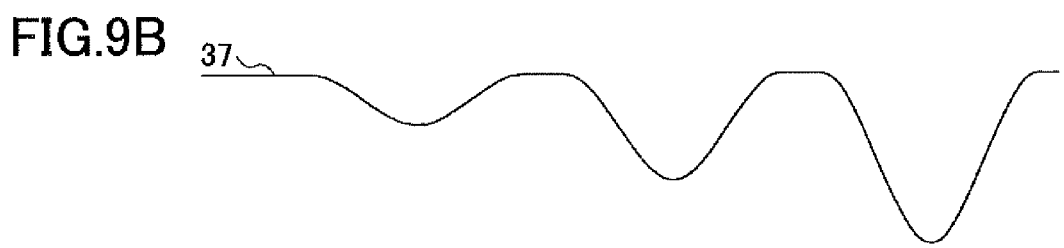
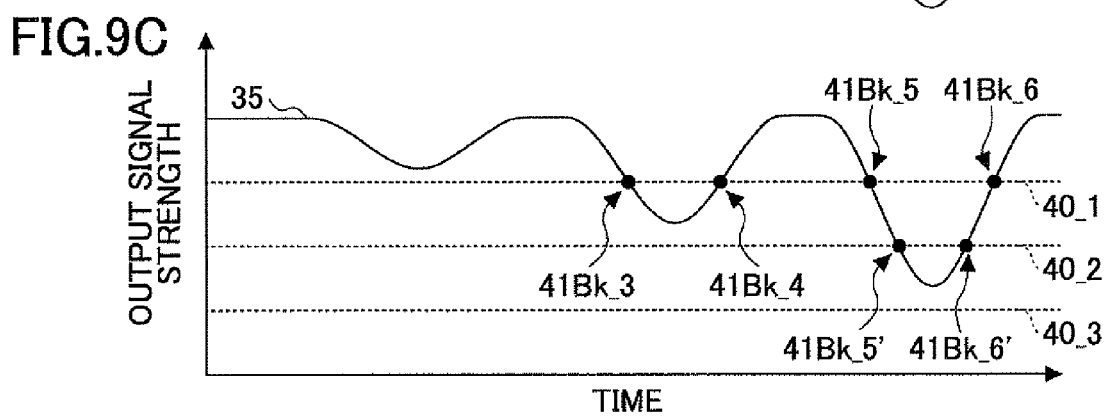

FIG.10

| TYPE | VARIABLE FACTOR | | NECESSARY CONTROL OPERATION | NOTE |
|---|---|---|---|---|
| USER'S OPERATION | TOP COVER OPENED/CLOSED | | COLOR MATCHING CONTROL | DETERMINE WHEN DETECTING COVER CLOSED |
| | INSTALLATION/ REMOVAL /REPLACEMENT OF IMAGE FORMING UNIT | INSTALLATION /REMOVAL | TONER ADHESION AMOUNT CONTROL AND COLOR MATCHING CONTROL | DETERMINE WHEN POWER TURNED ON, RECOVERING FROM SLEEP, OR DETECTION OF COVER CLOSED |
| | | REPLACEMENT OF PHOTOSENSITIVE UNIT | TONER ADHESION AMOUNT CONTROL AND COLOR MATCHING CONTROL | |
| | | REPLACEMENT OF INTERMEDIATE TRANSFER UNIT | TONER ADHESION AMOUNT CONTROL AND COLOR MATCHING CONTROL | |
| | CHANGE IN INSTALLED CONDITION | | COLOR MATCHING CONTROL | EXECUTE WHEN POWER TURNED ON |
| IMAGE FORMING MEMBER AGING CONDITION | CHANGE IN CHARAC- TERISTICS CAUSED BY IMAGE FORMING UNIT AGING | PHOTOSENSITIVE UNIT AGING | TONER ADHESION AMOUNT CONTROL | DETERMINE ACCORDING TO CUMULATIVE NUMBER OF PRINTED PAGES |
| | | INTERMEDIATE TRANSFER UNIT AGING | TONER ADHESION AMOUNT CONTROL AND COLOR MATCHING CONTROL | |
| CHANGE IN AMBIENT ENVIRON -MENT | CHANGE IN CHARAC- TERISTICS CAUSED BY ENVIRONMENT VARIATION | CHANGE IN ABSOLUTE HUMIDITY | TONER ADHESION AMOUNT CONTROL | DETERMINE ACCORDING TO OUTPUT OF ENVIRONMENT SENSOR ON STANDBY OR DURING PRINTING |
| | | CHANGE IN TEMPERATURE | TONER ADHESION AMOUNT CONTROL AND COLOR MATCHING CONTROL | |
| CHANGE OF CONDITIONS IN THE INSIDE OF MACHINE | TEMPERATURE CHANGE IN IMAGE FORMING SECTION | | TONER ADHESION AMOUNT CONTROL | DETERMINE ACCORDING TO CUMULATIVE NUMBER OF PRINTED PAGES |
| | LSU TEMPERATURE CHANGE | LSU TEMPERATURE INCREASE CAUSED BY CONTINUOUS PRINTING | COLOR MATCHING CONTROL | DETERMINE ACCORDING TO TIME OF DRIVING OF POLYGON MOTOR DURING PRESCRIBED MONITORING TIME |
| | | LSU TEMPERATURE INCREASE CAUSED BY SUCCESSIVE EXECUTIONS OF SINGLE JOBS | COLOR MATCHING CONTROL | DETERMINE ACCORDING TO TIME OF DRIVING OF POLYGON MOTOR DURING PRESCRIBED MONITORING TIME |
| | | LSU TEMPERATURE INCREASE CAUSED BY CUMULATIVE EXECUTIONS OF LOW FREQUENCY JOBS | COLOR MATCHING CONTROL | DETERMINE ACCORDING TO CUMULATIVE ELAPSED TIME AFTER COLD START |
| | | LSU TEMPERATURE DECREASE CAUSED BY BEING LEFT FROM HIGH TEMPERATURE STATE | COLOR MATCHING CONTROL | DETERMINE ACCORDING TO ELAPSED TIME AFTER EXECUTION OF COLOR MATCHING CONTROL, OR EXECUTE WHEN POWER TURNED ON OR RETURNING FROM SLEEP |

FIG.11

| MODE | EVENT | CONTROL OPERATION | PURPOSE |
|---|---|---|---|
| NON-EXECUTION MODE | DETECTION OF INTERMEDIATE TRANSFER BELT LIFE END | EXECUTION OF NONE OF TONER ADHESION AMOUNT CONTROL, COLOR MATCHING CONTROL, MONOCHROME TONER ADHESION AMOUNT CONTROL, MONOCHROME POSITION ADJUSTMENT CONTROL | TO PREVENT BODY INSIDE FROM DAMAGED SUCH AS BELT BREAKAGE |
| | DETECTION OF FULL OF INTERMEDIATE TRANSFER UNIT WASTE TONER BOX | | TO PREVENT BODY INSIDE FROM DIRTIED CAUSED BY WASTE TONER OVERFLOW |
| | DETECTION OF FULL OF K-COLOR PHOTOSENSITIVE UNIT WASTE TONER BOTTLE | | TO PREVENT BODY INSIDE FROM DIRTIED CAUSED BY WASTE TONER OVERFLOW |
| | DETECTION OF TONER END OF K-COLOR PHOTOSENSITIVE UNIT | | |
| COLOR INHIBITION MODE | DETECTION OF FULL OF PHOTOSENSITIVE UNIT WASTE TONER BOTTLE OF ANY OF CMY COLORS | EXECUTION OF ONLY MONOCHROME TONER ADHESION AMOUNT CONTROL AND MONOCHROME POSITION ADJUSTMENT CONTROL | TO PREVENT BODY INSIDE FROM DIRTIED CAUSED BY WASTE TONER OVERFLOW |
| | DETECTION OF TONER END OF PHOTOSENSITIVE UNIT OF ANY OF CMY COLORS | | |
| BLACK MODE | COLOR/BLACK MODE SETTING IS 1 AND OTHER THAN THE ABOVE-MENTIONED CONDITIONS | EXECUTION OF TONER ADHESION AMOUNT CONTROL AND COLOR MATCHING CONTROL, MONOCHROME TONER ADHESION AMOUNT CONTROL AND MONOCHROME POSITION ADJUSTMENT CONTROL | REGARD, AS IMPORTANT, REDUCTION OF COLOR TONER CONSUMPTION AMOUNT WHEN MONOCHROME PRINTING RATIO IS HIGH |
| COLOR MODE | OTHER THAN THE ABOVE-MENTIONED CONDITIONS | EXECUTION OF ONLY TONER ADHESION AMOUNT CONTROL AND COLOR MATCHING CONTROL | REGARD, AS IMPORTANT, COLOR PRINTING SPEED |

FIG.19A

| TIMING | CRITERION | CONTROL OPERATION | | |
|---|---|---|---|---|
| | | COLOR MODE | BLACK MODE | COLOR INHIBITION MODE | NON-EXECUTION MODE |
| POWER ON | DETECTION OF BLACK PHOTOSENSITIVE UNIT REPLACEMENT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST (NV), MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |
| | DETECTION OF M, C, Y PHOTOSENSITIVE UNIT REPLACEMENT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST (NV) | NO CONTROL EXECUTION | MACHINE STOP |
| | DETECTION OF NEW INTERMEDIATE TRANSFER UNIT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST (NV), MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |
| | ENVIRONMENT VARIATION | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST, MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |

FIG.19B

| | | COLOR MATCHING CONTROL EXECUTION REQUEST | COLOR MATCHING CONTROL EXECUTION REQUEST (NV) MONOCHROME POSITION ADJUSTMENT CONTROL EXECUTION REQUEST | MONOCHROME POSITION ADJUSTMENT CONTROL EXECUTION REQUEST | |
|---|---|---|---|---|---|
| POWER ON | OTHER THAN THE ABOVE-MENTIONED CONDITIONS | TONER ADHESION AMOUNT CONTROL AND COLOR MATCHING CONTROL EXECUTION REQUEST EXISTS | NO CONTROL EXECUTION | MONOCHROME POSITION ADJUSTMENT CONTROL EXECUTION REQUEST | MACHINE STOP |
| | TONER ADHESION AMOUNT CONTROL AND COLOR MATCHING CONTROL EXECUTION REQUEST EXISTS | | NO CONTROL EXECUTION | NO CONTROL EXECUTION | MACHINE STOP |
| | MONOCHROME TONER ADHESION AMOUNT CONTROL AND MONOCHROME POSITION ADJUSTMENT CONTROL EXECUTION EXISTS | NO CONTROL EXECUTION | MONOCHROME TONER ADHESION AMOUNT CONTROL AND MONOCHROME POSITION ADJUSTMENT CONTROL EXECUTION | MONOCHROME TONER ADHESION AMOUNT CONTROL AND MONOCHROME POSITION ADJUSTMENT CONTROL EXECUTION | MACHINE STOP |
| | COLOR MATCHING CONTROL EXECUTION REQUEST EXISTS | COLOR MATCHING CONTROL EXECUTION | NO CONTROL EXECUTION | NO CONTROL EXECUTION | MACHINE STOP |
| | MONOCHROME POSITION ADJUSTMENT CONTROL EXECUTION REQUEST EXISTS | NO CONTROL EXECUTION | MONOCHROME POSITION ADJUSTMENT CONTROL EXECUTION | MONOCHROME POSITION ADJUSTMENT CONTROL EXECUTION | MACHINE STOP |
| | DETECTION OF BLACK PHOTOSENSITIVE UNIT REPLACEMENT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST (NV) MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |
| RE-TURNING FROM SLEEP MODE | DETECTION OF M, Y, C PHOTOSENSITIVE UNIT REPLACEMENT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST | NO CONTROL EXECUTION | MACHINE STOP |

FIG.19C

| | | | | | |
|---|---|---|---|---|---|
| RETURNING FROM SLEEP MODE | DETECTION OF NEW INTERMEDIATE TRANSFER UNIT | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST (NV), MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |
| | ENVIRONMENT VARIATION | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST, MONOCHROME TONER ADHESION AMOUNT CONTROL AND MONOCHROME POSITION ADJUSTMENT CONTROL EXECUTION REQUEST | MONOCHROME TONER ADHESION AMOUNT CONTROL AND MONOCHROME POSITION ADJUSTMENT CONTROL EXECUTION REQUEST | MACHINE STOP |
| | PREVIOUS CONTROL IS IN LSU TEMPERATURE INCREASE STATE | COLOR MATCHING CONTROL EXECUTION REQUEST | NO CONTROL EXECUTION | NO CONTROL EXECUTION | MACHINE STOP |
| | OTHER THAN THE ABOVE-MENTIONED CONDITIONS | NO CONTROL EXECUTION | NO CONTROL EXECUTION | NO CONTROL EXECUTION | MACHINE STOP |
| | TONER ADHESION AMOUNT CONTROL AND COLOR MATCHING CONTROL EXECUTION REQUEST EXISTS | TONER ADHESION AMOUNT CONTROL AND COLOR MATCHING CONTROL EXECUTION | NO CONTROL EXECUTION | NO CONTROL EXECUTION | MACHINE STOP |
| | MONOCHROME TONER ADHESION AMOUNT CONTROL AND MONOCHROME POSITION ADJUSTMENT CONTROL EXECUTION REQUEST EXISTS | NO CONTROL EXECUTION | MONOCHROME TONER ADHESION AMOUNT CONTROL AND MONOCHROME POSITION ADJUSTMENT CONTROL EXECUTION | MONOCHROME TONER ADHESION AMOUNT CONTROL AND MONOCHROME POSITION ADJUSTMENT CONTROL EXECUTION | MACHINE STOP |
| | COLOR MATCHING CONTROL EXECUTION REQUEST EXISTS | COLOR MATCHING CONTROL EXECUTION | NO CONTROL EXECUTION | NO CONTROL EXECUTION | MACHINE STOP |

FIG.19D

| | | Toner adhesion amount control and color matching control execution | Toner adhesion amount control and color matching control execution |
|---|---|---|---|
| BEFORE JOB START (COLOR) | Toner adhesion amount control and color matching control execution request exists | No control execution | — |
| | Monochrome toner adhesion amount control and monochrome position adjustment control execution request exists | Color matching control execution | — |
| | Color matching control execution request exists | No control execution | Color matching control execution |
| | Toner adhesion amount control and color matching control execution request exists | Toner adhesion amount control and color matching control execution | No control execution |
| BEFORE JOB START (MONO-CHROME) | Monochrome toner adhesion amount control and monochrome position adjustment control execution request exists | No control execution | Monochrome toner adhesion amount control and monochrome position adjustment control execution |
| | Color matching control execution request exists | Color matching control execution | No control execution |

FIG.19E

| | | TONER ADHESION AMOUNT CONTROL AND COLOR MATCHING IMMEDIATE EXECUTION REQUEST | TONER ADHESION AMOUNT CONTROL AND COLOR MATCHING IMMEDIATE EXECUTION REQUEST |
|---|---|---|---|
| | ENVIRONMENT VARIATION | | |
| PAGE END (COLOR) | CUMULATIVE NUMBER OF PRINTED PAGES AFTER PREVIOUS EXECUTION OF TONER ADHESION AMOUNT CONTROL AND COLOR MATCHING CONTROL REACHES CONTROL REQUEST THRESHOLD | TONER ADHESION AMOUNT CONTROL AND COLOR MATCHING CONTROL EXECUTION REQUEST | TONER ADHESION AMOUNT CONTROL AND COLOR MATCHING CONTROL EXECUTION REQUEST |
| | CUMULATIVE NUMBER OF PRINTED PAGES AFTER PREVIOUS EXECUTION OF MONOCHROME TONER ADHESION AMOUNT CONTROL AND MONOCHROME POSITION ADJUSTMENT CONTROL REACHES CONTROL REQUEST THRESHOLD | | |
| | CUMULATIVE NUMBER OF PRINTED PAGES AFTER PREVIOUS EXECUTION OF TONER ADHESION AMOUNT CONTROL AND COLOR MATCHING CONTROL REACHES IMMEDIATE EXECUTION THRESHOLD | TONER ADHESION AMOUNT CONTROL AND COLOR MATCHING CONTROL IMMEDIATE EXECUTION REQUEST | TONER ADHESION AMOUNT CONTROL AND COLOR MATCHING CONTROL IMMEDIATE EXECUTION REQUEST |
| | CUMULATIVE NUMBER OF PRINTED PAGES AFTER PREVIOUS EXECUTION OF MONOCHROME TONER ADHESION AMOUNT CONTROL AND MONOCHROME POSITION ADJUSTMENT CONTROL REACHES IMMEDIATE EXECUTION THRESHOLD | | |
| | TIME OF DRIVING OF POLYGON MOTOR DURING REFERENCE MONITORING TIME REACHES CONTROL REQUEST THRESHOLD | COLOR MATCHING CONTROL EXECUTION REQUEST | COLOR MATCHING CONTROL EXECUTION REQUEST |
| | TIME OF DRIVING OF POLYGON MOTOR DURING REFERENCE MONITORING TIME REACHES IMMEDIATE EXECUTION THRESHOLD | COLOR MATCHING CONTROL IMMEDIATE EXECUTION REQUEST | COLOR MATCHING CONTROL IMMEDIATE EXECUTION REQUEST |

FIG.19F

| | | ENVIRONMENT VARIATION | TONER ADHESION AMOUNT CONTROL AND COLOR MATCHING CONTROL IMMEDIATE EXECUTION REQUEST | TONER ADHESION AMOUNT CONTROL AND COLOR MATCHING CONTROL IMMEDIATE EXECUTION REQUEST, MONOCHROME TONER ADHESION AMOUNT CONTROL AND MONOCHROME POSITION ADJUSTMENT CONTROL IMMEDIATE EXECUTION REQUEST | MONOCHROME TONER ADHESION AMOUNT CONTROL AND MONOCHROME POSITION ADJUSTMENT CONTROL IMMEDIATE EXECUTION REQUEST |
|---|---|---|---|---|---|
| PAGE END (MONO-CHROME) | CUMULATIVE NUMBER OF PRINTED PAGES AFTER PREVIOUS EXECUTION OF TONER ADHESION AMOUNT CONTROL AND COLOR MATCHING CONTROL REACHES CONTROL REQUEST THRESHOLD | | TONER ADHESION AMOUNT CONTROL AND COLOR MATCHING CONTROL IMMEDIATE EXECUTION REQUEST | | MONOCHROME TONER ADHESION AMOUNT CONTROL AND MONOCHROME POSITION ADJUSTMENT CONTROL IMMEDIATE EXECUTION REQUEST |
| | CUMULATIVE NUMBER OF PRINTED PAGES AFTER PREVIOUS EXECUTION OF MONOCHROME TONER ADHESION AMOUNT CONTROL AND MONOCHROME POSITION ADJUSTMENT CONTROL REACHES CONTROL REQUEST THRESHOLD | | NO CONTROL EXECUTION | MONOCHROME TONER ADHESION AMOUNT CONTROL AND MONOCHROME POSITION ADJUSTMENT CONTROL IMMEDIATE EXECUTION REQUEST | NO CONTROL EXECUTION |
| | CUMULATIVE NUMBER OF PRINTED PAGES AFTER PREVIOUS EXECUTION OF TONER ADHESION AMOUNT CONTROL AND COLOR MATCHING IMMEDIATE EXECUTION THRESHOLD | | TONER ADHESION AMOUNT CONTROL AND COLOR MATCHING CONTROL IMMEDIATE EXECUTION REQUEST | NO CONTROL EXECUTION | MONOCHROME TONER ADHESION AMOUNT CONTROL AND MONOCHROME POSITION ADJUSTMENT CONTROL IMMEDIATE EXECUTION REQUEST |
| | CUMULATIVE NUMBER OF PRINTED PAGES AFTER PREVIOUS EXECUTION OF MONOCHROME TONER ADHESION AMOUNT CONTROL AND MONOCHROME POSITION ADJUSTMENT CONTROL REACHES IMMEDIATE EXECUTION THRESHOLD | | NO CONTROL EXECUTION | MONOCHROME TONER ADHESION AMOUNT CONTROL AND MONOCHROME POSITION ADJUSTMENT CONTROL IMMEDIATE EXECUTION REQUEST | NO CONTROL EXECUTION |
| | TIME OF DRIVING OF POLYGON MOTOR DURING REFERENCE MONITORING TIME REACHES CONTROL REQUEST THRESHOLD | | COLOR MATCHING CONTROL EXECUTION REQUEST | NO CONTROL EXECUTION | NO CONTROL EXECUTION |
| | TIME OF DRIVING OF POLYGON MOTOR DURING REFERENCE MONITORING TIME REACHES IMMEDIATE EXECUTION THRESHOLD | | COLOR MATCHING CONTROL IMMEDIATE EXECUTION REQUEST | NO CONTROL EXECUTION | NO CONTROL EXECUTION |

FIG.19G

| | TONER ADHESION AMOUNT CONTROL AND COLOR MATCHING CONTROL EXECUTION REQUEST EXISTS | | |
|---|---|---|---|
| | | MONOCHROME TONER ADHESION AMOUNT CONTROL AND MONOCHROME POSITION ADJUSTMENT CONTROL EXECUTION REQUEST EXISTS | |
| | | | COLOR MATCHING CONTROL EXECUTION REQUEST EXISTS |
| JOB END (COLOR) | TONER ADHESION AMOUNT CONTROL AND COLOR MATCHING CONTROL EXECUTION | NO CONTROL EXECUTION | — |
| | MONOCHROME TONER ADHESION AMOUNT CONTROL AND MONOCHROME POSITION ADJUSTMENT CONTROL EXECUTION REQUEST EXISTS | NO CONTROL EXECUTION | MONOCHROME TONER ADHESION AMOUNT CONTROL AND MONOCHROME POSITION ADJUSTMENT CONTROL EXECUTION | — |
| | COLOR MATCHING CONTROL EXECUTION REQUEST EXISTS | COLOR MATCHING CONTROL EXECUTION | NO CONTROL EXECUTION | — |
| JOB END (MONO- CHROME) | TONER ADHESION AMOUNT CONTROL AND COLOR MATCHING CONTROL EXECUTION REQUEST EXISTS | TONER ADHESION AMOUNT CONTROL AND COLOR MATCHING CONTROL EXECUTION | NO CONTROL EXECUTION | |
| | MONOCHROME TONER ADHESION AMOUNT CONTROL AND MONOCHROME POSITION ADJUSTMENT CONTROL EXECUTION REQUEST EXISTS | NO CONTROL EXECUTION | MONOCHROME TONER ADHESION AMOUNT CONTROL AND MONOCHROME POSITION ADJUSTMENT CONTROL EXECUTION | |
| | COLOR MATCHING CONTROL EXECUTION REQUEST EXISTS | COLOR MATCHING CONTROL EXECUTION | NO CONTROL EXECUTION | |

IMAGE FORMING APPARATUS, CORRECTION CONTROL METHOD AND COMPUTER READABLE INFORMATION RECORDING MEDIUM

BACKGROUND OF THE INVENTION

1. Field of the Invention

The present invention relates to an image forming apparatus having a mode in which plural colors are overlaid together to form a color image and a mode in which a monochrome image is formed, a correction control method executed in the image forming apparatus, and a computer readable information recording medium storing a correction control program for causing a computer to execute the correction control method.

2. Description of the Related Art

In an image forming apparatus of an electrophotographic type, generally speaking, an image is formed for each color, and four colors of images are overlaid together to form a visible full-color image. As image forming apparatuses that form images in such a manner, a tandem-type color image forming apparatus is known, for example. Tandem-type color image forming apparatuses include one in an indirect transfer type and one in a direct transfer type.

On an intermediate transfer belt on which an image carried by an image carrying member is primarily transferred in the former type, or on a conveyance belt that conveys transfer paper on which an image carried by an image carrying member is directly transferred in the latter type, a correction pattern for color matching is formed for each color. In the tandem-type image forming apparatus, the correction patterns are read by means of optical sensors, writing timing is corrected, and adjustment is executed such that positions at which the respective four color images are overlaid become coincident.

In the tandem-type image forming apparatus, ordinarily, so-called color mode in which a color image is formed and a monochrome mode in which a monochrome image is formed are set, an operator selects either one of these modes from an operating panel, and the selected mode is executed. It is noted that, the color matching correction is called color matching correction because respective positions at which the four color images are formed are made coincident. Further, because color matching correction means correction of an error in respective positions at which the four color images are formed, color matching correction is also called positional error correction. Therefore, the color matching correction and the positional error correction are technically equivalent.

In the above-mentioned image forming apparatus in the related art in which the four colors are overlaid together and a color image is formed, color matching correction and tone correction for a color image are executed also in forming a monochrome image. In this case, the tone correction is such that a toner image (patch) is formed on a photosensitive drum or such, the toner patch is read by a tone sensor, and correction is executed. Therefore, large amounts of toners are used other than those for an image which a user actually wishes. In addition, also in the monochrome mode in which an image is formed by using only a black toner, the color patch is formed and tone correction is executed. Therefore, even in the monochrome mode, color toners are consumed.

As a technique for reducing such a useless consumption of color toners, for example, techniques discussed in Patent Documents 1, 2 and 3 (below mentioned) are known. Among these documents, Patent Document 1 (Japanese Laid-Open Patent Application No. 2008-151855) discusses a color image forming apparatus in which a white and black control mode in which tone correction is executed only for a black toner and a color control mode in which tone correction is executed for the black toner and color toners are executable. Then, at least one of the white and black control mode and the color control mode is selectively set, and the set control mode is executed.

Further, Patent Document 2 (Japanese Laid-Open Patent Application No. 2008-197542) discusses a job receiving part that receives an image to print as a printing job, and a correction control part that forms an image to print in any one of modes in which image forming conditions are different, and also, causes an image forming part to form an adjustment pattern, causes a measuring part to measure the adjustment pattern, and executes correction of an image forming condition for each mode. Further, the Patent Document 2 discusses a cumulative operation managing part that calculates and stores cumulative operation information after previous correction, and a process control part that, prior to forming an image to output, determines a mode suitable for the image, and determines whether to execute correction, by comparing the cumulative operation information with a threshold that is determined for each mode.

Further, Patent Document 3 (Japanese Laid-Open Patent Application No. 2009-053668) discusses an image forming apparatus. The image forming apparatus includes a transfer belt, photosensitive members provided for respective colors of YMCK that are used to form a black adjustment pattern and color adjustment patterns on the transfer belt, a pattern sensor that detects the black adjustment pattern and the color adjustment patterns, a monochrome adjustment part that adjusts a black image tone, a color adjustment part that adjusts yellow, cyan and magenta image tones, and an adjustment operation determining part that determines whether only adjustment by the monochrome adjustment part is executed or only adjustment by the color adjustment part is executed, based on color of an image to be formed on recording paper. Among these parts, the monochrome adjustment part adjusts the black image tone in a case where the black adjustment pattern is formed, and the color adjustment part adjusts image tones of yellow, cyan and magenta in a case where the color adjustment patterns are formed.

In each of the techniques of the Patent Documents 1-3, in the monochrome mode, correction for monochrome is executed manually or automatically, and, in the color mode, correction for color is executed manually or automatically. Thus, useless consumption of color toners is reduced in the monochrome mode.

However, in consideration of the contents that are set, usage situations and so forth in the image forming apparatus, useless correction for monochrome or color may be executed. That is, for example, at a time of starting up the image forming apparatus, correction for a full-color image, i.e., the tone correction of the color mode and color matching correction are executed, and, after both types of correction have been finished, it is determined whether a monochrome or color image is to be formed according to a job, and image forming is executed based on a mode according to the determination result.

That is, according to the techniques of the Patent Documents 1-3, at a time when a mode is determined manually or automatically, a correction operation suitable to the mode is executed. However, at a time of starting up the image forming apparatus, determination of a mode is not executed before tone correction and color matching are executed. Therefore, even in a case where a printing job that is to be executed first after starting up the image forming apparatus is of the monochrome mode, the job can be started after the tone correction and color matching are executed for all of the four colors.

Therefore, in the case where the printing job to be executed first after starting up the image forming apparatus is of the monochrome mode, a time is required before actually starting the printing job, and also, the color toners are uselessly consumed.

In a common image forming apparatus, in particular, a digital MFP (Multi-Function Peripheral) including at least two of a copy function, a facsimile function and a printer function, mostly monochrome printing is executed, and color printing is executed a little. Further, in a network printer or a network MFP which is connected to a communication network, monochrome printing is executed more than color printing.

For example, in a MFP in which monochrome printing is set, even when correction for color is executed immediately after a condition for executing correction for color is met, a likelihood that a color printing job is given subsequently is low. Further, in a MFP in the related art, in a case where a condition for executing correction for monochrome is met after correction for color is executed, useless correction for monochrome may be executed. That is, in a MFP in the related art, it may not be said that correction for monochrome or color is executed in appropriate timing.

SUMMARY OF THE INVENTION

Therefore, the present invention has been devised in consideration of the above-mentioned problem, and an aspect of the present invention is to provide an image forming apparatus, a correction control method and a computer readable information recording medium, by which it is possible to execute correction for monochrome or color in appropriate timing.

According to a mode for executing the present invention, an image forming apparatus for which a first mode for executing image forming that uses toners of plural colors including a black toner and a second mode for executing image forming that uses only the black toner can be set, includes a first printing cumulatively counting part that cumulatively counts a first number of pages for which image forming has been executed by using the toners of plural colors; a first printing determining part that determines whether the first number of pages counted by the first printing cumulatively counting part has exceeded a threshold; and a correction control part that controls not to execute a correcting process for image forming that uses the toners of plural colors but to execute a correcting process for image forming that uses only the black toner, when the second mode has been set in a case where the first printing determining part has determined that the first number of pages has exceeded the threshold.

According to another mode for executing the present invention, a correction control method, in an image forming apparatus for which a first mode for executing image forming that uses toners of plural colors including a black toner and a second mode for executing image forming that uses only the black toner can be set, includes a first printing cumulatively counting step of cumulatively counting a first number of pages for which image forming has been executed by using the toners of plural colors; a first printing determining step of determining whether the first number of pages counted in the first printing cumulatively counting step has exceeded a threshold; and a controlling step of controlling not to execute a correcting process for image forming that uses the toners of plural colors but to execute a correcting process for image forming that uses only the black toner, when the second mode has been set in a case where it has been determined in the first printing determining step that the first number of pages has exceeded the threshold.

Further, an image forming apparatus according to an embodiment of the present invention may be realized by a computer program that is executable by a computer, or, may be realized as a result of a computer reading a computer-readable information recording medium storing the program.

According to an embodiment of the present invention, it is possible to execute correction for monochrome or color in appropriate timing according to the contents that are set, usage situations and so forth in a MFP.

Other objects, features and advantages of the present invention will become more apparent from the following detailed description when read in conjunction with the accompanying drawings.

BRIEF DESCRIPTION OF THE DRAWINGS

FIGS. 6A, 6B and 6C illustrate a principle to detect the color matching correction patterns shown in FIG. 5;

FIGS. 9A, 9B and 9C show a principle to detect the adhesion amount correction patterns by using a regular reflection light receiving part;

FIG. 10 shows, in a table form, an adhesion amount variable factor and a color shift variable factor, control operation required to correct them, timing to determine, and criteria;

FIG. 11 shows, in a table form, an event, control operation and a note, collectively for control modes;

FIG. 19A shows, in a table form, control execution determination timing and criteria, and shows a state at a time of power being turned on;

FIG. 19B shows, in a table form, control execution determination timing and criteria, and shows a state at a time of power being turned on and returning from a sleep mode;

FIG. 19C shows, in a table form, control execution determination timing and criteria, and shows a state at a time of returning from the sleep mode;

FIG. 19D shows, in a table form, control execution determination timing and criteria, and shows a state before job start (color, monochrome);

FIG. 19E shows, in a table form, control execution determination timing and criteria, and shows a state at a time of page end (color);

FIG. 19F shows, in a table form, control execution determination timing and criteria, and shows a state at a time of page end (monochrome);

FIG. 19G shows, in a table form, control execution determination timing and criteria, and shows a state at a time of job end (color, monochrome) and at a time of receiving forcible execution instruction;

FIG. 27 is a flowchart showing one example of a control procedure of process at a time of power being turned on.

DETAILED DESCRIPTION OF THE PREFERRED EMBODIMENTS

Below, an embodiment of the present invention will be described with reference to figures.

1 Configuration of Image Forming Apparatus

Figure 1:
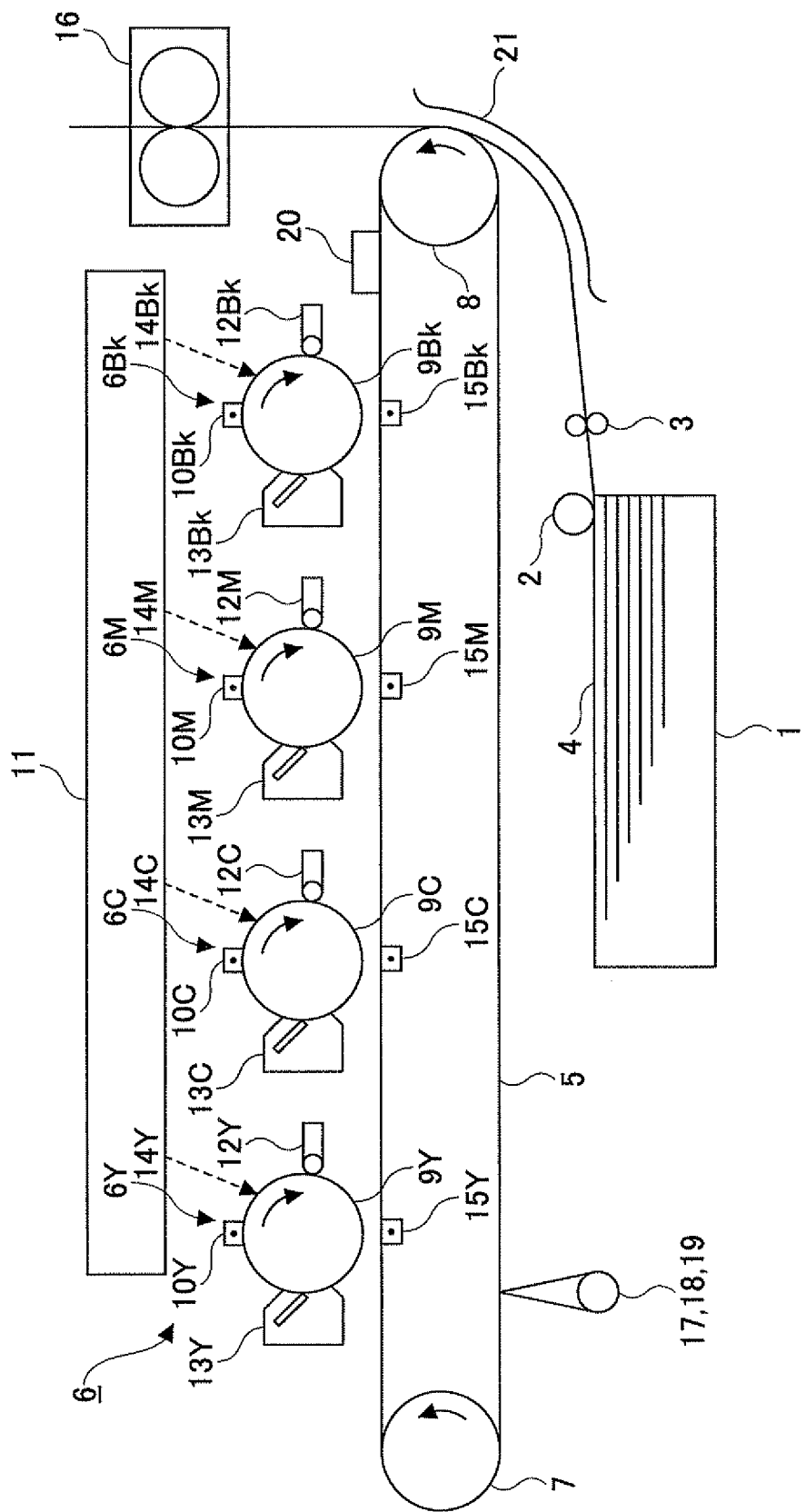
FIG. 1 is a general configuration diagram showing a configuration of an image forming section in an image forming apparatus in an embodiment of the present invention.

FIG. 1 is a general configuration diagram showing a configuration of an image forming section in the image forming apparatus in the embodiment. In FIG. 1, the image forming apparatus in the embodiment is a tandem-type color laser printer of the indirect transfer type in which image forming parts of respective colors are disposed along an intermediate transfer belt 5 acting as an endless moving part. The image forming apparatus includes a paper feeding tray 1, an exposure unit 11, the image forming part 6, the intermediate transfer belt 5, a transfer unit 15, and a fixing unit 16. It is noted that, below, description will be made for the indirect transfer type. However, an image forming apparatus in the direct transfer type may also be applied. In this case, a conveyance belt acts as the endless moving part.

The image forming part 6 includes four, black (Bk), magenta (M), cyan (C) and yellow (Y) image forming parts 6Bk, 6M, 6C and 6Y, and these image forming parts are disposed along a rotation direction of the intermediate transfer belt 5 in the stated order from the upstream side. These plural image forming parts 6Bk, 6M, 6C and 6Y have common internal configurations except that colors of toner images to form are different. The image forming part 6Bk forms a black image, the image forming part 6M forms a magenta image, the image forming part 6C forms a cyan image and the image forming part 6Y forms a yellow image.

Images of the respective colors formed by the image forming parts 6Bk, 6M, 6C and 6Y are primarily transferred to the intermediate transfer belt 5 in the order shown in FIG. 1. Further, an image thus obtained from overlaying the four colors is, in a lump, secondarily transferred to paper (recording paper) 4 that is separated from the paper feeding tray 1 by means of a paper feeding roller 2 and a separating roller 3. Thereby, a full-color image is formed on the paper 4. It is noted that the image forming parts 6Bk, 6M, 6C and 6Y of the respective colors are configured as photosensitive units of the respective colors in the embodiment, and are replaced each as a unit together with a charger 10, a developer 12 and a photosensitive cleaner 13, described later.

In the description below, for a configuration that is common to the respective colors, suffixes Bk, M, C and Y, indicating the respective colors, are omitted, and a description will be made generally instead of a description being made for each color.

The intermediate transfer belt 5 is an endless belt, and is extended between a driving roller 7 and a following roller 8. The driving roller 7 is driven and rotated by a driving motor (not shown), and rotates in a direction of an arrow shown in FIG. 1 (counterclockwise). At a time of image forming, the paper 4 held in the paper feeding tray 1 is fed from the top, one by one in sequence, as will be described later, transfer bias is applied to the paper 4 by a secondary transfer device 21 at which the intermediate transfer belt 5 and the paper 4 come in contact with one another, and the full-color toner image in which the four colors are overlaid on the intermediate transfer belt 5 is transferred to the paper 4.

The image forming part 6 includes a photosensitive drum 9 as a photosensitive member, and, the charger 10, the developer 12, the transfer unit 15, the photosensitive cleaner 13, an electricity removal unit (not shown) and so forth, which are disposed along the periphery of the photosensitive drum 9, and an exposure part is provided to which laser light 14 emitted by the exposure unit 11 is irradiated between the charger 10 and the developer 12. The exposure unit 11 irradiates the laser light 14 that is an exposure beam corresponding to an image color formed in each image forming part 6 to the exposure part of the photosensitive drum 9 of the image forming part 6. Further, the transfer unit 15 is provided to face the photosensitive drum 9 through the intermediate transfer belt 5.

Figure 2:
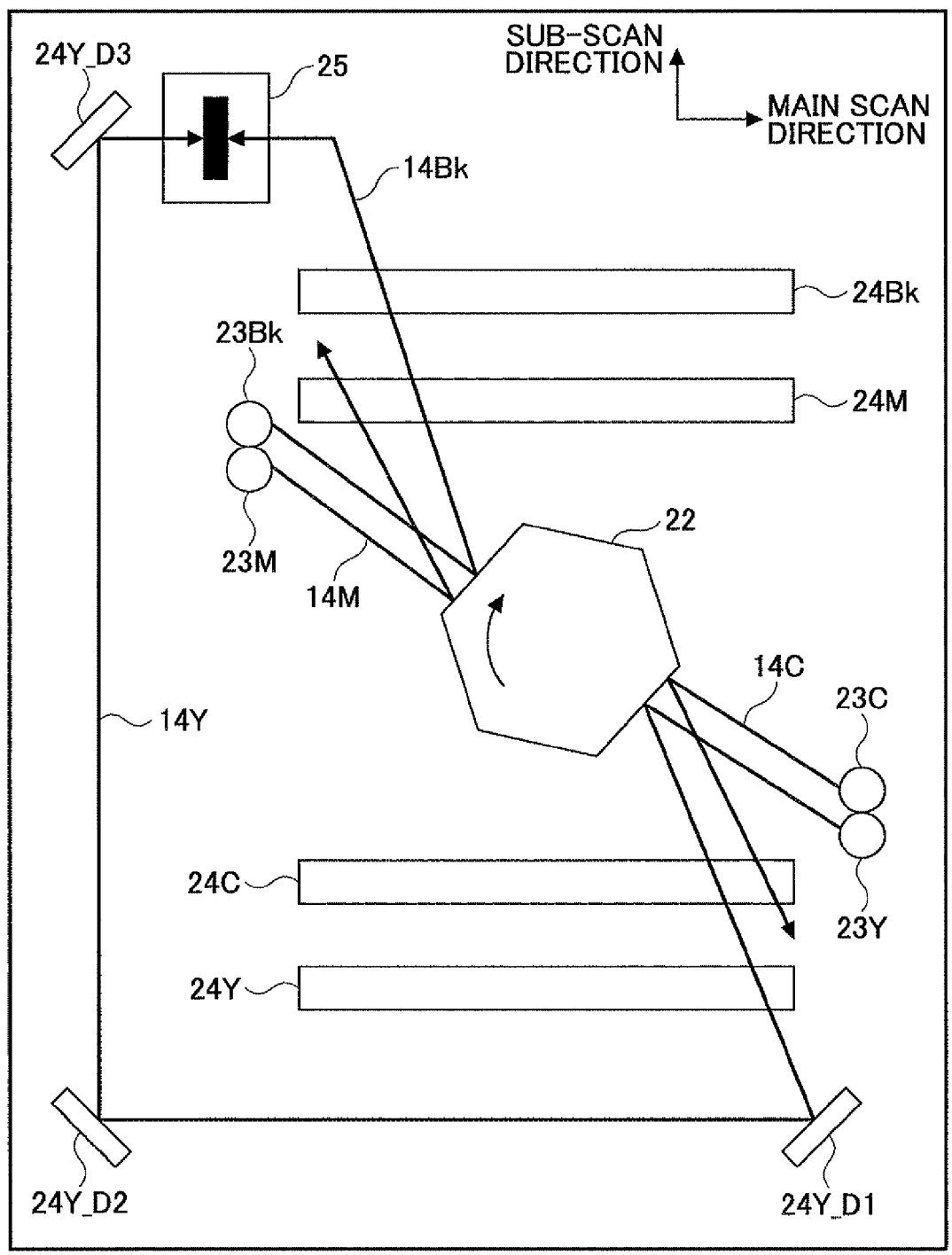
FIG. 2 shows a general internal configuration of an exposure unit.

FIG. 2 generally shows an internal configuration of the exposure unit 11. The laser light that is exposure beams 14Bk, 14M, 14C and 14Y of the respective image colors is emitted by laser diodes 23Bk, 23M, 23C and 23Y that are light sources, respectively. The emitted laser light 14 passes through optical systems 24Bk, 24M, 24C and 24Y, respectively, by means of a rotating polygon mirror 22, respective light paths are thus adjusted, and then, the laser light 14 is used to scan respective surfaces of the photosensitive drums 9Bk, 9M, 9C and 9Y. The rotating polygon mirror 22 is a hexahedral polygon mirror that rotates to scan each of the photosensitive drums, where one line in a main scan direction with the exposure beam corresponds to one surface of the hexahedral polygon mirror 22. The single polygon mirror 22 is used for the four laser diodes 23 acting as the light sources. The laser light 14 is able to expose the four different photosensitive drums 9 simultaneously, as a result of the laser light 14 being divided into laser light 14Bk, 14M of two colors and laser light 14C, 14Y of the other two colors, and opposite reflection surfaces of the rotating polygon mirror 22 are used for scanning with the laser light 14. The optical system 24 includes a f-θ lens that causes the reflected light to have equal spaces, and a deflection mirror that deflects the laser light.

A synchronization detection sensor 25 is disposed outside of an image area in the main scan direction, detects the laser light 14Bk and 14Y each time when scanning is executed for one line, and adjusts exposure start timing at a time of image forming. The synchronization detection sensor 25 is disposed to the side of the optical system 24Bk, and therefore, the laser light 14Y is incident on the synchronization detection sensor 25 after being reflected by synchronization detection mirrors 24Y_D1, 24Y_D2 and 24Y_D3. Because it is not possible to adjust writing start timing for the laser light 14M and 14C by using the synchronization detection sensor 25, image positions of the respective colors are made coincident as a result of exposure start timing of magenta being made to coincide with exposure start timing of black, and exposure start timing of cyan being made to coincide with exposure start timing of yellow.

At a time of image forming, an outer surface of the photosensitive drum 9Bk is uniformly charged by the charger 10Bk in the dark, and then is exposed by the laser light 14Bk corresponding to a black image from the exposure unit 11, and thus, an electrostatic latent image is formed on the surface of the photosensitive drum 9Bk. The developer 12Bk makes visible the electrostatic latent image by causing a black toner to adhere to the electrostatic latent image. Thus, a toner image of the black toner is formed on the photosensitive drum 9Bk.

The toner image is transferred to the intermediate transfer belt 5 by the function of the transfer unit 15Bk at a position (transfer position) at which the photosensitive drum 6Bk comes into contact with the intermediate transfer belt 5, and thus, an image of the black toner is formed on the intermediate transfer belt 5. Useless toner remaining on the outer surface of the photosensitive drum 9Bk after the transfer of the toner image is removed by the photosensitive cleaner 13Bk, and then, the electricity removal unit discharges the electricity from the photosensitive drum 9Bk so that the photosensitive drum 9Bk is prepared for a subsequent image forming.

The black toner image transferred to the intermediate transfer belt 5 in the image forming part 6Bk as mentioned above is then conveyed to the next image forming part 6M as the intermediate transfer belt 5 moves. During the same time interval, also in the image forming parts 6M, 6C and 6Y, magenta, cyan and yellow toner images are formed on the photosensitive drums 9M, 9C and 9Y, respectively, by means of processes which are the same as the above-mentioned image forming process in the image forming part 6Bk, in timing shifted by transfer timing in the transfer units 15, and the toner images are then transferred to the intermediate transfer belt 5 in such a manner that the toner images are overlaid one by one in sequence on the black image formed on the intermediate transfer belt 5.

Thus, the full-color image is formed on the intermediate transfer belt 5. To the full-color overlaid image, the transfer bias is applied by the secondary transfer device 21 at which the intermediate transfer belt 5 comes into contact with the paper 4. The papers 4 held by the paper feeding tray 1 have been fed in sequence from the top, to the secondary transfer device 21. Then, the full-color overlaid image is transferred to the paper 4 from the intermediate transfer belt 5. The paper 4 to which the full-color image is thus formed is then separated from the intermediate transfer belt 5, then the image is fixed by the fixing unit 16, and then, the paper 4 having the image is ejected to the outside of the image forming apparatus.

2 Color Matching Correction 2.1 Outline

In the image forming apparatus having the configuration described above, because of an error in an inter-axis distance between the photosensitive drums 9Bk, 9M, 9C and 9Y, an error in parallelism between the photosensitive drums 9Bk, 9M, 9C and 9Y, an error in installation of the polygon mirror in the exposure unit 11, an error in writing timing of electrostatic latent images between the photosensitive drums 9Bk, 9M, 9C and 9Y, and so forth, the toner images of the respective colors may not be overlaid at a position at which the toner images are to be overlaid together normally, and thus, have a positional error between the respective colors. As components of the positional error between the respective colors, mainly, skew, a registration error in a sub-scan direction, a magnification error in the main scan direction, and a registration error in the main scan direction are known.

Figure 5:
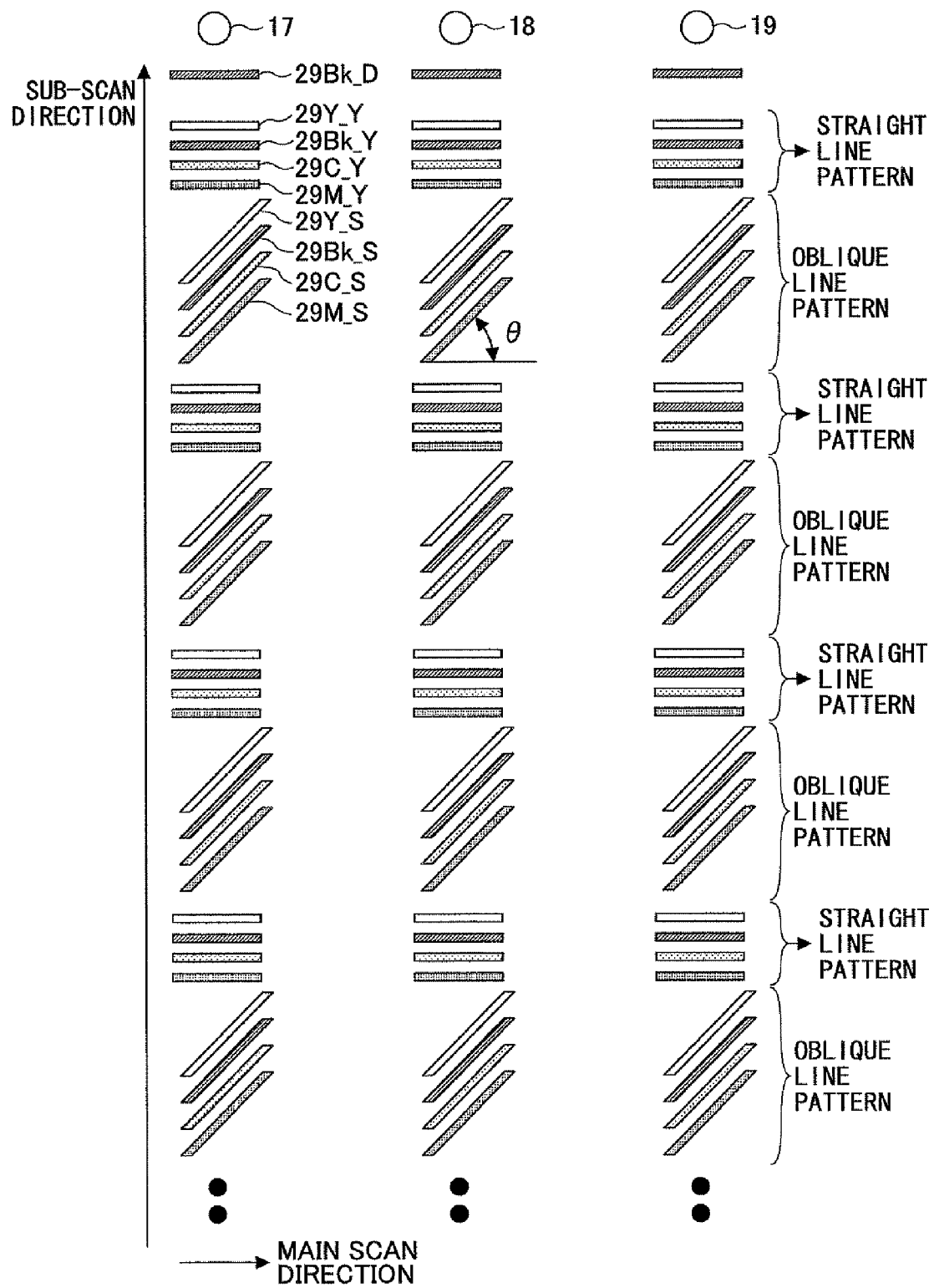
FIG. 5 shows one example of color matching patterns.

In order to eliminate the error, it is necessary to correct the positional errors in the toner images of the respective colors. The color matching correction is achieved by causing image positions of the three colors, M, C and Y, to be coincident with an image position of Bk. As shown in FIG. 1, first, second and third toner mark sensors (referred to as TM sensors, hereinafter) 17, 18 and 19 are provided on the downstream side of the image forming part 6Y to face the intermediate transfer belt 5 to detect toner patterns. The TM sensors 17, 18 and 19 are reflection-type optical sensors, and are supported on a common substrate to be along the main scan direction that is perpendicular to a direction in which the paper 4 is conveyed. In order to calculate information of the positional errors necessary to execute color matching correction, color matching correction patterns 29 described later with reference to FIG. 5 are formed on the intermediate transfer belt 5, the TM sensors 17, 18 and 19 read the correction patterns 29 of the respective colors, and thus, positional error amounts between the respective colors are detected. The color matching correction patterns 29 are removed by a cleaning part 20 from the intermediate transfer belt 5 after being detected by the TM sensors 17, 18 and 19.

2.2 Positional Error Detecting Sensors

Figure 3:
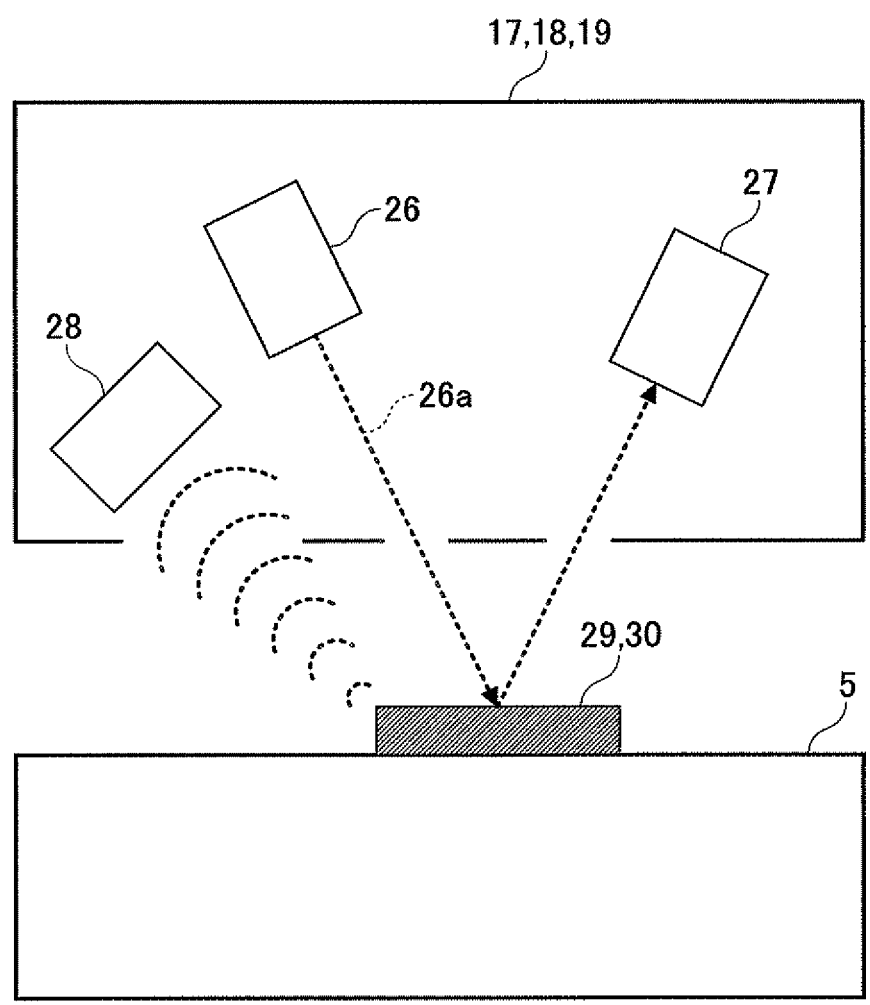
FIG. 3 shows a configuration of a detection arrangement for detecting patterns formed on an intermediate transfer belt by using a TM sensor.
Figure 4:
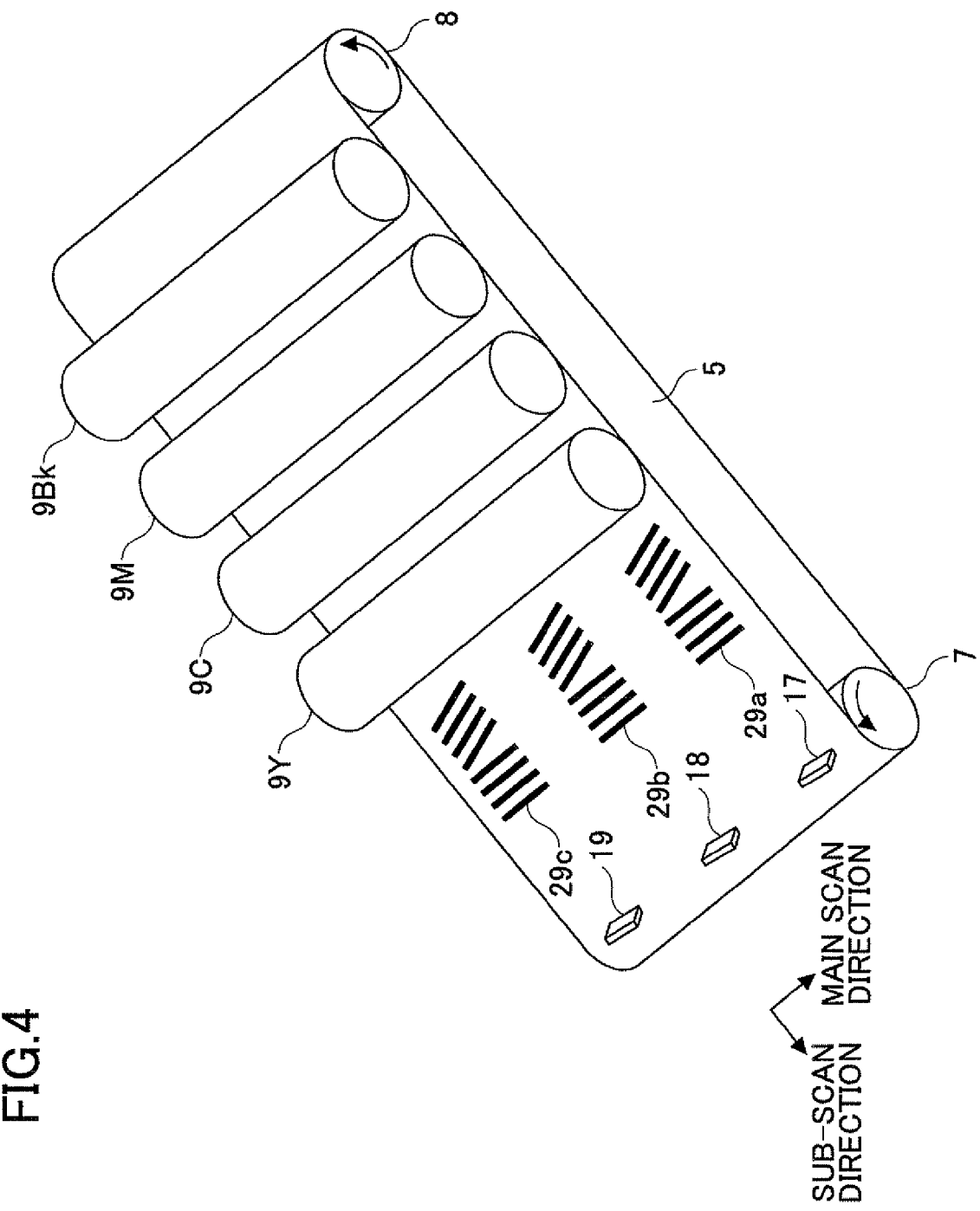
FIG. 4 is a general perspective view showing relationship between the TM sensors, positional error correction patterns, and photosensitive drums.

FIG. 3 shows a magnified view of image detecting parts including the TM sensors 17, 18 and 19. FIG. 4 shows an arrangement of executing pattern detection by means of the TM sensors 17, 18 and 19. FIGS. 3 and 4 show positional relationship between the photosensitive drums 9 (9Bk, 9M, 9C and 9Y), the intermediate transfer belt 5, the correction patterns (29a, 29b and 29c), and the TM sensors 17, 18 and 19.

In FIG. 3, each of the TM sensors 17, 18 and 19 has a light emitting part 26, a regular reflection light receiving part 27 and a diffuse reflection light receiving part 28. From the light emitting part 26, a light beam 26a is emitted toward the color matching correction patterns 29 for color matching correction formed on the intermediate transfer belt 5, the regular reflection light receiving part 27 receives reflected light from the color matching patterns 29 including a regular reflection light component and a diffuse reflection light component, and the TM sensors 17, 18 and 19 detect the color matching patterns 29. Further, adhesion amount correction patterns 30 for adhesion amount correction are formed on the intermediate transfer belt 5, and the TM sensors 17, 18 and 19 detect the adhesion amount correction patterns 30. At a time of detecting the adhesion amount correction patterns 30, the regular reflection light receiving part 27 receives reflected light from the adhesion amount correction patterns 30 including a regular reflection light component and a diffuse reflection light component, and the diffuse reflection light receiving part 28 receives diffuse reflected light. The first and third TM sensors 17 and 19 are disposed at respective ends in the main scan direction, and the second TM sensor 28 is disposed at the center, as shown in FIG. 4. For the respective TM sensors 17, 18 and 19, the color matching correction patterns 29A, 29b and 29c are formed. It is noted that FIG. 4 shows one set of pattern sequences that are a minimum required for obtaining various color matching amounts of the respective colors, for each of the TM sensors 17, 18 and 19.

2.3 Color Matching Correction Patterns

FIG. 5 shows an example of the color matching correction patterns 29. The color matching correction patterns 29 include one set of pattern sequences that include a total of eight patterns including straight line patterns 29Bk_Y, 29M_Y, 29C_Y and 29Y_Y of the four colors of Bk, M, C and Y, and oblique line patterns 29Bk_S, 29M_S, 29C_S and 29Y_S of the four colors of Bk, M, C and Y. Each of the oblique line patterns 29Bk_S, 29M_S, 29C_S and 29Y_S is a right rising oblique line (in FIG. 5, with respect to the sub-scan direction, the right end is higher and the left end is lower). These pattern sequences are formed for each of the first, second and third TM sensors 17, 18 and 19, respectively, and further, plural sets, each set including these pattern sequences, are formed in the sub-scan direction.

In addition, the color matching correction patterns 29 include detection timing correction patterns 29Bk_D at the top of the patterns. Immediately before detecting the straight line patterns 29Bk_Y, 29M_Y, 29C_Y, 29Y_Y and the oblique line patterns 29Bk_S, 29M_S, 29C_S, 29Y_S, the TM sensors 17, 18 and 19 detect the detection timing correction patterns 29Bk_D. Next, the TM sensors 17, 18 and 19 detect a time interval from a time at which forming of the patterns (exposure) is started to a time at which the patterns reach the positions of the image detecting parts, calculate an error of the detected time from a theoretical value, correct the theoretical value, and thus, can detect the straight line patterns 29Bk_Y, 29M_Y, 29C_Y, 29Y_Y and the oblique line patterns 29Bk_S, 29M_S, 29C_S, 29Y_S at appropriate timing.

Further, based on the detection timing of the detection timing correction patterns 29Bk_D, a position of the paper 4 is corrected. In other words, timing at which the paper 4 is fed to the secondary transfer device 21 for image transfer is corrected. Therefore, also in a case of monochrome image forming, the detection timing detection patterns 29Bk_D are formed, and are also used for monochrome position adjustment control. That is, the detection timing correction patterns 29Bk_D are formed first, both in a case of monochrome image forming and in a case of color image forming, and, after these patterns are detected, other controls are executed using the patterns.

2.4 Detection Principle

FIGS. 6A, 6B and 6C illustrate a detection principle for the color matching correction patterns shown in FIG. 5. FIG. 6A shows relationships between the correction pattern, a spot diameter of irradiated light, and a spot diameter on the regular reflection light receiving part. FIG. 6B shows one example of a relationship between a diffuse reflection light component and a regular reflection light component of light reception signals of the correction patterns. FIG. 6C shows an output signal of the regular reflection light receiving part and a method to obtain the middle point of the correction patterns As shown in FIG. 5, the correction patterns 29 of the respective colors Bk, M, C and Y are formed on the intermediate transfer belt 5. In FIG. 6A, a reference numeral 33 denotes a pattern width of the straight line patterns 29Bk_Y, 29M_Y, 29C_Y and 29Y_Y in the sub-scan direction; a reference numeral 34 denotes a space between the adjacent straight line patterns 29Bk_Y and 29M_Y; a reference numeral 32 denotes a spot diameter of the light emitting part 26 that irradiates the pattern at a position of the pattern; and a reference numeral 31 denotes a spot diameter detected by the regular reflection light receiving part.

A light beam 26a from the light emitting part 26 irradiates the patterns on the intermediate transfer belt 5. An output signal from the regular reflection light receiving part 27 represents reflected light from the intermediate transfer belt 5, and the reflected light includes a regular reflection light component and a diffuse reflection light component. Therefore, when the intermediate transfer belt 5 moves according to the relationship, the diffuse reflection light component of the light reception signal of the TM sensors 17, 18 and 19 has characteristics indicated by a reference numeral 36 in FIG. 6B, and the regular refection light component has characteristics indicated by a reference numeral 37 in FIG. 6B. Further, in FIG. 6C, a reference numeral 35 denotes an output signal of the regular reflection light receiving part 37. In FIG. 6C, the ordinate denotes an output signal strength of the regular reflection light receiving part 27 and the abscissa denotes time. A CPU 49 described later determines that edges 41Bk_1, 41Bk_2, 41M,C,Y_1, 41M,C,Y_2, of the patterns are detected at positions at which the detection waveform of the output signal 35 of the regular reflection light receiving part 27 of the TM sensors 17, 18 and 19 crosses a threshold line 40. Further, an average between the two points is obtained, and it is determined that the average indicates the image position. An output signal strength of the regular reflection light receiving part 27, i.e., a reflected light strength, is set in the embodiment to be the medium value between a reflected light strength from the intermediate transfer belt 5 and a reflected light strength from the pattern having the darkest tone, i.e., the half strength, and this reflected light strength is set as the threshold line 40.

In FIG. 6B, the reference numeral 36 denotes the diffuse reflection light component of the light reception signal. The diffuse reflection light component is not reflected by the surface of the intermediate transfer belt 5 and is not reflected by the color matching correction patterns 29Bk_Y of Bk. However, the diffuse reflection light component is reflected by the color matching correction patterns 29M, C, Y_Y of M, C and Y. The reference numeral 37 denotes the regular reflection light component. The regular reflection light component is strongly reflected by the surface of the intermediate transfer belt 5, and is not reflected by the color matching correction patterns 29 without regard to the colors thereof.

As can be seen from the output signal 35 of the regular reflection light receiving part 27 of FIG. 6C, the S/N ratio is degraded at a time of detecting the color patterns because the reflected light that includes both the diffuse reflection light component and the regular reflection light component occur is detected, in comparison to a time of detecting the Bk pattern. In order to stably detect the edge of the pattern in this case, the following processes may be executed.

The light emitting part 26 maintains the strength of the light beam 26a during execution of one time of color matching correction or adhesion amount correction.

Further, the strength of the irradiated light is adjusted to the optimum value each time of execution of color matching correction or adhesion amount correction.

By using detection result of the regular reflection light receiving part 27 when the light beam 26a is irradiated to the intermediate transfer belt 5 with various strengths in a condition in which no patterns are formed, the irradiation strength of the light beam 27a is determined such that the regular reflected light level from the intermediate transfer belt 5 becomes a target value.

Further, in a case where a reduction of the adjustment time is required, a fixed value of the irradiation strength is continuously used.

The TM sensors 17, 18 and 19 shown in FIG. 3 detect the color matching correction patterns 29 precisely as a result of alignment between the light emitting part 26 and the regular reflection light receiving part 27 being adjusted. When the alignment has an error because of mechanical tolerance, mounting error, or such, peak positions of the waveform 36 of the regular reflection light component and the waveform 37 of the diffuse reflection light component from the straight line patterns 29Bk_Y, 29M_Y, 29C_Y and 29Y_Y of the respective colors become different as can be seen from FIG. 6B, That is, in the output signal of the regular reflection light receiving part 27 (waveform 37 of the regular reflection light component), the actual middle point of the pattern 29Bk and the peak position of the output signal are coincident. However, the actual middle point of the pattern 29M, C, Y and the peak position of the output signal (waveform 37 of the regular reflection light component) are different. As a result, the detection position of the color pattern has an error, and a precise position cannot be detected. The degradation in the S/N ratio at a time of color pattern detection and the detection error become larger for a case where the oblique line patterns 29M_S, 29C_S and 29Y_S are detected in comparison to a case where the straight line patterns 29M_Y, 29C_Y and 29Y_Y are detected.

Further, as shown in FIG. 6A, when a disturbance 38 such as a scratch or a deposit exists on the intermediate transfer belt 5, the scratch or deposit may be erroneously detected as the color matching correction pattern 29. When the light beam 26a is irradiated to the disturbance 38, a reflection level of regular reflected light falls in comparison to a smooth surface of the intermediate transfer belt 5 (see FIG. 6B). When the reflection level of the disturbance 38 falls to be lower than the threshold level 40, the image detecting part erroneously recognizes the disturbance 38 as having detected the color matching correction pattern 29. In order to avoid such erroneous recognition, it is advantageous to improve the S/N ratio in detecting the color matching correction patterns, and lower the threshold line 40.

Therefore, in order to stably detect the color matching correction patterns 29, it is necessary to reduce the color pattern detection error and improve the S/N ratio in detecting the color patterns. The regular reflection light component from the color pattern has the maximum difference from the reflected level from the intermediate transfer belt 5 when the pattern width of the color pattern in the sub-scan direction is equal to or larger than the light receiving spot diameter 31 on the regular reflection light receiving part 27. Further, the diffuse reflection light component has a lower reflection level as the pattern width of the color pattern in the sub-scan direction is smaller. Therefore, the S/N ratio in detecting the reflected light becomes maximum when the pattern width of the color pattern is equal to the light receiving spot diameter 31 of the regular reflection light receiving part 27.

Therefore, the line width 33 in the sub-scan direction of the color matching correction patterns 29Bk, M, C, Y_Y is 0.6 mm that is approximately equal to the light receiving spot diameter 31 of the regular reflection light receiving part 27. Also, the shortest part of the line width of the oblique line color matching correction patterns 29Bk, M, C, Y_S is 0.6 mm. Further, the spot diameter 32 of the irradiated light is approximately 2 mm. When the irradiated light is irradiated to two patterns simultaneously, and diffuse light is reflected from the two patterns simultaneously, it is not possible to precisely detect the patterns. In order to avoid such a situation, the space 34 between respective patterns of the straight line color matching correction patterns 29Bk, M, C, Y_Y is equal to or more than 2 mm. Also, the shortest part of the space between respective patterns of the oblique line color matching correction patterns 29Bk, M, C, Y_S is equal to or more than 2 mm.

Color matching correction is executed by using the color matching correction patterns 29 shown in FIG. 5, as a result of the CPU 49 executing predetermined processes based on outputs of the TM sensors 17, 18 and 19. That is, from the detection results of the color matching correction patterns 29 of FIG. 5, image positions of the straight line patterns 29Bk_Y, 29M_Y, 29C_Y and 29Y_Y are obtained, and registration error amounts in the sub-scan direction and skews are obtained as a result of the CPU 49 executing predetermined processes. Further, in addition to the image positions of the straight line patterns 29Bk_Y, 29M_Y, 29C_Y and 29Y_Y, image positions of the oblique line patterns 29Bk_S, 29M_S, 29C_S and 29Y_S are obtained, and magnification errors in the main scan direction and registration error amounts in the main scan direction are obtained as a result of the CPU 49 executing predetermined processes. Based on these results, color matching correction is executed.

As for skews, it is possible to correct skews by, for example, adding an inclination to the polygon mirror in the exposure unit 11 or the exposure unit 11 itself by means of an actuator. As for registration errors in the sub-scan direction, it is possible to correct registration errors in the sub-scan direction by, for example, control of line writing start timing and surface phase control of the polygon mirror. As for magnification errors in the main scan direction, it is possible to correct magnification errors in the main scan direction, for example, by changing writing image frequency. As for registration errors in the main scan direction, it is possible to correct registration errors in the main scan direction by, for example, changing main scan line writing start timing.

2.5 Color Matching Correction Circuit

Figure 7:
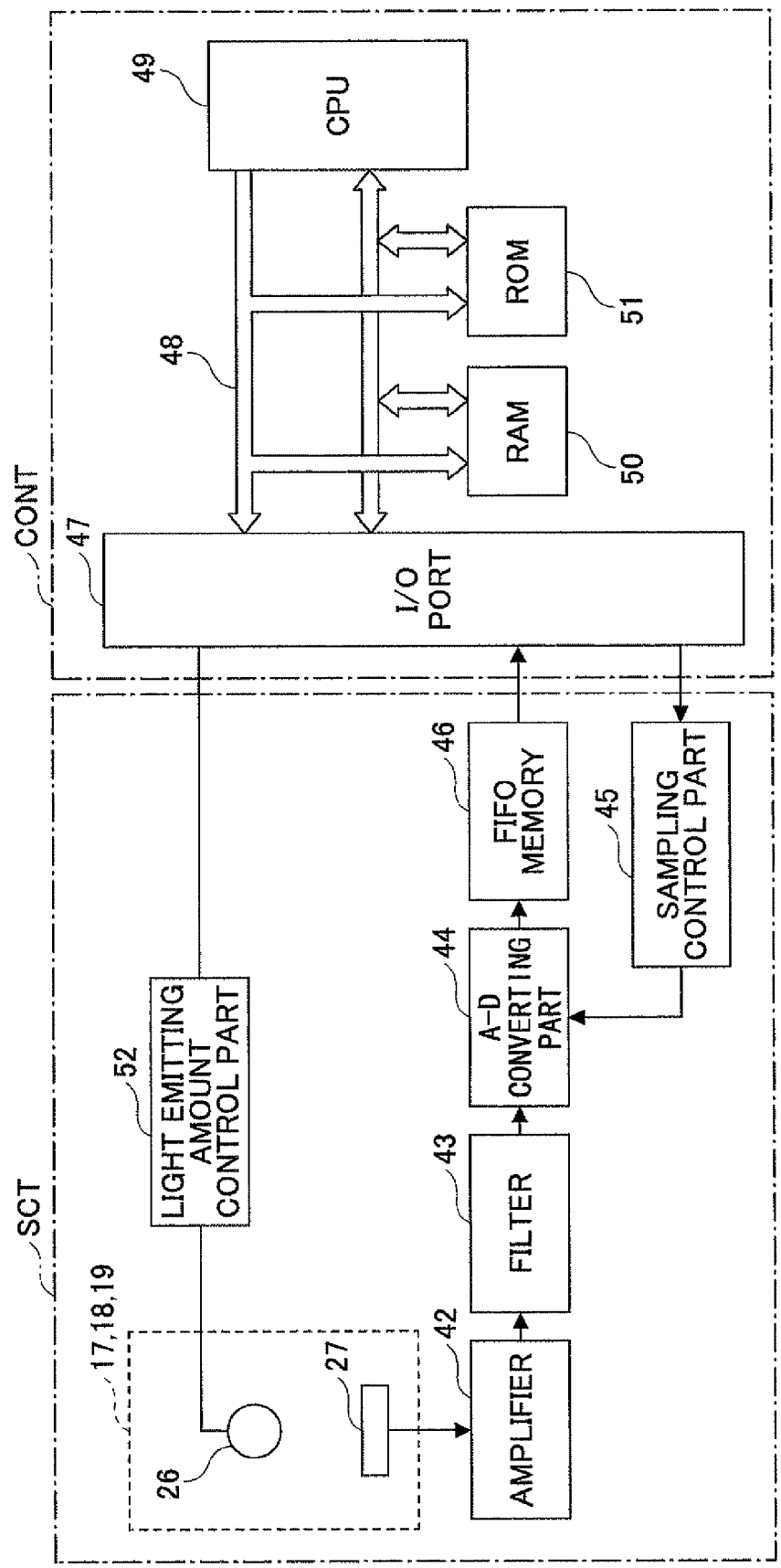
FIG. 7 is a block diagram showing a circuit configuration of a color matching correction circuit that processes detected data, for calculating a necessary correction amount for color matching correction.

FIG. 7 is a block diagram showing a circuit configuration of a color matching correction circuit that processes detection data for calculating necessary correction amounts for color matching correction. In FIG. 7, the color matching correction circuit includes a control circuit CONT and a detection circuit SCT, and the detection circuit SCT is connected with the control circuit CONT via an I/O port 47 of the control circuit CONT.

The detection circuit SCT includes the TM sensors 17, 18 and 19, an amplifier (AMP) 42, a filter 43, an A-D (Analog to Digital) converter 44, a sampling control part 45, a FIFO memory 46, and a light emitting amount control part 52. The control circuit CONT is such that a RAM 50 and a ROM 51 are connected with a CPU 49 via a bus 48, and the bus 48 is connected with the I/O port 47.

In this control configuration, the output signals obtained from the regular reflection light receiving parts 27 of the TM sensors 17, 18 and 19 are amplified by the amplifier 42, the filter 43 only passes line detection signal components, and the A-D converter 44 converts the analog data to digital data. Sampling of the data is controlled by the sampling control part 45, and the sampled data is stored by the FIFO memory 46. After detection of one set of color matching correction patterns 29 is finished, the stored data is loaded in the CPU 49 and the RAM 50 via the bus 48, through the I/O port 47. The CPU 49 executes predetermined processes, and obtains the above-mentioned various error amounts.

In the ROM 51, various programs for controlling the color matching correction circuit and the image forming apparatus, including a program for calculating the above-described various error amounts, are stored. The CPU 49 monitors the detection signals from the regular reflection light receiving parts 27 at appropriate timing. For the purpose of positively detecting degradation or such, if any, of the intermediate transfer belt 5 and the light emitting parts 26, the light emitting amount control part 52 controls the light emitting amounts, and causes the levels of the light reception signals from the regular reflection light receiving parts 27 to be always constant. The RAM 50 provides a work area used when the CPU 49 executes the program. Thus, the CPU 49 and the ROM 51 act as a control part that controls operation of the entirety of the image forming apparatus.

By thus forming images of the color matching correction patterns 29 and detecting the same, it is possible to execute color matching correction between the respective colors, and output high-quality images. At this time, reduction in color pattern detection errors and erroneous detection of the color patterns is necessary for reducing color shift and obtaining high-quality images. For this purpose, in the embodiment, such a toner adhesion amount per unit area of the color matching correction pattern is obtained that an influence of the diffuse reflection light component from the color patterns (color matching correction patterns) becomes minimum. For this purpose, adhesion amount correction patterns are used.

2.6 Toner Adhesion Amount (Tone) Correction

In image forming apparatuses, it is necessary to make constant a toner adhesion amount per unit area when a toner image of each color is transferred to transfer paper, for the purpose of obtaining high-quality images having no tone unevenness. For this purpose, the adhesion amount correction is executed commonly. In the adhesion amount control, adhesion amount correction patterns for the adhesion amount correction of the respective colors are formed for which a developing bias voltage and an exposure beam light amount which control adhesion amounts are changed variously, adhesion amounts of the patterns of the respective colors are detected by using detecting parts such as TM sensors, and the developing bias voltage and the exposure beam light amount for obtaining a target toner adhesion amount per unit area are calculated. Such a technology is discussed, for example, in Japanese Patent No. 3667971.

Because, for the toner adhesion correction control, various known techniques have been proposed, and such toner adhesion amount correction control is executed in the embodiment, description of the details of the toner adhesion amount correction control will be omitted here.

2.7 Toner Adhesion Amount Correction Patterns

Figure 8:
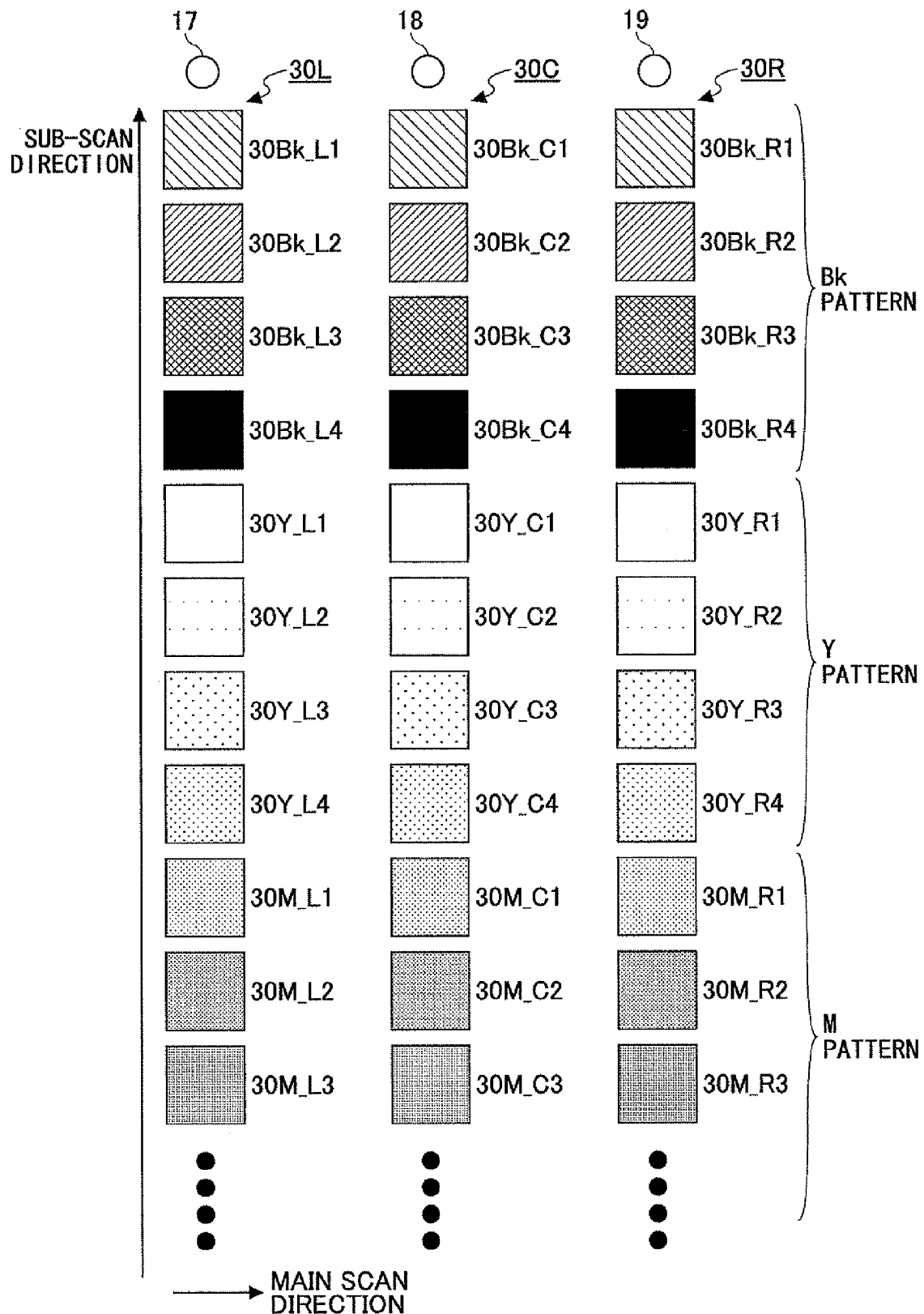
FIG. 8 shows one example of adhesion amount correction patterns.

FIG. 8 shows one example of adhesion amount correction patterns 30 for adhesion amount correction in the embodiment. The adhesion amount correction patterns 30 in the embodiment are such that, at a position of the TM sensor 18 provided at the center of the image, adhesion amount correction patterns 30Bk_C1, C2, C3, C4, 30Y_C1, C2, C3, C4, 30M_C1, C2, C3, C4, 30C_C1, C2, C3, C4 are formed. By changing a developing bias voltage and a light amount of laser light 14 for every pattern, various adhesion amount correction patterns 30 are formed at predetermined intervals in the sub-scan direction. The patterns are formed in the same manner for each of the four colors. Reflected light from the adhesion amount correction patterns 30 is detected by the TM sensor 18, and the image forming apparatus executes adhesion amount correction based on the detection results of the TM sensor 18.

The adhesion amount correction patterns 30 in the embodiment are further such that, at positions of the TM sensors 17 and 19 provided at respective ends of the image, left side and right side adhesion amount correction patterns 30Bk_L1, L2, L3, L4, 30Y_L1, L2, L3, L4, 30M_L1, L2, L3, L4, 30C_L1, L2, L3, L4, and 30Bk_R1, R2, R3, R4, 30Y_R1, R2, R3, R4, 30M_R1, R2, R3, R4, 30C_R1, R2, R3, R4, respectively, are formed. The left side and right side adhesion amount correction patterns are formed in the completely same conditions.

These left side and right side adhesion amount correction patterns 30 are detected by the TM sensors 17 and 19, respectively. Further, below, the left side adhesion amount correction patterns are generally referred to by using a reference numeral 30L; the right side adhesion amount correction patterns are generally referred to by using a reference numeral 30R; and the center adhesion amount correction patterns are generally referred to by using a reference numeral 30C.

FIGS. 9A, 9B and 9C show a principle of detecting the left side adhesion amount correction patterns 30L and right side adhesion amount correction patterns 30R by means of the regular reflection light receiving parts 27. FIG. 9A shows relationships between the correction pattern, a spot diameter of irradiated light and a spot diameter of the regular reflection light receiving part 27. FIG. 9B shows one example of a relationship between the diffuse reflection light component and the regular reflection light component of a light reception signal of the correction patterns. FIG. 9C shows an output signal of the regular reflection light receiving part 27 and a method for obtaining an edge of the correction pattern. It is noted that in FIGS. 9A, 9B and 9C, the same reference numerals are given to equivalents of those shown in FIGS. 6A, 6B and 6C, and duplicate description will be omitted.

As shown in FIG. 9A, in the left side and right side adhesion amount correction patterns 30L and 30R, a line width 54 in the sub-scan direction is larger than a spot diameter 32 of the irradiated light. Further, in the left side and right side adhesion amount correction patterns 30L and 30R, the developing bias voltage and the exposure beam light amount are adjusted so that an adhesion amount per unit area becomes larger on the opposite side with respect to the moving direction of the intermediate transfer belt 5. In FIG. 9C, a reference numeral 35 denotes the output signal obtained when the regular reflection light receiving part 27 of the TM sensor 17 or 19 detects the left side and right side adhesion amount correction patterns (black) 30Bk_L or 30Bk_R. The CPU 49 sets plural, i.e., first, second and third threshold lines 40_1, 40_2 and 40_3 for the detection signals of the first and third TM sensors 17 and 19. Then, the CPU 49 uses the first threshold line 40_1 to determine to have detected the edges 41Bk_3, 41Bk_4, 41Bk_5 and 41Bk_6 of the patterns, and uses the second threshold line 40_2 to determine to have detected the edges 41Bk_5' and 41Bk_6'.

In FIG. 9B, a reference numeral 36 denotes the diffuse reflection light component of the light reception signal. The diffuse reflection light component 36 is a little reflected by the surface of the intermediate transfer belt 5 and the 30Bk patterns. However, the diffuse light receiving component 36 is reflected by the 30M, C and Y patterns. A reference numeral 37 denotes the regular reflection light component of the light reception signal. The regular reflection light component is strongly reflected by the surface of the intermediate transfer belt 5. The reflection strength of the regular reflection light component from the adhesion amount correction patterns 30 lowers in inverse proportion to the adhesion amount.

In the embodiment, it is determined that the edges 41Bk_3, 41Bk_4, 41Bk_5, 41Bk_6 of the patterns have been detected, at the positions at which the detection waveform crosses the plural threshold lines 40_1, 40_2 and 40_3. it is noted that the plural threshold lines 40_1, 40_2 and 40_3 are determined in such a way that, for example, the threshold line 40 determined in FIG. 6C is used as the reference threshold line 40_1, and the threshold lines 40_2 and 40_3 of the smaller reflection strengths are arbitrarily set at predetermined strength intervals.

As the developing bias voltage and the exposure beam light amount for the color matching correction patterns 29, a developing bias voltage α and an exposure beam light amount β are used. The developing bias voltage α and the exposure beam light amount β are the same as the developing bias voltage and the exposure beam light amount of the adhesion amount correction pattern for which the number of edges detected with the plural threshold lines 40_1, 40_2 and 40_3 is largest in the left side and right side adhesion amount correction patterns 30L and 30R. In FIG. 9C, the adhesion amount of the pattern for which the four edges, i.e., 41Bk_5, 41Bk_6, 41Bk_5' and 41Bk_6' are detected, is used as a condition for the adhesion amount of the color matching correction patterns 29. That is, in FIGS. 9A, 9B and 9C, the toner adhesion amount of the third pattern is used to form the color matching correction patterns 29.

It is noted that, when plural adhesion amount correction patterns have the same largest number of the threshold lines, the developing bias voltage α and the exposure beam light amount β, the same as the developing bias voltage and the exposure beam light amount of the adhesion amount correction pattern having the smallest adhesion amount per unit area in the plural adhesion amount correction patterns, are used.

Further, the developing bias voltage α and the exposure beam light amount β the same as the developing bias voltage and the exposure beam light amount of the adhesion amount correction pattern may be used for which the output strength falls the most when the digital data obtained from conversion by the A-D converter 44 is sampled, without the use of the threshold lines.

Thus, images of the color matching correction patterns 29 in the embodiment are formed in the conditions in which, based on the detection results of the left and right adhesion amount correction patterns 30L and 30R, the detection errors of the TM sensors 17, 18 and 19 are minimized and the S/N ratio is maximized. As a result, the detection errors of the color patterns and the pattern erroneous detections are reduced, and it is possible to stably execute highly accurate detection of color shift amounts. Therefore, it is possible to output high quality images in which color shift is reduced.

Further, the Bk straight line and oblique line patterns 29Bk_Y, S originally have no influence of diffuse reflected light, and have a high S/N ratio, in comparison to the M, C and Y straight line and oblique line patterns 29M, C and Y_Y, S. Therefore, in order to simplify the process, the same set values of the developing bias voltage and the exposure beam light amount as those for when a printing image is formed may be used as the developing bias voltage and the exposure beam light amount of the Bk straight line and oblique line patterns 29Bk_Y, S.

Further, when the number of patterns of the color matching correction patterns 29 detected at a time of execution of color matching correction is smaller than the prescribed number of patterns, it is determined that a calculation error has occurred at a time of adhesion amount correction using the left side and right side adhesion amount correction patterns 30L and 30R, and such a developing bias voltage and an exposure beam light amount are set for subsequently forming the color matching correction patterns 29 so that the adhesion amount becomes equivalent to that of forming a printing image. Further, when the prescribed number of patterns of the color matching correction patterns are not detected at a time of color matching correction executed with the adhesion amount equivalent to that of forming a printing image, it is determined that a problem has occurred in a part other than the adhesion amount control part, and subsequent color matching correction is executed without changing the conditions.

Monochrome position adjustment correction and monochrome toner adhesion amount correction are generally referred to as a correcting process for image forming using only the black toner. Color matching correction or position adjustment correction and toner adhesion amount correction for color printing are generally referred to as a correcting process for image forming using the toners of plural colors (i.e., black, magenta, cyan and yellow, for example).

3 Determination for Executing Control of Color Matching Control and Toner Adhesion Amount Control 3.1 Variable Factor and Control Operation As for a toner adhesion amount and color matching (positional error), correction or adjustment is not unnecessary after one time of correction or adjustment is executed at a time after power is turned on, until power is turned off. That is, there are various variable factors, and for each variable factor, optimum control is executed. Below, descriptions will be made for each factor:

3.1.1 Factors Caused by User's Operation

In a case where a user uses the laser printer (image forming apparatus) in the embodiment, the toner adhesion amount and/or color matching may vary according to the user's operation or handling.

a. Top Cover Opened/Closed

In the laser printer in the embodiment, a laser scanner unit (LSU) is mounted in a top cover, the exposure position in the laser scanner unit may vary only because of opening/closing the top cover, and color shift may occur. Therefore, color matching control is necessary. An interlock switch of the top cover and a front cover is provided in the laser printer, and, by using the interlock switch, it is possible to detect whether the covers are opened. In the laser printer in the embodiment, the interlock switch is common. Therefore, when cover closing is detected, it is not possible to determine whether the operation is opening/closing of the front cover or the top cover. Therefore, in consideration that opening/closing of the front cover is executed mainly for jam handling, it is determined that the top cover is opened/closed in a case where jam occurrence information is not given at a time of detection of cover closing (in a case where the top cover is opened/closed when a jam occurs, color matching control is not executed as it is determined that the user's erroneous operation occurs). In this case, it is determined whether the control is necessary, when cover closing is detected.

b. Installation/Removal/Replacement of Image Forming Unit

In a case where a photosensitive unit of the four color photosensitive units (image forming parts) 6Bk, 6M, 6C and 6Y and an intermediate transfer unit including the intermediate transfer belt 5 are installed or removed, the arrangement in the image forming section varies, and thus color matching control is necessary. Further, in a case where the above-mentioned units are replaced with different units such as new ones, image forming characteristics vary, and thus toner adhesion amount control is further necessary. In this case, it is determined whether the control is necessary when power is turned on, when returning from sleep, when replacement of the photosensitive unit is detected or a new intermediate transfer unit is detected at a time of detection of cover closing.

c. Change in Installed Condition

In a case where a position at which the laser printer is installed is moved, color shift may occur, because of a change in a body frame deformation state that may occur during the movement or after the installation. It is noted that the laser printer in the embodiment does not have a function to directly detect a change in the installed condition. However, generally speaking, a movement of the installed position is executed under the condition where the power is turned off. Therefore, it is possible to cope with color shift that may be caused by an installed condition change, by executing color matching control at a time of the power being turned on in the laser printer.

3.1.2 Caused by Aging State Change of Image Forming Member a. Photosensitive Unit Aging Image forming characteristics vary because of toner aging, reduction in photosensitive member film thickness, or such. Therefore, toner adhesion amount control is necessary. At this time, it is determined that the control is necessary in a case where the cumulative number of printed pages exceeds a prescribed value. At this time, in order to prevent user's feeling during use from becoming worse, actual execution of the control is basically deferred until the job is finished. However, in a case where the job includes the number of pages equal to or more than a prescribed value, the job is interrupted, and toner adhesion amount control is executed.

b. Intermediate Transfer Unit Aging

Primary transfer efficiency varies because of aging of the intermediate transfer belt 5, and therefore, toner adhesion amount control is necessary. Further, color shift may occur in a case where a peripheral length change or such occurs in the intermediate transfer belt 5, and therefore, color matching control is necessary. At this time, the same as the above-mentioned item "a.", it is determined that the control is necessary in a case where the cumulative number of printed pages exceeds a prescribed value. At this time, in order to prevent user's frustration during use from occurring, actual execution of the control is basically deferred until the job is finished. However, in a case where the job includes the number of pages equal to or more than a prescribed value, the job is interrupted, and toner adhesion amount control and color matching control are executed.

3.1.3 Caused by Ambient Environmental Change a. Change in Humidity

In a case where the humidity changes toner charging amount or such changes, image forming characteristics change, and thus toner adhesion amount control is necessary. At this time, a difference from the environmental temperature and humidity at a time of previous execution of the control is monitored based on detection information of an environment temperate and humidity sensor, and it is determined whether the control is necessary.

b. Change in Temperature

In a case where an elongation in the intermediate transfer belt 5, heat deformation in the body frame, or such occurs because of a change in the temperature, color shift occurs, and therefore color matching control is necessary. Further, also the humidity changes because of a change in the temperature in the same environment. Therefore, the same toner adhesion amount control is necessary as in the above-mentioned item "a.". At this time, the same as the item "a.", differences from the environmental temperature and humidity at a time of previous execution of the control are monitored based on detection information of the environmental temperature and humidity sensor, and it is determined whether the control is necessary.

3.1.4 Caused by Change in the Inside of Machine a. Temperature Change in Image Forming Section In a case where continuous printing is executed, because of accumulation of heat transmitted from the fixing unit 16 or the driving part, the temperature in the image forming section increases, the image forming characteristics change, and thus toner adhesion amount control is necessary. In this case, the same as in the item "3.1.2", it is determined that the control is necessary in a case where the cumulative number of printed pages exceeds a prescribed value.

b. LSU Temperature Change

Along with a LSU temperature increase because of driving of the polygon motor in the LSU, deformation in an LSU frame, a mirror supporting part or such occurs, color shift occurs, and thus color matching control is necessary. This matter is coped with as follows:

1) In a case where a large scale job is given, the number of printed pages is counted within the job, and in a case where the number of printed pages exceeds a prescribed value, color matching control is executed. The job means a printing job, and also means a sequence of printing processes in which one or more copies of one or more originals are printed.

2) In a case where a small scale of job is given with high frequency, the number of printed pages is cleared every time when a job is given. Therefore, a time of driving of the polygon motor is monitored during a fixed time, and, in a case where the total of the driving time exceeds a prescribed value, color matching control is executed.

3) In a case where a small scale of job is given with such a degree of low frequency which does not correspond to the above-mentioned item "2)" for a long time, a color shift occurs because of heat accumulation caused by the accumulation of the jobs for the long time. Therefore, a cumulative elapsed time is measured after the cold start, and, in a case where the cumulative elapsed time exceeds a prescribed value, color matching control is executed.

4) For the above-mentioned three conditions, color matching control is executed under the condition in which the LSU is at a high temperature. Therefore, color shift occurs because of temperature decrease in the LSU in a case where the laser printer is left after the control is executed for a long time without executing printing. Therefore, color matching control is also executed in a case where an elapsed time after the control exceeds a prescribed value.

FIG. 10 shows the above-described adhesion amount and color shift variable factors, and control operations that are necessary to correct them. FIG. 10 includes timings to determine, criteria, and the control operations.

3.2 Integration of Control Execution

Toner adhesion amount control and color matching control are substantially different from one another, and, considered from a viewpoint of ensuring image quality, are to be executed separately. However, in a case where they are executed separately, the following problems occur:

1) Each of the toner adhesion amount control and the color matching control requires calibration of the toner detection sensors before the control, and a cleaning sequence after the control. To execute them separately results in an increase in control time and an increase in toner consumption.

2) In a case where the controls are executed separately and in close timing, a user's frustration during use may occur remarkably.

Therefore, in response to the variable factors described above in "3.1 Variable Factor and Control Operation", specific modes to execute the control are classified into the following two types. That is, both toner adhesion amount control and color matching control are executed simultaneously for the above-mentioned "3.1.1 Factors Caused by User's Operation", "3.1.2 Caused by Aging State Change of Image Forming Member", "3.1.3 Caused by Ambient Environmental Change" and "a. Temperature Change in Image Forming Section" of "3.1.4 Caused by Change in the Inside of Machine". In contrast thereto, in response to "b. LSU Temperature Change" of "3.1.4 Caused by Change in the Inside of Machine", color matching control is executed solely because this variable factor may occur with high frequency in comparison to the above-mentioned other variable factors.

3.3 Printing Operation Suspension

In a case where toner adhesion amount control or color matching control is executed during a printing operation, the printing operation is suspended.

3.4 Forcible Execution

In a case where a toner adhesion amount control forcible execution instruction is received, the instructed control is immediately executed, whether the corresponding variable factor occurs. Similarly, in a case where a color matching control forcible execution instruction is received, the instructed control is immediately executed, whether the corresponding variable factor occurs.

3.5 Control Mode

In a case where a toner adhesion amount control execution request or a color matching control execution request occurs, the control is executed according to the following mode setting. In the embodiment, four modes, i.e., a non-execution mode, a color inhibition mode, a black mode and a color mode are defined, and the above-mentioned toner adhesion amount control and color matching control are executed according to the respective modes. FIG. 11 collectively shows for "3.5 Control Mode", and shows events, control operations and purposes.

3.5.1 Non-Execution Mode

In the embodiment, the mode corresponding to any one of the following conditions is defined as the non-execution mode:

(1) when the end of service life of the intermediate transfer belt is detected;

(2) when a full waste toner box of the intermediate transfer belt is detected;

(3) when a full waste toner bottle in the K-color (Bk) photosensitive unit is detected; and (4) when the end of the toner in the K-color (Bk) photosensitive unit is detected.

When the end of service life of the intermediate transfer belt is detected of condition (1), there is a risk of body destruction caused by breakage of the intermediate transfer belt 5. When the full waste toner box in the intermediate transfer belt is detected of condition (2), there is a risk that the waste toner box overflows to dirty the inside of the machine when the control is executed. Therefore, neither toner adhesion amount control nor color matching control is executed under the conditions (1) and (2). In a case where the full waste toner bottle in the K-color (Bk) photosensitive unit is detected of condition (3), there is a risk that the waste toner bottle overflows to dirty the inside of the machine when the control is executed. Therefore, neither toner adhesion amount control nor color matching control is executed under the condition (3). In a case where the end of the toner in the K-color (Bk) photosensitive unit is detected of condition (4), it is not possible to expect success even when the control is executed. Therefore, neither toner adhesion amount control nor color matching control is executed under the condition (4). In the non-execution mode, in the same way, neither monochrome toner adhesion amount control nor monochrome position adjustment control is executed. The monochrome position adjustment control is a control to adjust a position at which a monochrome image is formed with respect to paper.

3.5.2 Color Inhibition Mode

The mode corresponding to any one of the following conditions (5) and (6), without corresponding to any one of the above-mentioned conditions (1), (2), (3) and (4) in "3.5.1 Non-Execution Mode" is defined as a color inhibition mode:

(5) when a full waste toner bottle in at least one of C, M and Y photosensitive units is detected; and (6) when the end of toner in at least one of C, M and Y photosensitive units is detected.

In a case where the full waste toner bottle in at least one of C, M and Y photosensitive units is detected of condition (5), there is a risk that the waste toner bottle overflows to dirty the inside of the machine. Therefore, neither toner adhesion amount control nor color matching control is executed. However, monochrome toner adhesion amount control (toner adhesion amount control only for Bk) and monochrome position adjustment control (position adjustment control only for Bk) are executed. In a case where the end of toner in at least one of C, M and Y photosensitive units is detected of condition (6), success is not expected even when the control is executed. Therefore, neither toner adhesion amount control nor color matching control is executed. However, monochrome toner adhesion amount control and monochrome position adjustment control are executed.

3.5.3 Black Mode

The mode corresponding to the following condition (7), without corresponding to any one of the above-mentioned conditions (1), (2), (3), (4) of "3.5.1 Non-Execution Mode" and any one of the conditions (5), (6) of "3.5.2 Color Inhibition Mode" is defined as a black mode:

(7) when the laser printer is set in the black mode.

In this mode, toner adhesion amount control, color matching control, monochrome toner adhesion amount control and monochrome position adjustment control are executed. In this mode, it is possible to reduce the color toner consumption when the proportion of monochrome printing is high.

3.5.4 Color Mode

The mode that does not correspond to any one of the above-mentioned conditions (1), (2), (3), (4) of "3.5.1 Non-Execution Mode", any one of the conditions (5), (6) of "3.5.2 Color Inhibition Mode", and the condition (7) of "3.5.3 Black Mode" is defined as a color mode.

In this mode, only toner adhesion amount control and color matching control are executed. Thereby, controls regarding the color printing speed as important are executed.

3.6 Function of CPU

Figure 12:
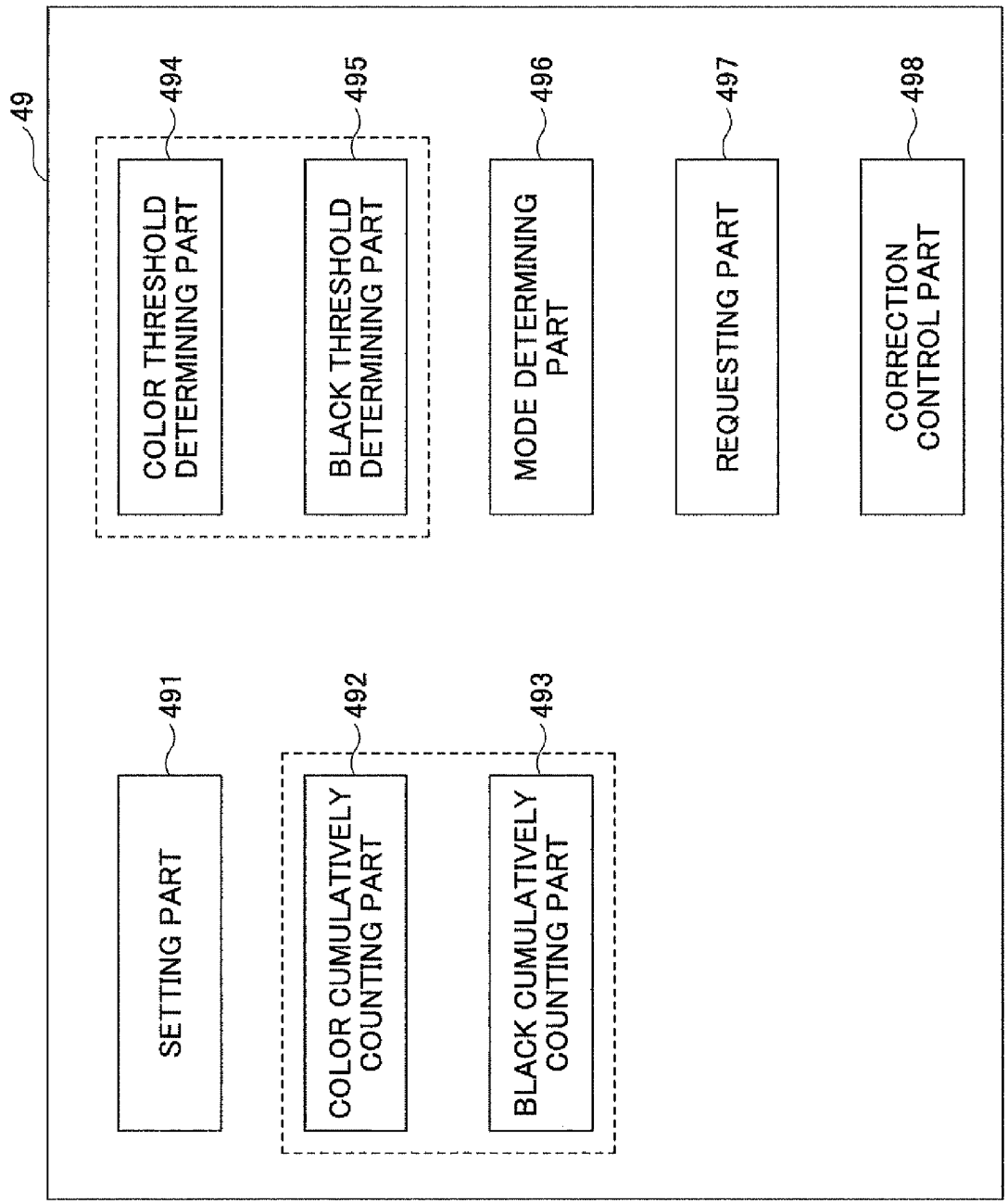
FIG. 12 is a block diagram showing one example of functions of a CPU.

FIG. 12 is a block diagram showing one example of the functions of the CPU 49 shown in FIG. 7. The CPU 49 shown in FIG. 12 includes a setting part 491, a color cumulatively counting part 492, a black cumulatively counting part 493, a color threshold determining part 494, a black threshold determining part 495, a mode determining part 496, a requesting part 497 and a correction control part 498.

The setting part 491 sets the color mode, the black mode, the color inhibition mode and the non-execution mode, based on predetermined conditions. As for the predetermined conditions, description will be made with reference to FIG. 13. The setting part 491 executes the mode setting by, for example, setting a flag in a mode setting storage area in which each of the modes is set.

The color cumulatively counting part 492 cumulatively counts the number of printed pages for which image forming has been executed by using the color (M, C and Y) toners. The black cumulatively counting part 493 cumulatively counts the number of printed pages for which image forming has been executed by using the black (Bk or K) toner.

The color threshold determining part 494 determines whether the color cumulative number of printed pages counted by the color cumulatively counting part 492 exceeds a first threshold. The first threshold is, for example, 200 pages. In a case where the color threshold determining part 494 has determined that the first threshold has been exceeded, the color threshold determining part 494 notifies the requesting part 497 of this matter.

Further, the color threshold determining part 494 determines whether the color cumulative number of printed pages counted by the color cumulatively counting part 492 exceeds a second threshold. The second threshold is, for example, 300 pages. In a case where the color threshold determining part 494 has determined that the second threshold has been exceeded, the color threshold determining part 494 notifies the requesting part 497 of this matter.

The black threshold determining part 495 determines whether the black cumulative number of printed pages counted by the black cumulatively counting part 493 exceeds a third threshold. The third threshold is, for example, 200 pages. In a case where the black threshold determining part 495 has determined that the third threshold has been exceeded, the black threshold determining part 495 notifies the requesting part 497 of this matter.

Further, the black threshold determining part 495 determines whether the black cumulative number of printed pages counted by the black cumulatively counting part 493 exceeds a fourth threshold. The fourth threshold is, for example, 300 pages. In a case where the black threshold determining part 495 has determined that the fourth threshold has been exceeded, the black threshold determining part 495 notifies the requesting part 497 of this matter.

The mode determining part 496 determines a mode set by the setting part 491. For this purpose, the mode determining part 496, for example, determines the mode for which the flag is set in the mode setting storage area. The mode determining part 496 further determines whether a printing job for which printing is to be currently executed is a black printing job or a color printing job. For this purpose, the mode determining part 496 reads a set value included in the printing job, and determines whether the printing job is a black printing job or a color printing job. The mode determining part 496 notifies the correction control part 498 of the determination result.

The requesting part 497 sends an execution request to the correction control part 498 for positional error correction and/or adhesion amount correction for color printing, when the color threshold determining part 494 has determined that the first threshold has been exceeded. Further, the requesting part 497 sends an immediate execution request to the correction control part 498 for positional error correction and/or adhesion amount correction for color printing, when the color threshold determining part 494 has determined that the second threshold has been exceeded.

The requesting part 497 sends an execution request to the correction control part 498 for positional error correction and/or adhesion amount correction for black printing, when the black threshold determining part 495 has determined that the third threshold has been exceeded. Further, the requesting part 497 sends an immediate execution request to the correction control part 498 for positional error correction and/or adhesion amount correction for black printing, when the black threshold determining part 495 has determined that the fourth threshold has been exceeded.

The correction control part 498 controls execution of the above-mentioned positional error correction and/or adhesion amount correction according to predetermined conditions. The positional error correction and adhesion amount correction include those for color and those for black. For example, the correction control part 498 controls to execute positional error correction and/or adhesion amount correction for black without executing positional error correction and/or adhesion amount correction for color, in a case where the black mode is set, even in a case where the color threshold determining part 494 has determined that the first threshold has been exceeded. The other details will be described later.

Further, the correction control part 498 controls to immediately execute correction when a predetermined condition, described later, is met, when receiving the immediate execution request from the requesting part 497.

3.7 Mode Change Process

Figure 13:
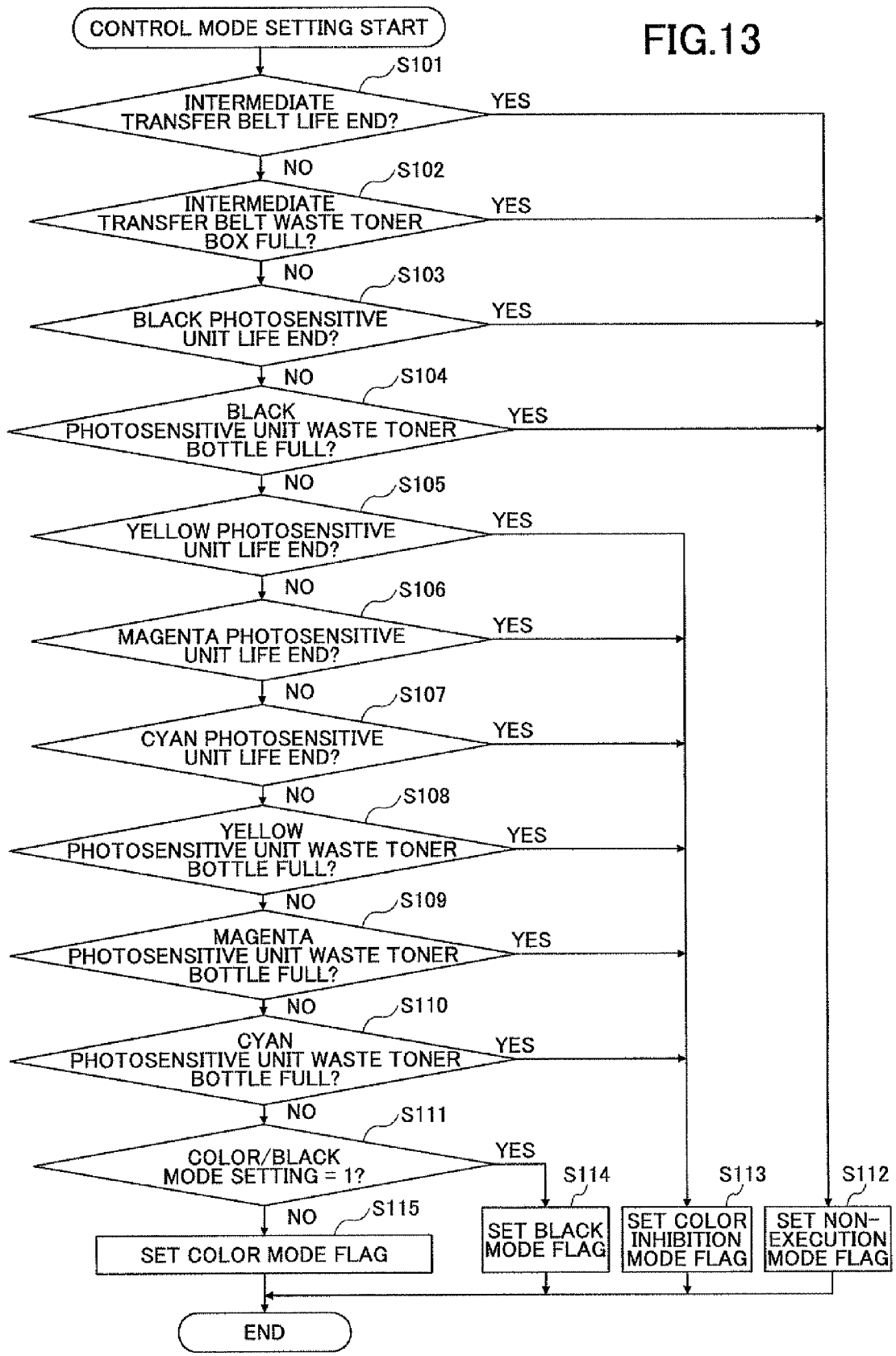
FIG. 13 is a flowchart showing a procedure of a process of moving to each mode.

FIG. 13 is a flowchart showing a mode change process to change to each mode. It is also noted that the processes shown in FIG. 13 and the subsequent flowcharts are executed by the CPU 49 according to the program stored in the ROM 51. The flow shown in FIG. 13 is controlled by the setting part 419 of the CPU 49.

In FIG. 13, the CPU 49 determines whether the service life of the intermediate transfer belt 5 has ended (step S101), whether the waste toner box in the intermediate transfer unit has become full (step S102), whether the service life of the Bk photosensitive unit 6Bk has ended (step S103), and whether the waste toner bottle in the Bk photosensitive unit 6Bk has become full (step S104).

The CPU 49 sets the non-execution mode flag (step S112) when having detected the end of the service life of the intermediate transfer belt 5 (Yes in step S101). The CPU 49 sets the non-execution mode flag (step S112) when having detected the full waste toner box in the intermediate transfer unit (Yes in step S102). The CPU 49 sets the non-execution mode flag (step S112) when having detected the end of the service life of the Bk photosensitive unit 6Bk (Yes in step S103). The CPU 49 sets the non-execution mode flag (step S112) when having detected the full waste toner bottle in the Bk photosensitive unit 6Bk (Yes in step S104).

When every one of the steps S101, S102, S103 and S104 is determined as No, the CPU 49 determines whether the service life of the photosensitive unit of each color Y, M and C has ended (steps S105, S106 and S107). When the end of the service life of at least one of the photosensitive units 6Y, 6M and 6C of the respective colors, Y, M and C, has been detected (Yes in at least one of steps S105, S106 and S107), the CPU 49 sets the color inhibition mode flag (step S113).

When every one of the steps S105, S106 and S107 is determined as No, the CPU 49 determines whether the waste toner bottle of the photosensitive unit of each color of the Y, M and C has become full (steps S108, S109 and S110). When the full waste toner bottle of at least one of the photosensitive units 6Y, 6M and 6C of the respective colors, Y, M and C, has been detected (Yes in at least one of steps S108, S109 and S110), the CPU 49 sets the color inhibition mode flag (step S113).

On the other hand, in a case where the determination result of none of the steps S108, S109 and S110 is No, i.e., every one of the waste toner bottles of the photosensitive units 6Y, 6M and 6C of the respective colors, Y, M and C, is full, one of the color mode flag and the black mode flag is set. This setting is executed according to whether the color mode or the black mode is set (step S111). The setting of the color mode or the black mode is executed by a manager or a user of the laser printer (MFP). Then, when the manager or the user has set the black mode (setting=1), the CPU 49 sets the black mode flag (step S114). When the manager or the user has not set the black mode (setting=0), the CPU 49 sets the color mode flag (step S115).

3.8 Clearing Control

Figure 14:
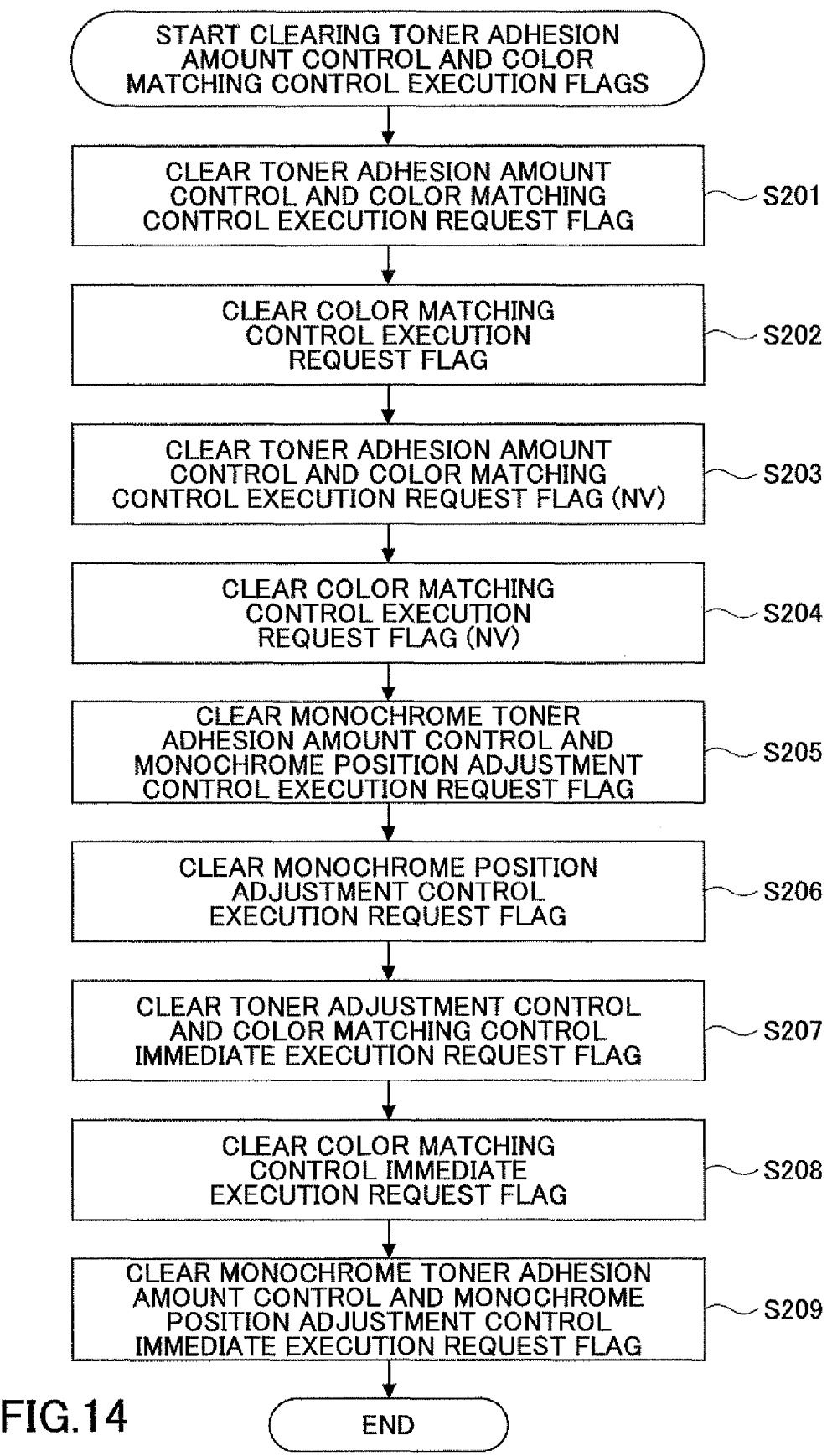
FIG. 14 is a flowchart showing a control process of clearing control in a case where toner adhesion amount control and color matching control are executed simultaneously.
Figure 15:
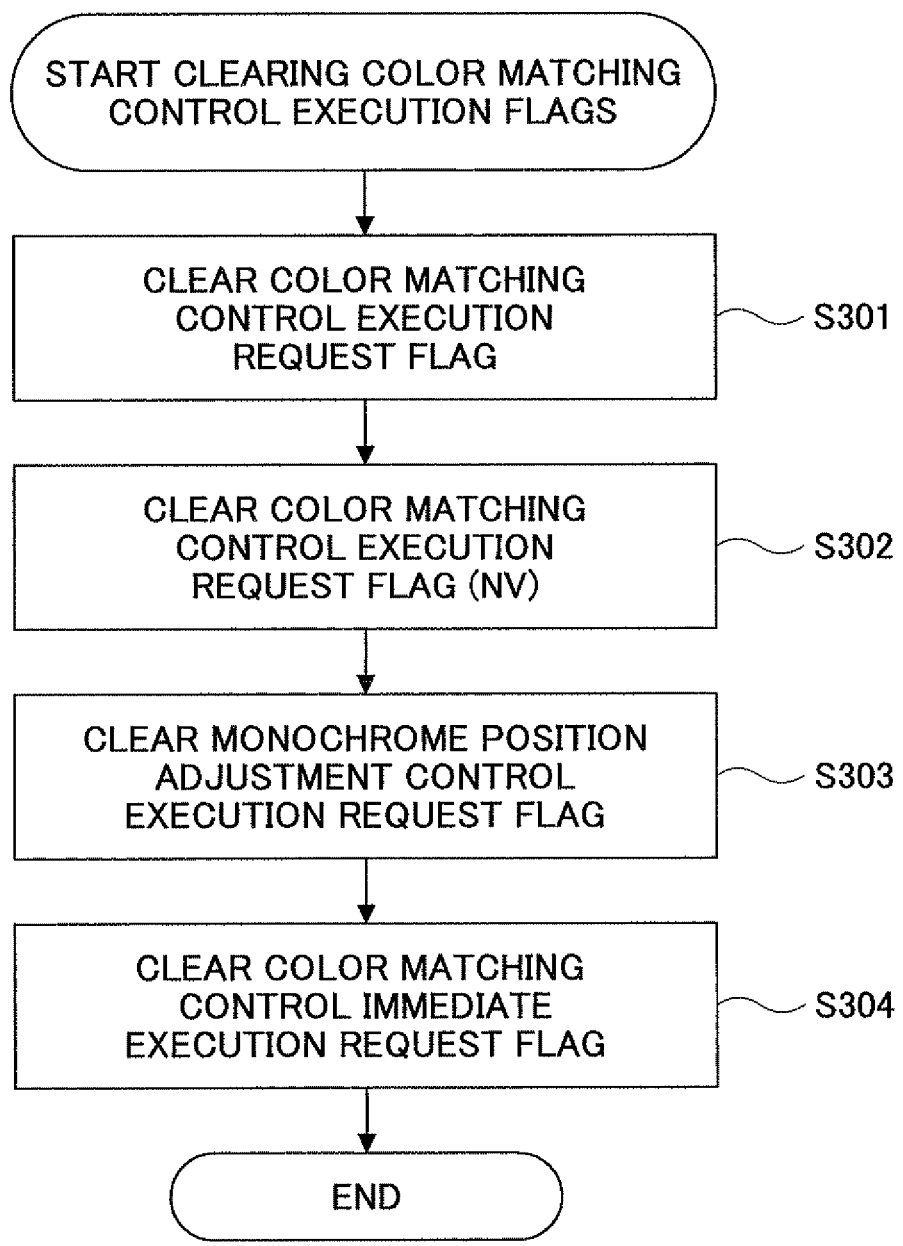
FIG. 15 is a flowchart showing a control procedure for clearing color matching control execution flags.
Figure 16:
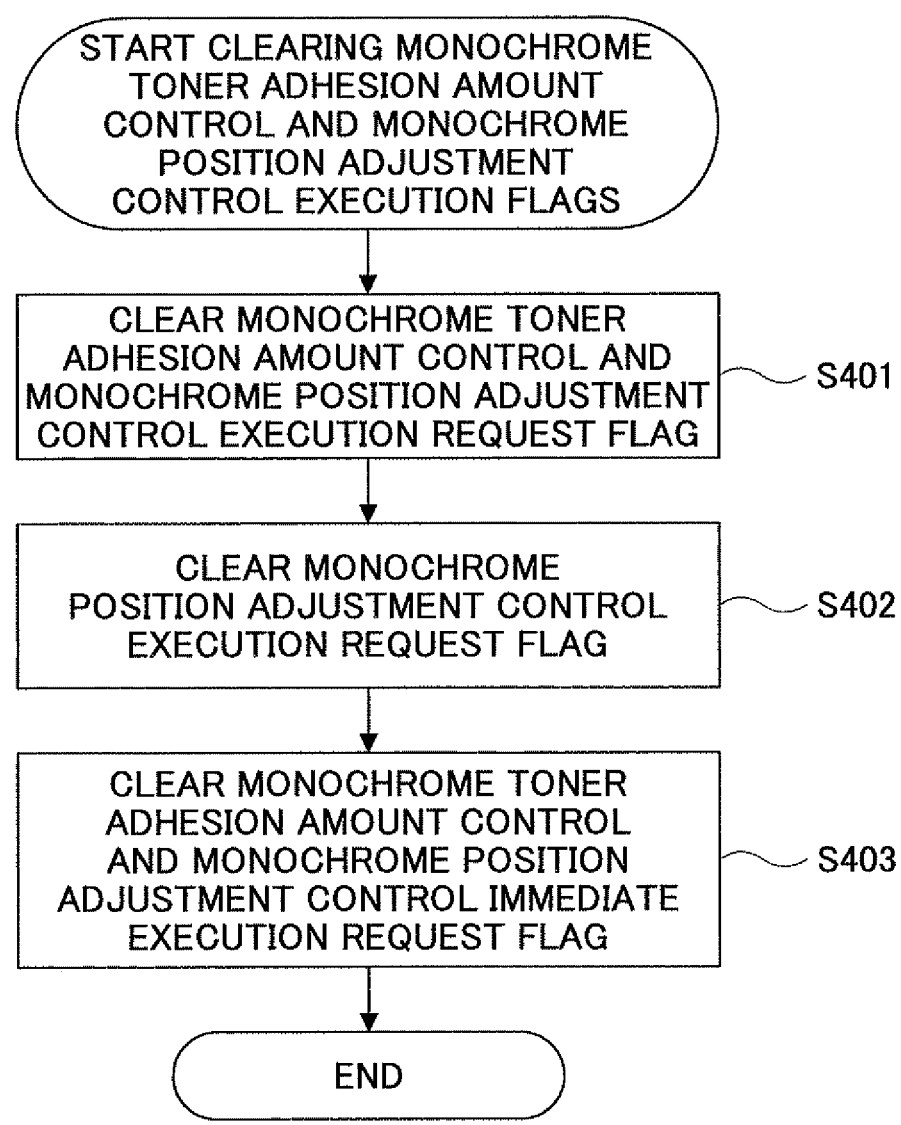
FIG. 16 is a flowchart showing a control procedure for clearing monochrome toner adhesion amount control and monochrome position adjustment control execution flags.
Figure 17:
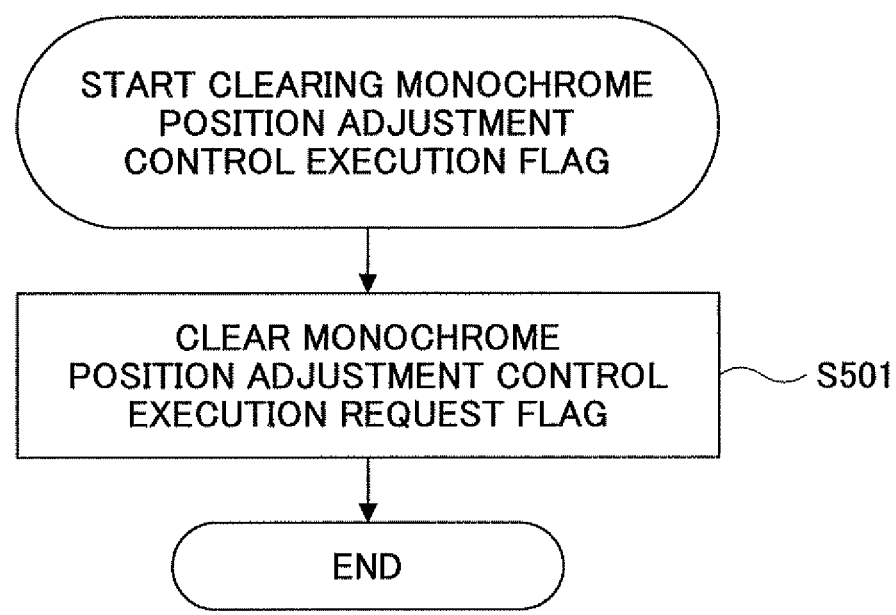
FIG. 17 is a flowchart showing a control procedure for clearing a monochrome position adjustment control execution flag.
Figure 18:
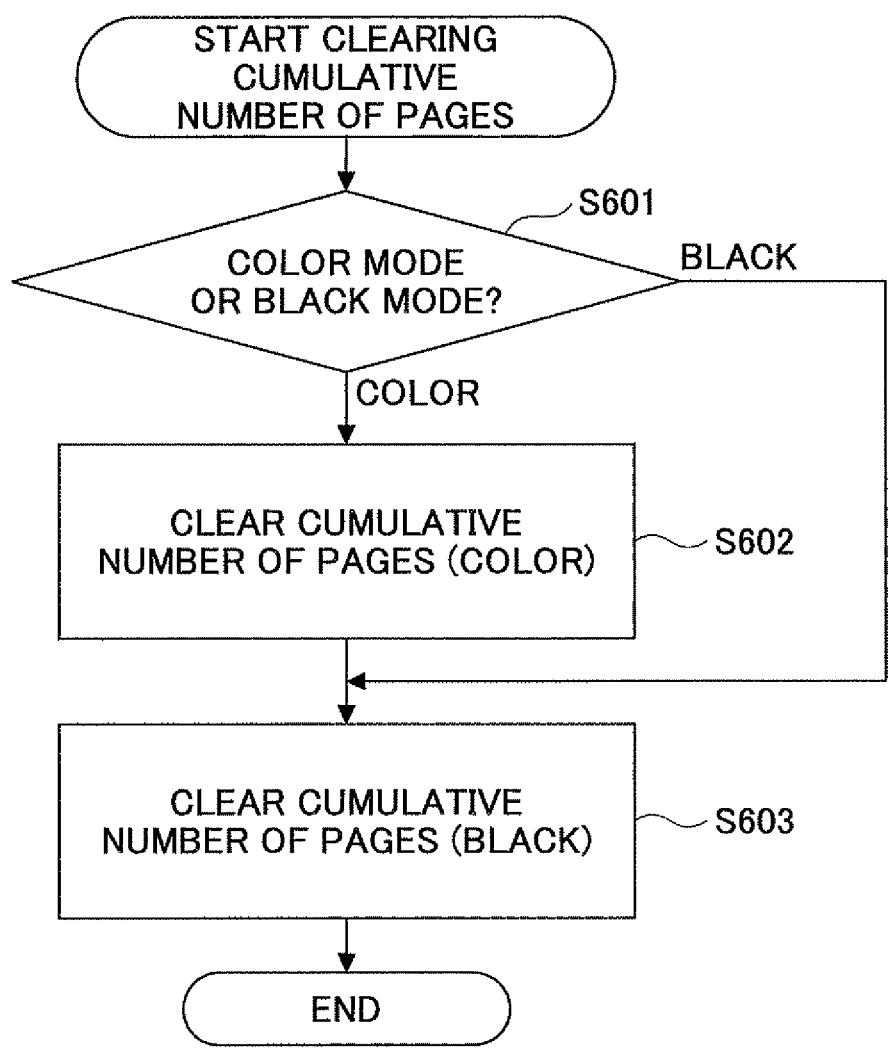
FIG. 18 is a flowchart showing a control procedure of clearing cumulative numbers of pages.

Before the above-mentioned positional error correction and the adhesion amount correction are executed, it is necessary to clear the corresponding execution flags and the counters for counting the number of printed pages. A control procedure of the clearing control for the execution flags will be described with reference to FIGS. 14 through 17, and a control procedure of the clearing control for the numbers of printed pages will be described with reference to FIG. 18. It is noted that processes of the respective flowcharts shown in FIGS. 14 through 18 are controlled by the correction control part 498 of the CPU 49. The clearing control includes the following six types (a) through (f):

(a) in a case where toner adhesion amount control and color matching control are executed simultaneously (FIG. 14);

(b) in a case where only color matching control is executed (FIG. 15);

(c) in a case where monochrome toner adhesion amount control and monochrome position adjustment control are executed simultaneously (FIG. 16);

(d) in a case where only monochrome position adjustment control is executed (FIG. 17);

(e) in a case where the counter for counting the number of printed pages is cleared when toner adhesion amount control and color matching control are executed simultaneously (FIG. 18); and (f) in a case where the counter for counting the number of printed pages is cleared when monochrome toner adhesion amount control and monochrome position adjustment control are executed simultaneously (FIG. 18).

The control procedures described below include process contents of respective processes described later with reference to FIGS. 19A through 19G.

FIG. 14 is a flowchart showing a control procedure for clearing toner adhesion amount control and color matching control execution flags before executing the toner adhesion amount control and color matching control simultaneously. In the procedure, first, the toner adhesion amount control and color matching control execution request flag is cleared from a volatile area (step S201). The toner adhesion amount control and color matching control execution request is a request to set the toner adhesion amount control and color matching control execution request flag in the volatile area or a non-volatile area (Non Volatile RAM, which may be simply referred to as NV). The control is executed at a time of the end of a printing job, during the printing operation. Otherwise, execution of the control is deferred until a time immediately before the start of a subsequent printing job, at a time of power being turned on, at a time of returning from sleep, or such.

Next, the color matching control execution request flag is cleared from a volatile area (step S202). The color matching control execution request is a request to set the color matching control execution request flag in the volatile area of a non-volatile area (NV). The control is executed at a time of the end of a printing job, during the printing operation. Otherwise, execution of the control is deferred until a time immediately before the start of a subsequent printing job, at a time of power being turned on, at a time of returning from sleep, or such.

After that, the CPU 49 clears both the toner adhesion amount control and color matching control execution request flag (NV) and the color matching control execution request flag (NV) (steps S203, S204). It is noted that the toner adhesion amount control and color matching control execution request flag set in the NV is referred to as the toner adhesion amount control and color matching control execution request flag (NV). Similarly, the color matching control execution request flag set in the NV is referred to as the color matching control execution request flag (NV).

Further, the CPU 49 clears both the monochrome toner adhesion amount control and monochrome position adjustment control execution request flag and the monochrome position adjustment control execution request flag (steps S205, S206). The monochrome toner adhesion amount control and monochrome position adjustment control execution request is a request to set the monochrome toner adhesion amount control and monochrome position adjustment control execution request flag. The control is executed at a time of the end of a printing job, during the printing operation. Otherwise, execution of the control is deferred until a time immediately before the start of a subsequent printing job, at a time of power being turned on, at a time of returning from sleep, or such. The monochrome position adjustment control execution request is a request to set the monochrome position adjustment control execution request flag.

Next, the CPU 49 clears respective ones of the toner adhesion amount control and color matching control immediate execution request flag, the color matching control immediate execution request flag, and the monochrome toner adhesion amount control and monochrome position adjustment control immediate execution request flag (steps S207, S208 and S209).

The toner adhesion amount control and color matching control immediate execution request is a request to set the toner adhesion amount control and color matching control immediate execution request flag, interrupt printing operations and immediately execute the toner adhesion amount control and color matching control. The color matching control immediate execution request is a request to set the color matching control immediate execution request flag, interrupt printing operations and immediately execute color matching control. The monochrome toner adhesion amount control and monochrome position adjustment control immediate execution request is a request to set the monochrome toner adhesion amount control and monochrome position adjustment control immediate execution request flag, interrupt printing operations and immediately execute the monochrome toner adhesion amount control and monochrome position adjustment control. However, a timing to interrupt the printing operation in each of the steps S207, S208 and S209 is a time after the completion of printing one page.

FIG. 15 is a flowchart showing a control procedure for clearing color matching control execution flags. In the control procedure, first, the CPU 49 clears the color matching control execution request flag (step S301), clears the color matching control execution request flag (NV) set in the NV (step S302), further clears the monochrome position adjustment control execution request flag (step S303), and finally, clears the color matching control immediate execution request flag (step S304).

FIG. 16 is a flowchart showing a control procedure for clearing monochrome toner adhesion amount control and monochrome position adjustment control execution flags. In the control procedure, first, the CPU 49 clears the monochrome toner adhesion amount control and monochrome position adjustment control execution request flag (step S401), clears the monochrome position adjustment control execution request flag (step S402) and finally, clears the monochrome toner adhesion amount control and monochrome position adjustment control immediate execution request flag (step S403).

FIG. 17 is a flowchart showing a control procedure for clearing a monochrome position adjustment control execution flag. In the control procedure, when the control is started, the CPU 49 clears the monochrome position adjustment control execution request flag (step S501).

FIG. 18 is a flowchart showing a control procedure of clearing the cumulative numbers of printed pages. In the control procedure, first, it is determined whether the printing mode is the color mode or the black mode (step S601). In a case where the determination result of step S601 is Yes (the color mode), the cumulative number of printed pages of color printing is cleared (step S602). In a case where the determination result of step S601 is No (the black mode), the cumulative number of printed pages of monochrome printing is cleared (step S603).

It is noted that the control procedures shown in the flowcharts of in FIGS. 14-18 are executed in the control operations shown in FIGS. 19A through 19G.

4 Control Execution Determination Timing and Criterion

As for the above-described toner adhesion amount control, color matching control, monochrome toner adhesion amount control and monochrome position adjustment control, it is determined whether to execute the respective ones based on criteria, and predetermined control operations are executed by the correction control part 498.

Below, description will be made for the respective control execution determination timings (i.e., timings to determine whether to execute the respective controls), criteria and control operations, for each control execution determination timing. It is noted that, as for the control execution determination timings and criteria, FIGS. 19A-19G show in a form of a table. Because FIGS. 19A-19G have plural pages, suffixes A-G are attached. However, FIGS. 19A-19G show one drawing as a whole.

4.1 Power Turned on (at a Time of Starting Up) (FIGS. 19*a*-19*b*)

At a time of the power being turned on in the laser printer, the following conditions are to be detected/determined:

1) replacement of Bk photosensitive unit;
2) replacement of M, C or Y photosensitive unit;
3) whether the intermediate transfer unit is a new one;
4) environmental variation;
5) other than the above-mentioned conditions 1) through 4):
6) whether toner adhesion amount control and color matching control execution request exists;
7) whether monochrome toner adhesion amount control and monochrome position adjustment control execution request exists;
8) whether color matching control execution request exists; and
9) whether monochrome position adjustment control execution request exists.

Then, the following controls are executed according to the detection/determination results:

4.1.1 At Time of Detection of Bk Photosensitive Unit Replacement

When replacement of the Bk photosensitive unit 68*k* is detected at a time of the power being turned on in the laser printer, the following control is executed according to each mode that is currently set in the laser printer:
 color mode: toner adhesion amount control and color matching control execution request;
 black mode: toner adhesion amount control and color matching control execution request (NV), and monochrome toner adhesion amount control and monochrome position adjustment control execution request;
 color inhibition mode: monochrome toner adhesion amount control and monochrome position adjustment control execution request; and
 non-execution mode: the machine (laser printer) is stopped.

4.1.2 At Time of Detection of M, C or Y Photosensitive Unit Replacement

When replacement of at least one of the M, C and Y photosensitive units 6M, 6C and 6Y is detected at a time of the power being turned on in the laser printer, the following control is executed according to each mode that is currently set in the laser printer:
 color mode: toner adhesion amount control and color matching control execution request;
 black mode: toner adhesion amount control and color matching control execution request (NV);
 color inhibition mode: no control execution; and
 non-execution mode: the machine (laser printer) is stopped.

4.1.3 At Time of Detection of New Intermediate Transfer Unit

When it is determined, at a time of the power being turned on in the laser printer, that the intermediate transfer unit is a new one, the following control is executed according to each mode that is currently set in the laser printer:
 color mode: toner adhesion amount control and color matching control execution request;
 black mode: toner adhesion amount control and color matching control execution request (NV), and monochrome toner adhesion amount control and monochrome position adjustment control execution request;
 color inhibition mode: monochrome toner adhesion amount control and monochrome position adjustment control execution request; and
 non-execution mode: the machine (laser printer) is stopped.

4.1.4 At Time of Detection of Environmental Variation

When it is determined, at a time of the power being turned on in the laser printer, that an environmental variation has occurred, the following control is executed according to each mode that is currently set in the laser printer:
 color mode: toner adhesion amount control and color matching control execution request;
 black mode: toner adhesion amount control and color matching control execution request, and monochrome toner adhesion amount control and monochrome position adjustment control execution request;
 color inhibition mode: monochrome toner adhesion amount control and monochrome position adjustment control execution request;
 non-execution mode: the machine (laser printer) is stopped.

4.1.5 At Time of Detection of Other than 4.1.1 through 4.1.4

When it is determined, at a time of the power being turned on in the laser printer, that another condition has been detected other than the Bk photosensitive unit replacement, the M, C or Y photosensitive unit replacement, the new intermediate transfer unit and an environmental variation, the following control is executed according to each mode that is currently set in the laser printer:
 color mode: color matching control execution request;
 black mode: color matching control execution request (NV), and monochrome position adjustment control execution request;
 color inhibition mode: monochrome position adjustment control execution request;
 non-execution mode: the machine (laser printer) is stopped.

4.1.6 At Time of Detection of Existence of Toner Adhesion Amount Control and Color Matching Control Execution Request When it is determined, at a time of the power being turned on in the laser printer, that a toner adhesion amount control and color matching control execution request exists, the following control is executed according to each mode that is currently set in the laser printer:

color mode: toner adhesion amount control and color matching control execution;
black mode: no control execution;
color inhibition mode: no control execution;
non-execution mode: the machine (laser printer) is stopped.

4.1.7 At Time of Detection of Existence of Monochrome Toner Adhesion Amount Control and Monochrome Position Adjustment Control Execution Request When it is determined, at a time of the power being turned on in the laser printer, that a monochrome toner adhesion amount control and monochrome position adjustment control execution request exists, the following control is executed according to each mode that is currently set in the laser printer:

color mode: no control execution;
black mode: monochrome toner adhesion amount control and monochrome position adjustment control execution;
color inhibition mode: monochrome toner adhesion amount control and monochrome position adjustment control execution; and
non-execution mode: the machine (laser printer) is stopped.

4.1.8 At Time of Detection of Existence of Color Matching Control Execution Request When it is determined, at a time of the power being turned on in the laser printer, that a color matching control execution request exists, the following control is executed according to each mode that is currently set in the laser printer:

color mode: color matching control execution;
black mode: no control execution;
color inhibition mode: no control execution; and
non-execution mode: the machine (laser printer) is stopped.

4.1.9 At Time of Detection of Existence of Monochrome Position Adjustment Control Execution Request When it is determined, at a time of the power being turned on in the laser printer, that a monochrome position adjustment control execution request exists, the following control is executed according to each mode that is currently set in the laser printer:

color mode: no control execution;
black mode: monochrome position adjustment control execution;
color inhibition mode: monochrome position adjustment control execution; and
non-execution mode: the machine (laser printer) is stopped.

It is noted that, in the embodiment, when none of the above-mentioned criteria 1) through 8) is detected, a process is executed based on a monochrome position adjustment execution request. At this time, no position adjustment control is executed in the color mode. Monochrome position adjustment control is executed in any one of the black mode and the color inhibition mode, and thus, the laser printer enters a state in which a monochrome image can be formed. In a case where a color image is to be formed after that, when a toner adhesion amount control and color matching control execution request occurs before the start of a job (color) shown in FIG. 19D described later, toner adhesion amount control and color matching control are executed because color printing is to be executed.

4.2 Returning from Sleep Mode (FIGS. 19B-19C)

When the laser printer returns from a sleep mode, the following conditions are to be detected/determined:

1) replacement of Bk photosensitive unit;
2) replacement of M, C or Y photosensitive unit;
3) whether the intermediate transfer unit is new;
4) environmental variation;
5) temperature increase in the LSU in the previous control;
6) another than the above-mentioned conditions 1) through 5):
7) whether toner adhesion amount control and color matching control execution request exists;
8) whether monochrome toner adhesion amount control and monochrome position adjustment control execution request exists; and
9) whether color matching control execution request exists.

Then, the following controls are executed according to the detection/determination results:

4.2.1 At Time of Detection of Bk Photosensitive Unit Replacement

When replacement of the Bk photosensitive unit 6Bk is detected at a time of the laser printer returning from a sleep mode, the following control is executed according to each mode that is currently set in the laser printer:

color mode: toner adhesion amount control and color matching control execution request;
black mode: toner adhesion amount control and color matching control execution request (NV), and monochrome toner adhesion amount control and monochrome position adjustment control execution request;
color inhibition mode: monochrome toner adhesion amount control and monochrome position adjustment control execution request; and
non-execution mode: the machine (laser printer) is stopped.

4.2.2 At Time of Detection of M, C or Y Photosensitive Unit Replacement

When replacement of at least one of the M, C and Y photosensitive units 6M, 6C and 6Y is detected at a time of the laser printer returning from the sleep mode, the following control is executed according to each mode that is currently set in the laser printer:

color mode: toner adhesion amount control and color matching control execution request;
black mode: toner adhesion amount control and color matching control execution request (NV);
color inhibition mode: no control execution; and
non-execution mode: the machine (laser printer) is stopped.

4.2.3 At Time of Detection of New Intermediate Transfer Unit

When it is determined, at a time of the laser printer returning from the sleep mode, that the intermediate transfer unit is new, the following control is executed according to each mode that is currently set in the laser printer:

color mode: toner adhesion amount control and color matching control execution request;
black mode: toner adhesion amount control and color matching control execution request (NV), and monochrome toner adhesion amount control and monochrome position adjustment control execution request;
color inhibition mode: monochrome toner adhesion amount control and monochrome position adjustment control execution request; and
non-execution mode: the machine (laser printer) is stopped.

4.2.4 At Time of Detection of Environmental Variation

When it is determined, at a time of the laser printer returning from the sleep mode, that an environment variation has occurred, the following control is executed according to each mode that is currently set in the laser printer:
- color mode: toner adhesion amount control and color matching control execution request;
- black mode: toner adhesion amount control and color matching control execution request, and monochrome toner adhesion amount control and monochrome position adjustment control execution request;
- color inhibition mode: monochrome toner adhesion amount control and monochrome position adjustment control execution request;
- non-execution mode: the machine (laser printer) is stopped.

4.2.5 Whether Previous Control is in LSU Temperature Increase State

When it is determined, at a time of the laser printer returning from the sleep mode, that the previous control was in the LSU temperature increase state, the following control is executed according to each mode that is currently set in the laser printer:
- color mode: color matching control execution request;
- black mode: no control execution;
- color inhibition mode: no control execution; and
- non-execution mode: the machine (laser printer) is stopped.

4.2.6 At Time of Detection of Other than 4.2.1 through 4.2.5

When it is determined, at a time of the laser printer returning from the sleep mode, that another condition has been detected other than the Bk photosensitive unit replacement, the M, C or Y photosensitive unit replacement, the new intermediate transfer unit, an environmental variation and the previous control being in the LSU temperature increase state, the following control is executed according to each mode that is currently set in the laser printer:
- color mode: no control execution;
- black mode: no control execution;
- color inhibition mode: no control execution; and
- non-execution mode: the machine (laser printer) is stopped.

4.2.7 At Time of Detection of Existence of Toner Adhesion Amount Control and Color Matching Control Execution Request When it is determined, at a time of the laser printer returning from the sleep mode, that a toner adhesion amount control and color matching control execution request exists, the following control is executed according to each mode that is currently set in the laser printer:
- color mode: toner adhesion amount control and color matching control execution;
- black mode: no control execution;
- color inhibition mode: no control execution; and
- non-execution mode: the machine (laser printer) is stopped.

4.2.8 At Time of Detection of Existence of Monochrome Toner Adhesion Amount Control and Monochrome Position Adjustment Control Execution Request When it is determined, at a time of the laser printer returning from the sleep mode, that a monochrome toner adhesion amount control and monochrome position adjustment control execution request exists, the following control is executed according to each mode that is currently set in the laser printer:
- color mode: no control execution;
- black mode: monochrome toner adhesion amount control and monochrome position adjustment control execution;
- color inhibition mode: monochrome toner adhesion amount control and monochrome position adjustment control execution; and
- non-execution mode: the machine (laser printer) is stopped.

4.2.9 At Time of Detection of Existence of Color Matching Control Execution Request When it is determined, at a time of the laser printer returning from the sleep mode, that a color matching control execution request exists, the following control is executed according to each mode that is currently set in the laser printer:
- color mode: color matching control execution;
- black mode: no control execution;
- color inhibition mode: no control execution; and
- non-execution mode: the machine (laser printer) is stopped.

4.3 Before Start of Job (Color) (FIG. 19D)

Before the start of a job to form a color image, the following conditions are to be detected/determined:

1) whether a toner adhesion amount control and color matching control execution request exists;

2) whether a monochrome toner adhesion amount control and monochrome position adjustment control execution request exists; and 3) whether a color matching control execution request exists.

Then, the following controls are executed according to the detection/determination results:

4.3.1 At Time of Detection of Existence of Toner Adhesion Amount Control and Color Matching Control Execution Request When it is determined, before the start of a job to form a color image, that a toner adhesion amount control and color matching control execution request exists, the following control is executed according to each mode that is currently set in the laser printer:
- color mode: toner adhesion amount control and color matching control execution;
- black mode: toner adhesion amount control and color matching control execution;
- color inhibition mode: no operation setting; and
- non-execution mode: no operation setting.

4.3.2 At Time of Detection of Existence of Monochrome Toner Adhesion Amount Control and Monochrome Position Adjustment Control Execution Request When it is determined, before the start of a job to form a color image, that a monochrome toner adhesion amount control and monochrome position adjustment control execution request exists, the following control is executed according to each mode that is currently set in the laser printer:
- color mode: no control execution;
- black mode: no control execution;
- color inhibition mode: no operation setting; and
- non-execution mode: no operation setting.

4.3.3 At Time of Detection of Existence of Color Matching Control Execution Request When it is determined, before the start of a job to form a color image, that a color matching control execution request exists, the following control is executed according to each mode that is currently set in the laser printer:

color mode: color matching control execution;
black mode: color matching control execution;
color inhibition mode: no operation setting; and
non-execution mode: no operation setting.

4.4 Before Start of Job (Monochrome) (FIG. 19D)

Before the start of a job to form a monochrome image, the following conditions are to be detected/determined:

1) whether a toner adhesion amount control and color matching control execution request exists;
2) whether a monochrome toner adhesion amount control and monochrome position adjustment control execution request exists; and
3) whether a color matching control execution request exists.

Then, the following controls are executed according to the detection/determination results:

4.4.1 At Time of Detection of Existence of Toner Adhesion Amount Control and Color Matching Control Execution Request When it is determined, before the start of a job to form a monochrome image, that a toner adhesion amount control and color matching control execution request exists, the following control is executed according to each mode that is currently set in the laser printer:

color mode: toner adhesion amount control and color matching control execution;
black mode: no control execution;
color inhibition mode: no control execution; and
non-execution mode: no operation setting.

4.4.2 At Time of Detection of Existence of Monochrome Toner Adhesion Amount Control and Monochrome Position Adjustment Control Execution Request When it is determined, before the start of a job to form a monochrome image, that a monochrome toner adhesion amount control and monochrome position adjustment control execution request exists, the following control is executed according to each mode that is currently set in the laser printer:

color mode: no control execution;
black mode: monochrome toner adhesion amount control and monochrome position adjustment control execution;
color inhibition mode: monochrome toner adhesion amount control and monochrome position adjustment control execution; and
non-execution mode: no operation setting.

4.4.3 At Time of Detection of Existence of Color Matching Control Execution Request When it is determined, before the start of a job to form a monochrome image, that a color matching control execution request exists, the following control is executed according to each mode that is currently set in the laser printer:

color mode: color matching control execution;
black mode: no control execution;
color inhibition mode: no control execution; and
non-execution mode: no control execution.

4.5 Page End (Color) (FIG. 19E)

When page end (the end of printing of one page) occurs during color image forming, the following conditions are to be detected/determined:

1) environmental variation;
2) whether the cumulative number of printed pages after previous toner adhesion amount control and color matching control execution has reached a control request threshold;
3) whether the cumulative number of printed pages after previous monochrome toner adhesion amount control and monochrome position adjustment control has reached a control request threshold;
4) whether the cumulative number of printed pages after previous toner adhesion amount control and color matching control execution has reached an immediate execution threshold;
5) whether the cumulative number of printed pages after previous monochrome toner adhesion amount control and monochrome position adjustment control has reached an immediate execution threshold;
6) a time of driving of the polygon motor during a reference monitoring time has reached a control request threshold; and
7) a time of driving of the polygon motor during a reference monitoring time has reached an immediate execution threshold.

Then, the following controls are executed according to the detection/determination results:

4.5.1 Detection of Environmental Variation

When an environmental variation is detected at a time of page end, the following control is executed according to each mode that is currently set in the laser printer:

color mode: toner adhesion amount control and color matching control immediate execution request;
black mode: toner adhesion amount control and color matching control immediate execution request;
color inhibition mode: no control setting; and
non-execution mode: no control setting.

4.5.2 Case Where Cumulative Number of Printed Pages After Previous Toner Adhesion. Amount Control and Color Matching Control Execution Has Reached Control Request Threshold When it is determined, at a time of page end, that the cumulative number of printed pages after previous toner adhesion amount control and color matching control execution has reached a control request threshold, the following control is executed according to each mode that is currently set in the laser printer:

color mode: toner adhesion amount control and color matching control execution request;
black mode: toner adhesion amount control and color matching control execution request;
color inhibition mode: no control setting; and
non-execution mode: no control setting.

4.5.3 Case Where Cumulative Number of Printed Pages After Previous Monochrome Toner Adhesion Amount Control and Monochrome Position Adjustment Control Execution Has Reached Control Request Threshold When it is determined, at a time of page end, that the cumulative number of printed pages after previous monochrome toner adhesion amount control and monochrome position adjustment control execution has reached a control request threshold, the following control is executed according to each mode that is currently set in the laser printer:

color mode: toner adhesion amount control and color matching control execution request;
black mode: toner adhesion amount control and color matching control execution request;
color inhibition mode: no control setting; and
non-execution mode: no control setting.

4.5.4 Case Where Cumulative Number of Printed Pages After Previous Toner Adhesion Amount Control and Color Matching Control Execution Has Reached Immediate Execution Threshold When it is determined, at a time of page end, that the cumulative number of printed pages after previous toner adhesion amount control and color matching control execution has reached an immediate execution threshold, the following control is executed according to each mode that is currently set in the laser printer:

color mode: toner adhesion amount control and color matching control immediate execution request;

black mode: toner adhesion amount control and color matching control immediate execution request;

color inhibition mode: no control setting; and non-execution mode: no control setting.

4.5.5 Case Where Cumulative Number of Printed Pages After Previous Monochrome Toner Adhesion Amount Control and Monochrome Position Adjustment Control Execution Has Reached Immediate Execution Threshold When it is determined, at a time of page end, that the cumulative number of printed pages after previous monochrome toner adhesion amount control and monochrome position adjustment control execution has reached an immediate execution threshold, the following control is executed according to each mode that is currently set in the laser printer:

color mode: toner adhesion amount control and color matching control immediate execution request;

black mode: toner adhesion amount control and color matching control immediate execution request;

color inhibition mode: no control setting; and non-execution mode: no control setting.

4.5.6 Case Where Time of Driving of Polygon Motor During Reference Monitoring Time has Reached Control Request Threshold When it is determined, at a time of page end, that a time of driving of the polygon motor during a reference monitoring time has reached a control request threshold, the following control is executed according to each mode that is currently set in the laser printer:

color mode: color matching control execution request;

black mode: color matching control execution request;

color inhibition mode: no control setting; and non-execution mode: no control setting.

4.5.7 Case Where Time of Driving of Polygon Motor During Reference Monitoring Time has Reached Immediate Execution Threshold When it is determined, at a time of page end, that a time of driving of the polygon motor during a reference monitoring time has reached an immediate execution threshold, the following control is executed according to each mode that is currently set in the laser printer:

color mode: color matching control immediate execution request;

black mode: color matching control immediate execution request;

color inhibition mode: no control setting; and non-execution mode: no control setting.

4.6 Page End (Monochrome) (FIG. 19F)

When page end (the end of printing of one page) occurs during monochrome image forming, the following conditions are to be detected/determined:

1) environmental variation;

2) whether the cumulative number of printed pages after previous toner adhesion amount control and color matching control execution has reached a control request threshold;

3) whether the cumulative number of printed pages after previous monochrome toner adhesion amount control and monochrome position adjustment control has reached a control request threshold;

4) whether the cumulative number of printed pages after previous toner adhesion amount control and color matching control execution has reached an immediate execution threshold;

5) whether the cumulative number of printed pages after previous monochrome toner adhesion amount control and monochrome position adjustment control has reached an immediate execution threshold;

6) a time of driving of the polygon motor during a reference monitoring time has reached a control request threshold; and 7) a time of driving of the polygon motor during a reference monitoring time has reached an immediate execution threshold.

Then, the following controls are executed according to the detection/determination results:

4.6.1 Detection of Environment Variation

When an environmental variation is detected at a time of page end, the following control is executed according to each mode that is currently set in the laser printer:

color mode: toner adhesion amount control and color matching control immediate execution request;

black mode: toner adhesion amount control and color matching control immediate execution request, and monochrome toner adhesion amount control and monochrome position adjustment control immediate execution request;

color inhibition mode: monochrome toner adhesion amount control and monochrome position adjustment control immediate execution request; and non-execution mode: no control setting.

4.6.2 Case where Cumulative Number of Printed Pages after Previous Toner Adhesion Amount Control and Color Matching Control Execution has Reached Control Request Threshold When it is determined, at a time of page end, that the cumulative number of printed pages after previous toner adhesion amount control and color matching control execution has reached a control request threshold, the following control is executed according to each mode that is currently set in the laser printer:

color mode: toner adhesion amount control and color matching control execution request;

black mode: no control execution;

color inhibition mode: no control execution; and non-execution mode: no control setting.

4.6.3 Case where Cumulative Number of Printed Pages after Previous Monochrome Toner Adhesion Amount Control and Monochrome Position Adjustment Control Execution has Reached Control Request Threshold When it is determined, at a time of page end, that the cumulative number of printed pages after previous monochrome toner adhesion amount control and monochrome position adjustment control execution has reached a control request threshold, the following control is executed according to each mode that is currently set in the laser printer:

color mode: no control execution;

black mode: monochrome toner adhesion amount control and monochrome position adjustment control execution request;

color inhibition mode: monochrome toner adhesion amount control and monochrome position adjustment control execution request; and non-execution mode: no control setting.

4.6.4 Case where Cumulative Number of Printed Pages after Previous Toner Adhesion Amount Control and Color Matching Control Execution has Reached Immediate Execution Threshold When it is determined, at a time of page end, that the cumulative number of printed pages after previous toner adhesion amount control and color matching control execution has reached a immediate execution threshold, the following control is executed according to each mode that is currently set in the laser printer:

color mode: toner adhesion amount control and color matching control immediate execution request;
black mode: no control execution;
color inhibition mode: no control execution; and
non-execution mode: no control setting.

4.6.5 Case where Cumulative Number of Printed Pages after Previous Monochrome Toner Adhesion Amount Control and Monochrome Position Adjustment Control Execution has Reached Immediate Execution Threshold When it is determined, at a time of page end, that the cumulative number of printed pages after previous monochrome toner adhesion amount control and monochrome position adjustment control execution has reached an immediate execution threshold, the following control is executed according to each mode that is currently set in the laser printer:

color mode: no control execution;
black mode: monochrome toner adhesion amount control and monochrome position adjustment control immediate execution request;
color inhibition mode: monochrome toner adhesion amount control and monochrome position adjustment control immediate execution request; and
non-execution mode: no control setting.

4.6.6 Case where Time of Driving of Polygon Motor During Reference Monitoring Time has Reached Control Request Threshold When it is determined, at a time of page end, that a time of driving of the polygon motor during a reference monitoring time has reached a control request threshold, the following control is executed according to each mode that is currently set in the laser printer:

color mode: color matching control execution request;
black mode: no control execution;
color inhibition mode: no control execution; and
non-execution mode: no control setting.

4.6.7 Case where Time of Driving of Polygon Motor During Reference Monitoring Time has Reached Immediate Execution Threshold When it is determined, at a time of page end, that a time of driving of the polygon motor during a reference monitoring time has reached an immediate execution threshold, the following control is executed according to each mode that is currently set in the laser printer:

color mode: color matching control immediate execution request;
black mode: no control execution;
color inhibition mode: no control execution; and
non-execution mode: no control setting.

4.7 Job End (Color) (FIG. 19G)

When job end (the end of a printing job) occurs during color image forming, the following conditions are to be detected/determined:

1) whether a toner adhesion amount control and color matching control execution request exists;
2) whether a monochrome toner adhesion amount control and monochrome position adjustment control execution request exists; and
3) whether a color matching control execution request exists;

Then, the following controls are executed according to the detection/determination results:

4.7.1 Detection of Toner Adhesion Amount Control and Color Matching Control Execution Request When a toner adhesion amount control and color matching control execution request is detected at a time of job end during color image forming, the following control is executed according to each mode that is currently set in the laser printer:

color mode: toner adhesion amount control and color matching control execution;
black mode: no control execution;
color inhibition mode: no control setting; and
non-execution mode: no control setting.

4.7.2 Detection of Monochrome Toner Adhesion Amount Control and Monochrome Position Adjustment Control Execution Request When a monochrome toner adhesion amount control and monochrome position adjustment control execution request is detected at a time of job end during color image forming, the following control is executed according to each mode that is currently set in the laser printer:

color mode: no control execution;
black mode: monochrome toner adhesion amount control and monochrome position adjustment control execution;
color inhibition mode: no control setting; and
non-execution mode: no control setting.

4.7.3 Detection of Color Matching Control Execution Request

When a color matching control execution request is detected at a time of job end during color image forming, the following control is executed according to each mode that is currently set in the laser printer:

color mode: color matching control execution;
black mode: no control execution;
color inhibition mode: no control setting; and
non-execution mode: no control setting.

4.8 Job End (Monochrome) (FIG. 19G)

When job end (the end of a printing job) occurs during monochrome image forming, the following conditions are to be detected/determined:

1) whether a toner adhesion amount control and color matching control execution request exists;
2) whether a monochrome toner adhesion amount control and monochrome position adjustment control execution request exists; and
3) whether a color matching control execution request exists;

Then, the following controls are executed according to the detection/determination results:

4.8.1 Detection of Toner Adhesion Amount Control and Color Matching Control Execution Request When a toner adhesion amount control and color matching control execution request is detected at a time of job end during monochrome image forming, the following control is executed according to each mode that is currently set in the laser printer:

color mode: toner adhesion amount control and color matching control execution;
black mode: no control execution;
color inhibition mode: no control execution; and
non-execution mode: no control setting.

4.8.2 Detection of Monochrome Toner Adhesion Amount Control and Monochrome Position Adjustment Control Execution Request When a monochrome toner adhesion amount control and monochrome position adjustment control execution request is detected at a time of job end during monochrome image forming, the following control is executed according to each mode that is currently set in the laser printer:
color mode: no control execution;
black mode: monochrome toner adhesion amount control and monochrome position adjustment control execution;
color inhibition mode: monochrome toner adhesion amount control and monochrome position adjustment control execution; and
non-execution mode: no control setting.

4.8.3 Detection of Color Matching Control Execution Request

When a color matching control execution request is detected at a time of job end during monochrome image forming, the following control is executed according to each mode that is currently set in the laser printer:
color mode: color matching control execution;
black mode: no control execution;
color inhibition mode: no control execution; and
non-execution mode: no control setting.

5 Control Procedure

For a process at each timing shown in FIGS. 19A-19G, one example of a control procedure will now be described.

5.1 Process at Time of Printing Operation

Figure 20:
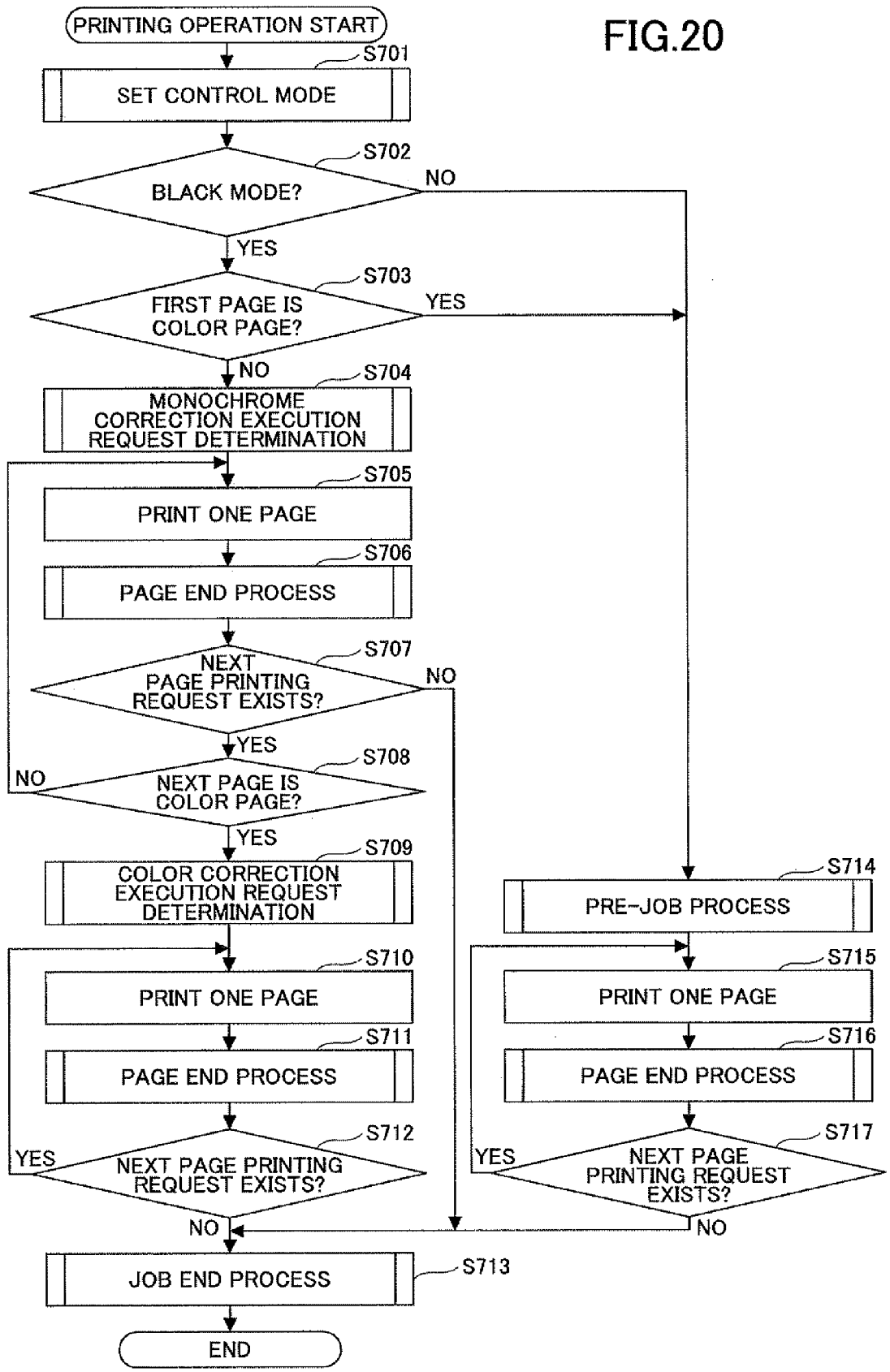
FIG. 20 is a flowchart showing one example of a process of printing operation.

FIG. 20 is a flowchart showing one example of a process of a printing operation. The process shown in FIG. 20 is also executed by the CPU 49. First, when a printing operation is started, a control mode setting process is executed (step S701). The control mode stetting process is a process shown in FIG. 13.

It is determined whether the control mode is the black mode (Bk mode) (step S702). In a case where the control mode is the black mode, step S703 is executed. In a case where the control mode is not the black mode, step S714 is executed.

In step S703, when printing is executed, it is determined whether the first page is a color page. When the first page is a color page, step S714 is executed. When the first page is a monochrome page, step S704 is executed.

In step S704, a monochrome correction execution request determination process is executed. As to the monochrome correction execution request determination process, description will be made with reference to FIG. 22, later.

Next, printing of one page is executed (step S705), and a page end process is executed (step S706). As for the page end process, description will be later made with reference to FIG. 24.

After the page end process, it is determined whether a printing request for a next page exists (step S707). When a printing request for a next page exists, step S708 is executed. When no printing request for a next page exists, step S713 is executed.

In step S708, it is determined whether the next page is a color page. When the next page is not a color page, the process is returned to step S705. When the next page is a color page, step S709 is executed.

In step S709, a color correction execution request determination process is executed. As for the color correction execution request determination process, description will be made with reference to FIG. 21, later. Next, printing of one page is executed (step S710), and a page end process is executed (step S711).

Next, it is determined whether a printing request for a next page exists (step S712). When a printing request for a next page exists, the process is returned to the step S710. When a printing request for a next page does not exist, step S713 is executed. In step S713, a job end process is executed. As for the job end process, description will be made later with reference to FIG. 26.

In a case where the determination result of step S702 is No, or in a case where the determination result of step S703 is Yes, a pre-job process is executed (step S714). As to the pre-job process, description will be made later with reference to FIG. 23. After the pre-job process, printing of one page is executed (step S715), a page end process is executed (step S716), and it is determined whether a printing request for a next page exists (step S717). When a request for a next page exists, the process is returned to step S715. When a request for a next page does not exist, step S713 is executed. The page end process of any of steps S706, S711 and S716 is a process shown in FIG. 24.

5.2 Color Correction Execution Request Determination

Figure 21:
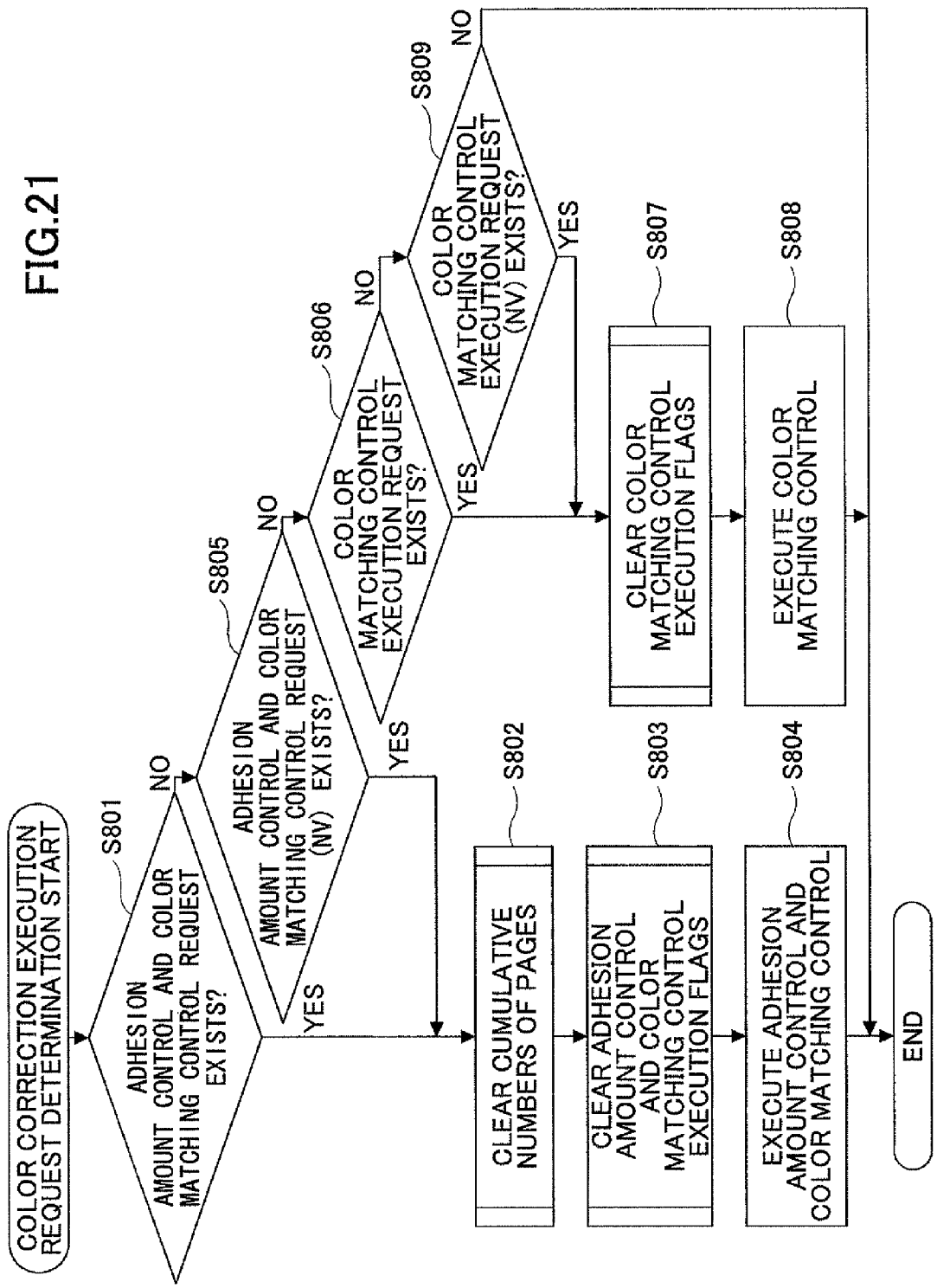
FIG. 21 is a flowchart showing one example of a process of color correction execution request determination.

FIG. 21 is a flowchart showing one example of the color correction execution request determination process. A process shown in FIG. 21 is executed by the CPU 49. First, it is determined whether a toner adhesion amount control (adhesion amount control) and color matching control execution request exists (step S801). For example, the CPU 49 determines whether a flag is set in a predetermined storage area. When the determination result of step S801 is Yes, the CPU 49 clears the cumulative numbers of printed pages (step S802). This clearing process is the process shown in FIG. 18.

Next, the CPU 49 clears the toner adhesion amount control and color matching control execution flags (step S803). This process is the process shown in FIG. 14.

After clearing the flags, the CPU 49 executes the toner adhesion amount control and color matching control (step S804). The toner adhesion amount control and color matching control are those described above. That is, the CPU 49 forms the respective correction patterns, detects the correction patterns by using the TM sensors 17-19, and executes the respective correction controls based on the detection amounts (outputs) of the TM sensors 17-19.

When the determination result of step S801 is No, the CPU 49 determines whether a toner adhesion amount control and color matching control execution request (NV) exists (step S805). This determination is executed by determining whether a flag is set in a predetermined non-volatile storage area.

When the determination result of step S805 is Yes, step S802 is executed. When the determination result of step S805 is No, the CPU 49 determines whether a color matching control execution request exists (step S806). This determination is executed by determining whether a flag is set in a predetermined storage area.

When the determination result of step S806 is Yes, the CPU 49 clears the color matching control execution flags (step S807). This clearing process is the process shown in FIG. 15.

After clearing the flags, the CPU 49 executes color matching control (step S808). The color matching control is the control described above.

When the determination result of step S806 is No, the CPU 49 determines whether a color matching control execution request (NV) exists (step S809). This determination is executed by determining whether a flag is set in a predetermined non-volatile storage area. When the determination result of step S809 is Yes, step S807 is executed. When the determination result of step S809 is No, the process is finished.

5.3 Monochrome Correction Execution Request Determination

Figure 22:
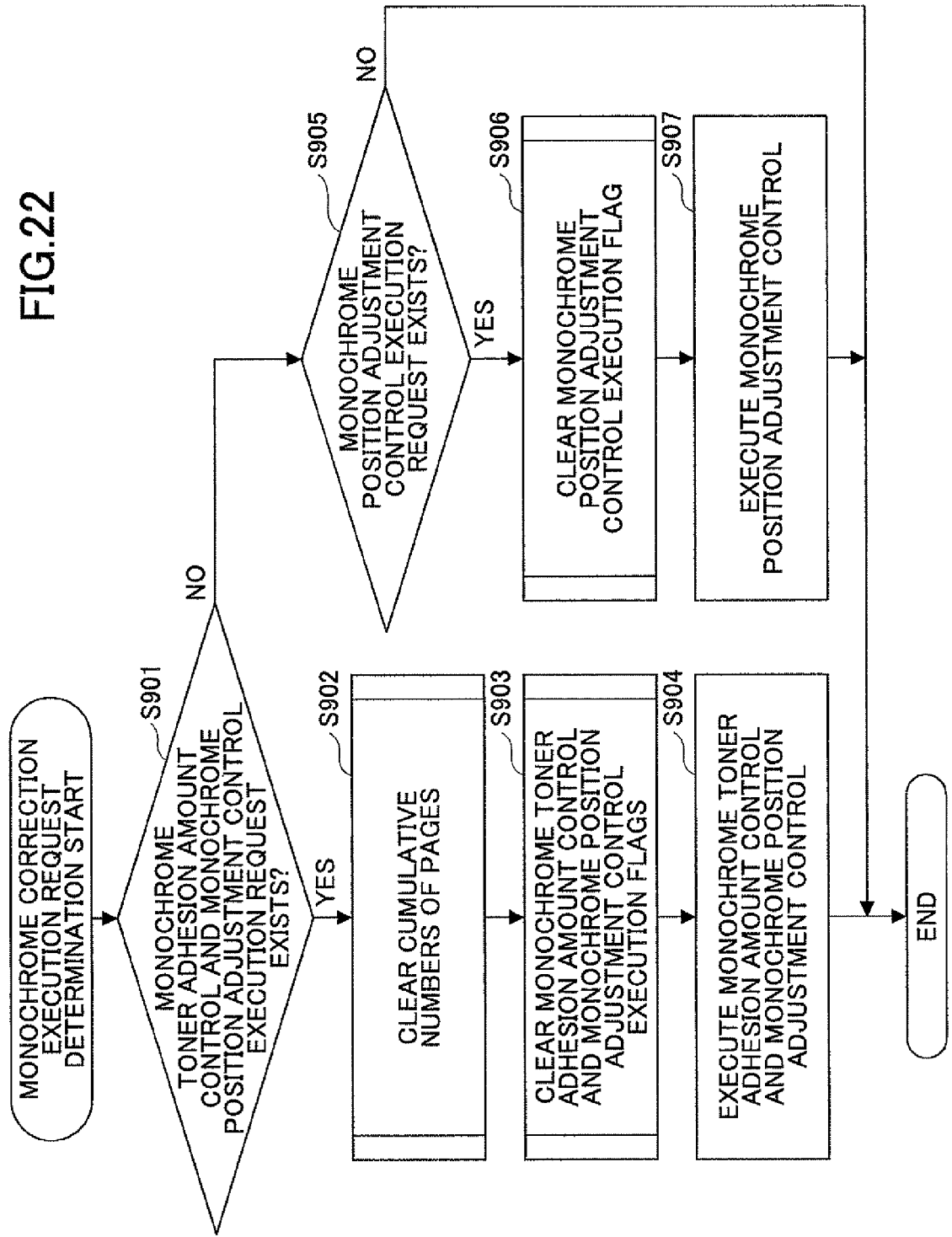
FIG. 22 is a flowchart showing one example of a process of monochrome correction execution request determination.

FIG. 22 is a flowchart showing one example of a process of monochrome correction execution request determination. A process shown in FIG. 22 is executed by the CPU 49. First, the CPU 49 determines whether a monochrome toner adhesion amount control (monochrome adhesion amount control) and monochrome position adjustment control execution request exists (step S901). For example, the CPU 49 determines whether a flag is set in a predetermined storage area. When the determination result of step S901 is Yes, the CPU 49 clears the cumulative numbers of printed pages (step S902). This clearing process is the process shown in FIG. 18.

Next, the CPU 49 clears the monochrome toner adhesion amount control and monochrome position adjustment control execution flags (step S903). This process is the process shown in FIG. 14.

After clearing the flags, the CPU 49 executes monochrome adhesion amount control and monochrome position adjustment control (step S904). The monochrome adhesion amount control and monochrome position instrument control are the controls described above.

When the determination result of step S901 is No, the CPU 49 determines whether a monochrome position adjustment control execution request exists (step S905). This determination is executed by determining whether a flag is set in a predetermined non-volatile area.

When the determination result of step S905 is Yes, the CPU 49 clears the monochrome position adjustment control execution flag (step S906). This clearing process is the process shown in FIG. 17.

After clearing the flag, the CPU 49 executes monochrome position adjustment control (step S907). The monochrome position adjustment control is the control described above.

5.4 Pre-Job Process.

Figure 23:
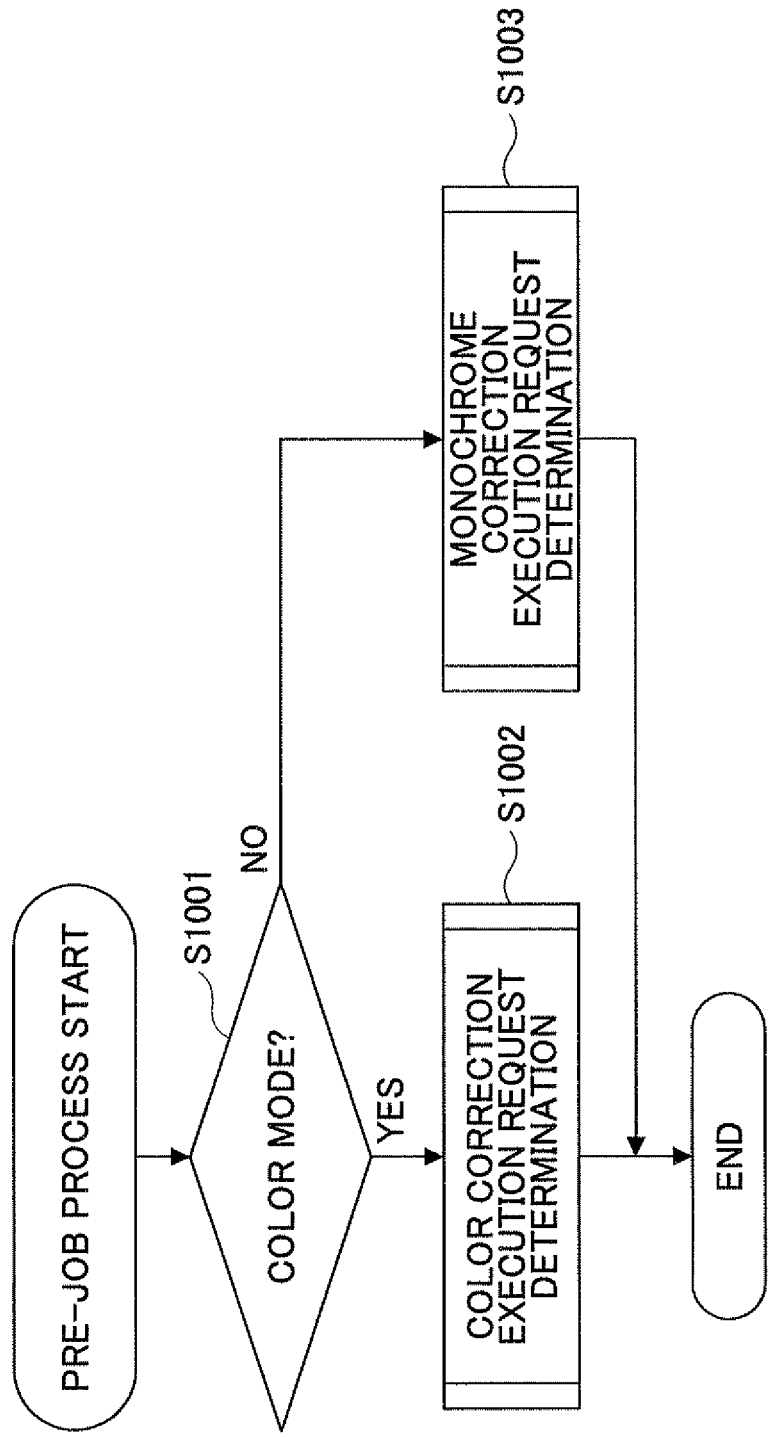
FIG. 23 is a flowchart showing one example of a control of a pre-job process.

FIG. 23 is a flowchart showing one example of a control procedure of a pre-job process. A process shown in FIG. 23 is executed by the CPU 49. First, the CPU 49 determines whether the control mode is a color mode (step S1001). This determination may be executed by reading the flag of the mode set in the process shown in FIG. 13.

When the determination result of step S1001 is Yes, the CPU 49 executes a color correction execution request determination shown in FIG. 21 (step S1002). When the determination result of step S1001 is No, the CPU 49 executes the monochrome correction execution request determination shown in FIG. 22 (step S1003).

5.5 Page End Process

Figure 24:
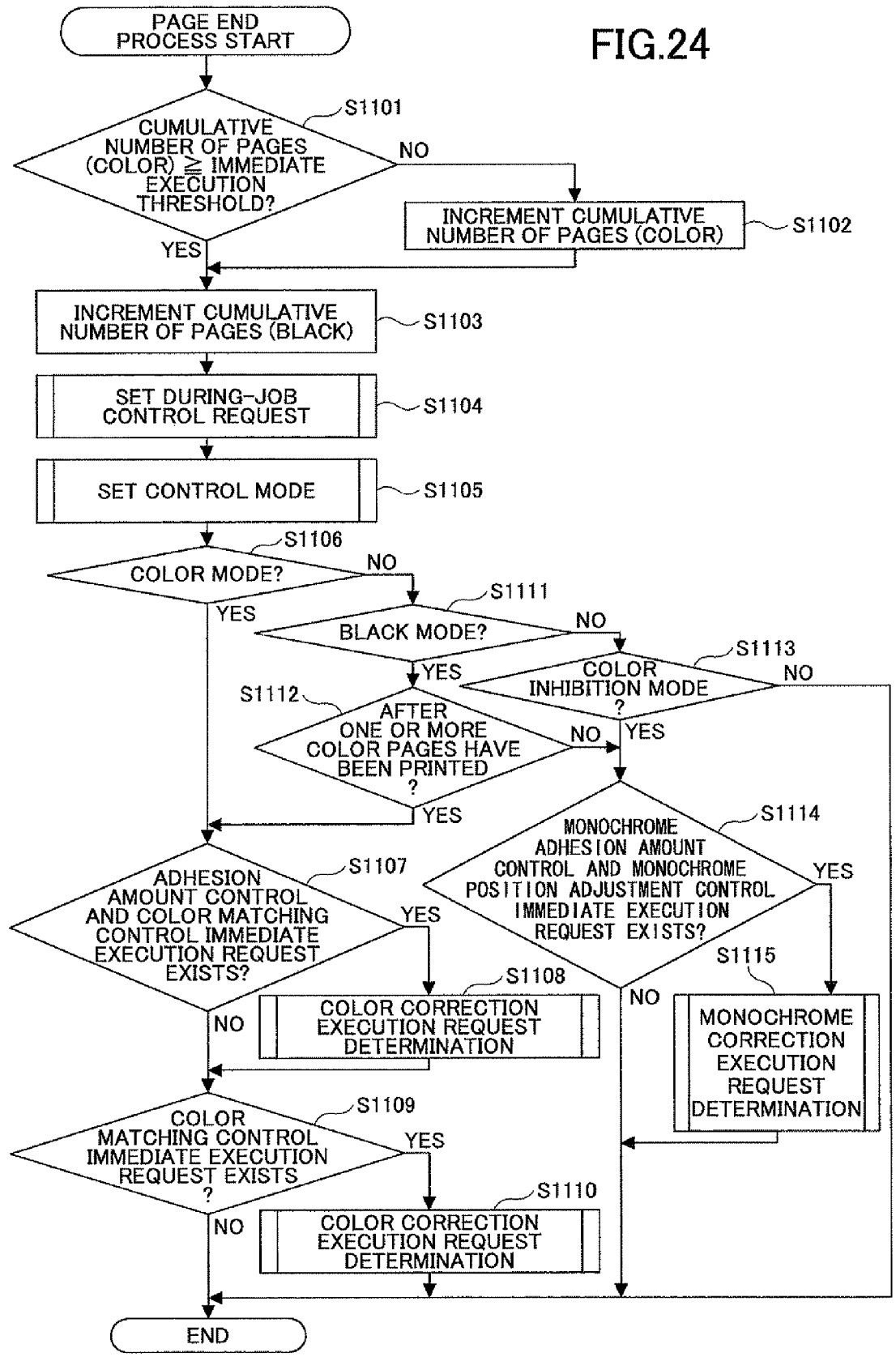
FIG. 24 is a flowchart showing one example of a control procedure of a page end process.

FIG. 24 is a flowchart showing one example of a control procedure of a page end process. A process shown in FIG. 24 is executed by the CPU 49. First, the CPU 49 determines whether the cumulative number of printed pages of color printing is equal to or more than an immediate execution threshold (step S1101). Hereinafter, the cumulative number of printed pages of color printing is referred to as the cumulative number of pages (FC), and the immediate execution threshold is, for example, 300 (pages).

When the determination result of step S1101 is No, the CPU 49 increments to the cumulative number of pages (FC) (step S1102). When the determination result of step S1101 is Yes, the CPU 43 increments the cumulative number of printed pages of monochrome printing (step S1103). Hereinafter, the cumulative number of printed pages of monochrome printing is referred to as the cumulative number of pages (Bk).

Next, the CPU 49 executes a process of a during-job control request setting (step S1104). As for the process of during-job control request setting, description will be later made with reference to FIG. 25.

Next, the CPU 49 executes a control mode setting (setting of the control mode) (step S1105). This process is the process shown in FIG. 13.

After the control mode setting, the CPU 49 determines whether the control mode that is thus set is a color mode (step S1106).

When the determination result of step S1106 is Yes, the CPU 49 determines whether a toner adhesion amount control and color matching control request exists (step S1107). This determination is executed by determining whether a flag is set in a predetermined storage area.

When the determination result of step S1107 is Yes, the CPU 49 executes color correction execution request determination (step S1108). This process is the process shown in FIG. 21.

When the determination result of step S1107 is No, the CPU 49 determines whether a color matching control immediate execution request exists (step S1109). This determination is executed by determining whether a flag is set in a predetermined storage area.

When the determination result of step S1109 is Yes, the CPU 49 executes color correction execution request determination (step S1110). This process is the process shown in FIG. 21.

When the determination result of step S1106 is No, the CPU 49 determines whether the control mode that is set is the black mode (step S1111). When the determination result of step S1111 is Yes, the CPU 49 determines whether color printing has been executed for one or more pages (step S1112). When the determination result of step S1112 is Yes, step S1107 is executed. When the determination result of step S1112 is No, step S1114, described later, is executed.

When the determination result of step S1111 is No, the CPU 49 determines whether the control mode that is set is the color inhibition mode (step S1113). When the determination result of step S1113 is Yes, the CPU 49 determines whether a monochrome toner adhesion amount control and monochrome position adjustment control immediate execution request exists (step S1114).

When the determination result of step S1114 is Yes, the CPU 49 executes monochrome correction execution request determination (step S1115). This process is the process shown in FIG. 22. When the determination result of any of the steps S1109, S1113 and S1114 is No, the process of FIG. 24 is finished.

5.6 During-Job Control Request Setting

Figure 25:
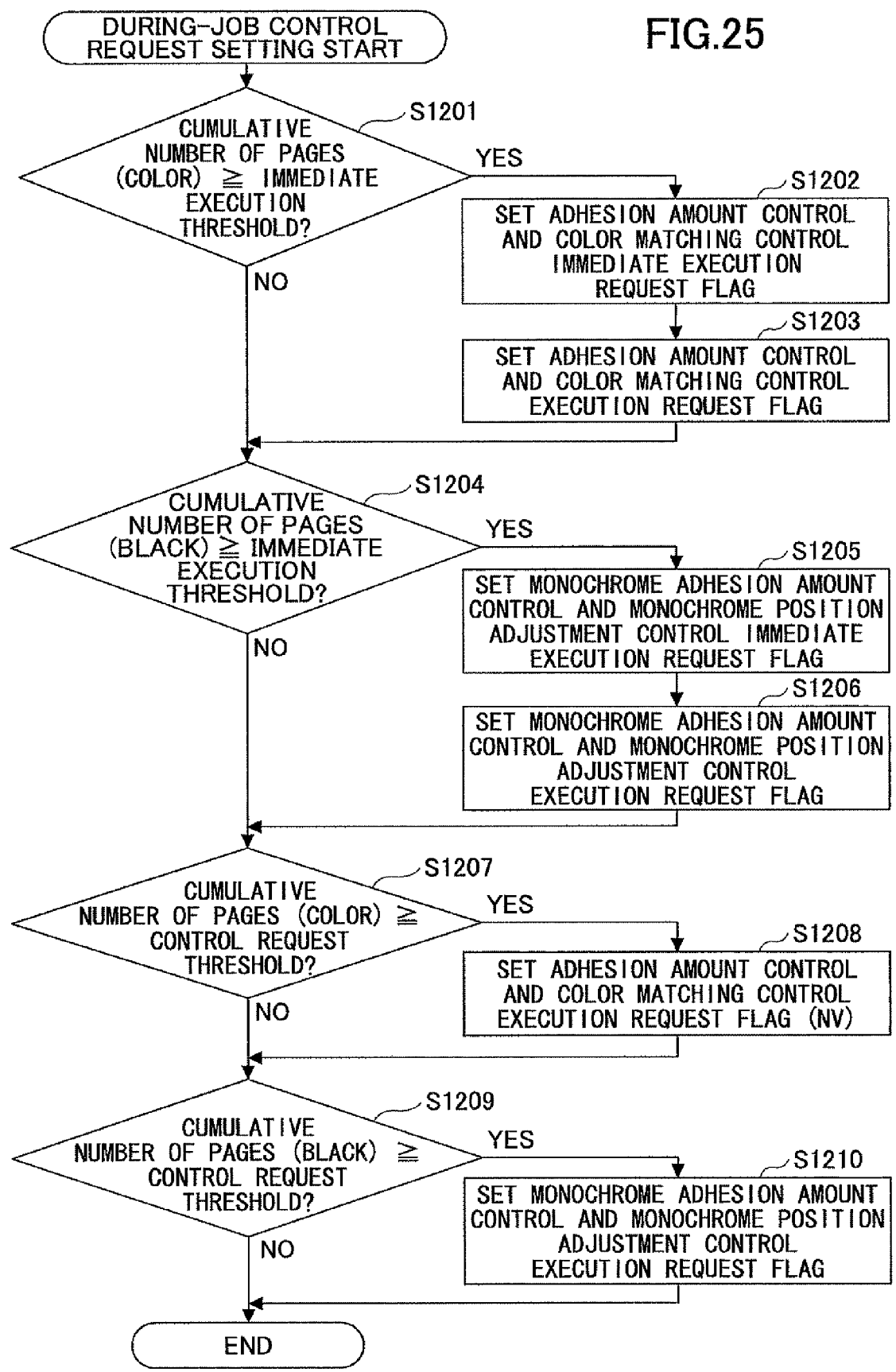
FIG. 25 is a flowchart showing one example of a control procedure of during-job control request setting.

FIG. 25 is a flowchart showing one example of a control procedure of during-job control request setting. A process shown in FIG. 25 is executed by the CPU 49. First, the CPU 49 determines whether the cumulative number of pages (FC) is equal to or more than the immediate execution threshold (step S1201). The immediate execution threshold is, for example, 300 (pages).

When the determination result of step S1201 is Yes, the CPU 49 sets the toner adhesion amount control and color matching control immediate execution request flag (step S1202). Next, the CPU 49 sets the toner adhesion amount control and color matching control execution request flag (step S1203).

When the determination result of step S1201 is No, the CPU 49 determines whether the cumulative number of pages (Bk) is equal to or more than an immediate execution threshold (step S1204). The immediate execution threshold is, for example, 300 (pages).

When the determination result of step S1204 is Yes, the CPU 49 sets the monochrome toner adhesion amount control and monochrome position adjustment control immediate execution request flag (step S1205). Next, the CPU 49 sets the monochrome toner adhesion amount control and monochrome position adjustment control execution request flag (step S1206).

When the determination result of step S1204 is No, the CPU 49 determines whether the cumulative number of pages (FC) is equal to or more than a control request threshold (step S1207). The control request threshold is, for example, 200 (pages).

When the determination result of step S1207 is Yes, the CPU 49 sets the toner adhesion amount control and color matching control execution request flag (NV) (step S1208). This flag is set in a predetermined non-volatile storage area.

When the determination result of step S1207 is No, the CPU 49 determines whether the cumulative number of pages (Bk) is equal to or more than a control request threshold (step S1209). The control request threshold is, for example, 200 (pages).

When the determination result of step S1209 is Yes, the CPU 49 sets the monochrome toner adhesion amount control and monochrome position adjustment control execution request flag (step S1210). When the process of step S1210 is finished or when the determination result of step S1209 is No, the process shown in FIG. 25 is finished.

5.7 Job End Process

Figure 26:
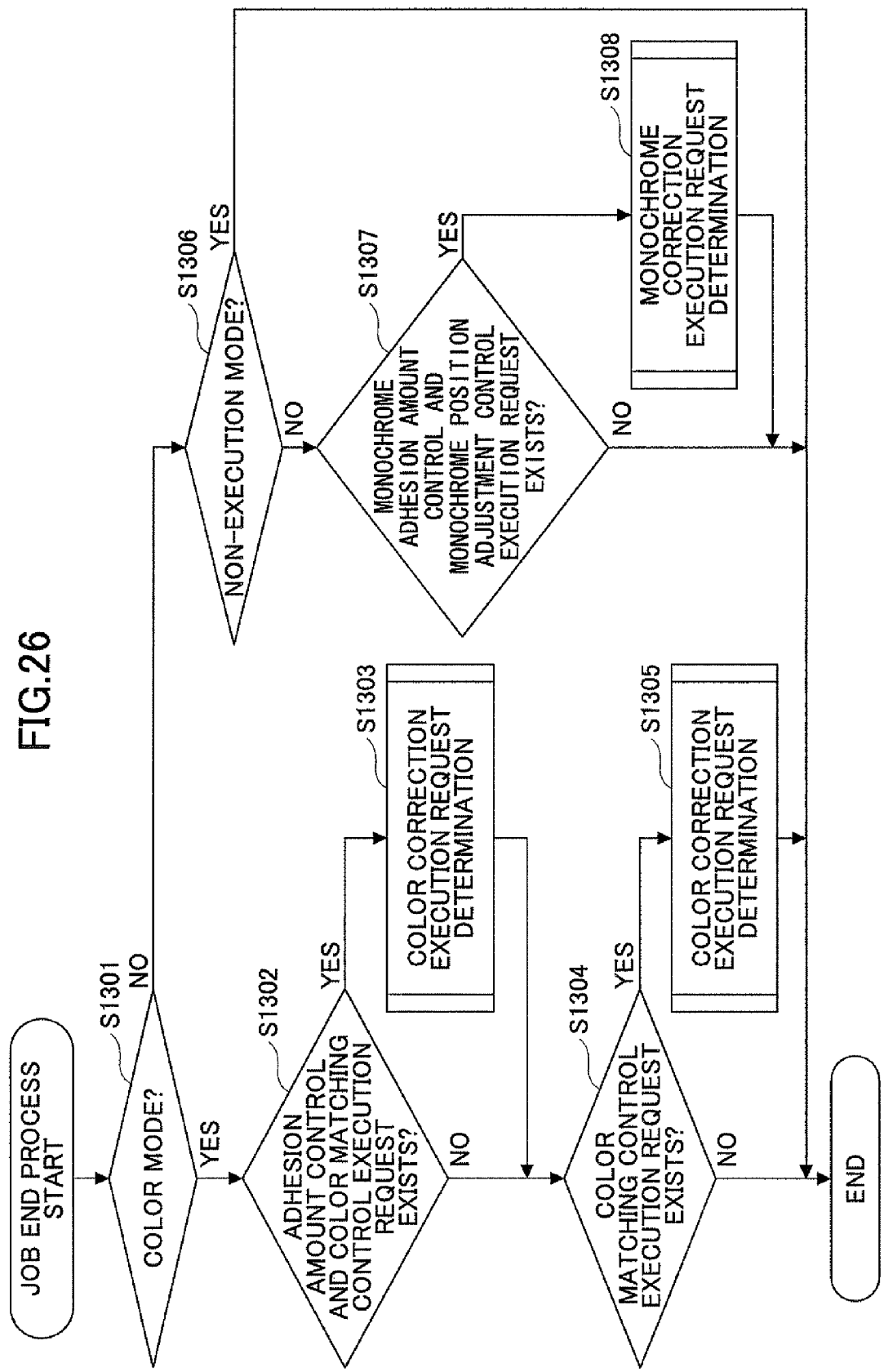
FIG. 26 is a flowchart showing one example of a control procedure of a job end process.

FIG. 26 is a flowchart showing one example of a control procedure of a job end process. A process shown in FIG. 26 is executed by the CPU 49. First, the CPU 49 determines whether the control mode is the color mode (step S1301).

When the determination result of step S1301 is Yes, the CPU 49 determines whether a toner adhesion amount control and color matching control execution request exists (step S1302).

When the determination result of step S1302 is Yes, the CPU 49 executes a color correction execution request determination (step S1303). The color correction execution request determination is the process shown in FIG. 21.

When the determination result of step S1302 is No, the CPU 49 determines whether a color matching control execution request exists (step S1304). When the determination result of step S1304 is Yes, the CPU 49 executes the color correction execution request determination (step S1305).

When the determination result of step S1301 is No, the CPU 49 determines whether the control mode is the non-execution mode (step S1306).

When the determination result of step S1306 is No, the CPU 49 determines whether a monochrome toner adhesion amount control and monochrome position adjustment control execution request exists (step S1307).

When the determination result of step S1307 is Yes, the CPU 49 executes a monochrome correction execution request determination (step S1308). This process is the process shown in FIG. 22. In any case of No of the determination result of step S1304, Yes of the determination result of step S1306 and No of the determination result of step S1307, the process of FIG. 26 is finished.

5.8 Process at Time of Power Being Turned On (at Time of Starting Up)

Figure 27:
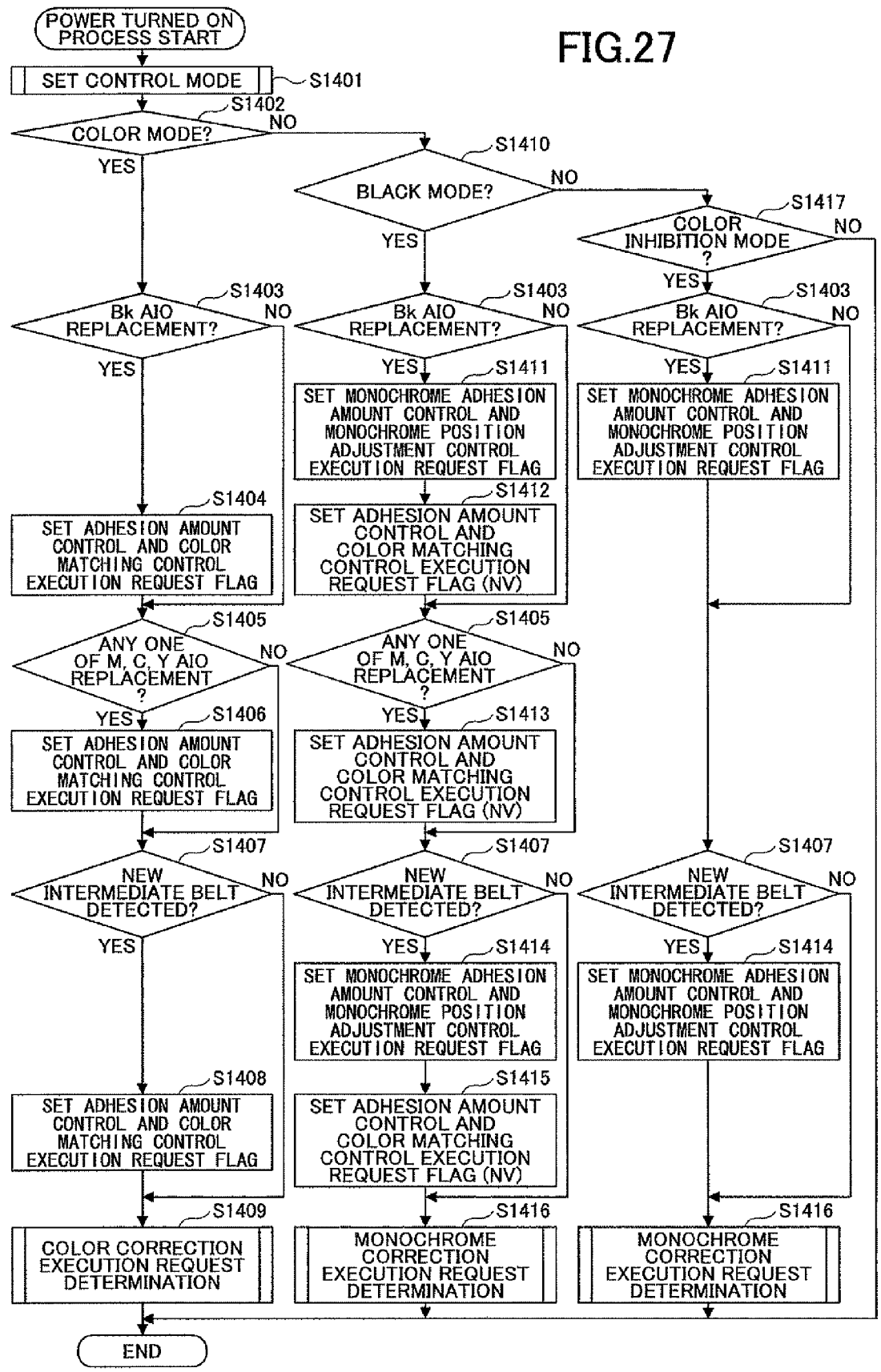

FIG. 27 is a flowchart showing one example of a control procedure of a process at a time of power being turned on. A process shown in FIG. 27 is executed by the CPU 49. First, the CPU 29 sets the control mode (step S1401), after a predetermined condition is met, such as after tens of seconds have elapsed after the rotation of the polygon mirror is stabilized, after the completion of driving of the recording head, or such, when the power is turned on and the laser printer (MFP) is started up. A process of setting the control mode is the process shown in FIG. 13.

Next, the CPU 49 determines whether the mode that is set is the color mode (step S1402).

When the determination result of step S1402 is Yes, the CPU 49 determines whether the black photosensitive unit (AIO: All In One cartridge) has been replaced (step S1403). The CPU 49 can determine, from an ID chip that the AIO has built-in, whether the AIO has been replaced.

When the determination result of step S1403 is Yes, the CPU 49 sets the toner adhesion amount control and color matching control execution request flag (step S1404). When the determination result of step S1403 is No, or when the process of step S1404 has been finished, the CPU 49 determines whether any one of M (magenta), C (cyan) and Y (yellow) AIOs has been replaced (step S1405).

When the determination result of step S1405 is Yes, the CPU 49 sets the toner adhesion amount control and color matching control execution request flag (step S1406).

When the determination result of step S1405 is No, or when the process of step S1406 has been finished, the CPU 49 determines whether the intermediate transfer belt (intermediate belt) has been replaced (step S1407).

When the determination result of step S1407 is Yes, the CPU 49 sets the toner adhesion amount control and color matching control execution request flag (step S1408). When the determination result of step S1407 is No, or when the process of step S1408 has been finished, the CPU 49 executes a color correction execution request determination (step S1409). This process is the process shown in FIG. 21.

Next, a case where the control mode is the black mode will now be described. First, when the control mode is not the color mode (No of the determination result of step S1402), the CPU 49 determines whether the control mode is the black mode (step S1410).

When the determination result of step S1410 is Yes, the CPU 49 determines whether the black AIO has been replaced (step S1403). When determining that the black AIO has been replaced (Yes in the determination result of step S1403), the CPU 49 sets the monochrome toner adhesion amount control and monochrome position adjustment control execution request flag (step S1411). Next, the CPU 49 sets the toner adhesion amount control and color matching control execution request flag (NV) (step S1412).

When the determination result of step S1403 is No or when the process of step S1412 has been finished, the CPU 49 determines whether the intermediate transfer belt has been replaced (step S1407).

When determining that the intermediate transfer belt has been replaced (Yes in the determination result of step S1407), the CPU 49 sets the monochrome toner adhesion amount control and monochrome position adjustment control execution request flag (step S1414). Next, the CPU 49 sets the toner adhesion amount control and color matching control execution request flag (NV) (step S1415).

When the intermediate transfer belt has not been replaced (No in the determination result of step S1407), or when the process of step S1415 has been finished, the CPU 49 executes monochrome correction execution request determination (step S1416). This process is the process shown in FIG. 22.

Next, a case where the control mode is the color-inhibition mode will now be described. First, when the control mode is neither the color mode nor the black mode (No in the determination result of step S1402 and No in the determination result of step S1410), the CPU 49 determines whether the control mode is the color inhibition mode (step S1417).

When the determination result of step S1417 is Yes, the CPU 49 determines whether the black AIO has been replaced (step S1403).

When the determination result of step S1403 is Yes, the CPU 49 sets the monochrome toner adhesion amount control and monochrome position adjustment control execution request flag (step S1411). When the determination result of step S1403 is No, or when the process of step S1411 has been finished, the CPU 49 determines whether the intermediate transfer belt has been replaced (step S1407).

When the determination result of step S1407 is Yes, the CPU 49 sets the monochrome toner adhesion amount control and monochrome position adjustment control execution request flag (step S1414). When the determination result of step S1407 is No, or when the process of step S1414 has been finished, the CPU 49 executes a monochrome correction execution request determination (step S1416).

Further, when the control mode is none of the color mode, the black mode and the color inhibition mode (No of the determination result of step S1402, No of the determination result of step S1410 and No of the determination result of step S1417), the CPU 49 finishes the process of FIG. 27.

5.9 At Time of Returning from Sleep Mode

A control procedure of a process at a time of returning from the sleep mode is the same as the control procedure shown in FIG. 27, and the duplicate description will be omitted. What is different from the process shown in FIG. 27 is that a trigger to start the control procedure is returning from the sleep mode.

Thus, according to the embodiment, it is possible to execute a correction for monochrome printing or correction for color printing at appropriate timing according to the contents that are set or usage situations of the laser printer (MFP). For example, it is possible to execute, not correction for color printing, but correction for monochrome printing after a printing job, in a case where, even when conditions for correction for color printing have been met during the printing job, the control mode is the black mode. That is, when the control mode is the black mode, there is a high likelihood that a next job is monochrome printing. Therefore, correction for monochrome printing is executed, and correction for color printing is executed as is necessary. The phrase "as is necessary" means at a time of before color printing, at a time of the power being turned on, or such. An execution request to execute correction for color printing is stored in a non-volatile storage area when predetermined conditions are met. Therefore, correction for color printing is executed in a pre-job process, at a time of the power being turned off, or such, and thus, is executed at appropriate timing.

Further, before the start of a printing job, appropriate correction is executed according to the control mode. Further, according to the embodiment, when correction for monochrome printing is executed, only a flag for correction for monochrome printing is cleared (see FIGS. 16 and 17). When correction for color printing is executed, both a flag for correction for color printing and a flag for correction for monochrome are cleared (see FIGS. 14 and 15). Thereby, the number of cases where correction for monochrome printing is executed immediately after execution of correction for color printing is reduced, and thus, useless correction can be reduced.

Further, according to the embodiment, at a time of the power being turned on in the laser printer (MFP), correction patterns for monochrome position adjustment control are formed, and image forming positions are corrected based on positional error amounts detected from the thus-formed correction patterns. Therefore, in any case of the black mode and the color inhibition mode where an image is formed in monochrome, it is possible to move to an operation of forming a monochrome image continuously. Further, in this case, no color image is formed, and thus, it is possible to shorten a starting up time required to start printing a job in comparison to a related art case where position adjustment control is executed both in monochrome and color, toner adhesion amount control is executed, and after that, image forming of a job is started. Further, in this case, because image forming using color toners is not executed, it is possible to reduce useless consumption of the color toners.

Thereby, in a case of forming monochrome images, because color toner patterns are not formed, it is possible, as a whole, to shorten a time required to start printing a job, and reduce useless consumption of color toners.

Further, in the embodiment, the tandem-type image forming apparatus in the indirect transfer type is described. However, the present invention may also be applied to the tandem-type image forming apparatus in the direct transfer type, in the same manner. In this case, transfer of toner images is executed in such a manner that, from photosensitive drums of respective colors to which primary transfer has been executed, toner images are then secondarily transferred in sequence to paper that is conveyed on a conveyance belt that corresponds to the intermediate transfer belt. The correction patterns 29 for position adjustment control (color matching correction patterns 29) and the adhesion amount correction patterns 30, 30L, 30R, 30L' and 30R' are formed on the conveyance belt, and correction control is executed in the same way as that in the above-described embodiment.

The program executed in the laser printer (MFP) in the embodiment may be provided in such a manner that the program in a file of an installable form or an executable form is recorded in a computer readable information recording medium such as a CD-ROM (Compact Disk Read Only Memory), a flexible disk (FD), a CD-R (Compact Disk Recordable), or a DVD (Digital Versatile Disk).

The program executed in the laser printer (MFP) has a configuration of modules including the above-mentioned respective parts, and, as actual hardware, the CPU (processor) reads the program from the above-mentioned computer readable information recording medium, and executes the program. Thereby, the above-mentioned respective parts are loaded in a main memory, and thus, the respective parts are formed in the main memory.

The present invention is not limited to the specifically disclosed embodiment, and variations and modifications may be made without departing from the scope of the present invention.

The present application is based on Japanese Priority Applications Nos. 2009-179794 and 2010-166883 filed Jul. 31, 2009 and Jul. 26, 2010, respectively, the entire contents of which are hereby incorporated herein by reference.

What is claimed is:
1. An image forming apparatus for which a first mode for executing image forming that uses toners of plural colors including a black toner and a second mode for executing image forming that uses only the black toner can be set, comprising:
- a first printing cumulatively counting part that cumulatively counts a first number of pages for which image forming has been executed by using the toners of plural colors;
- a first printing determining part that determines whether the first number of pages counted by the first printing cumulatively counting part has exceeded a threshold; and
- a correction control part that controls not to execute a correcting process for image forming that uses the toners of plural colors, and controls to execute a correcting process for image forming that uses only the black toner, when the second mode has been set in a case where the first printing determining part has determined that the first number of pages has exceeded the threshold.

2. The image forming apparatus as claimed in claim 1, further comprising:
- a requesting part that generates an execution request to execute the correcting process for image forming that uses the toners of plural colors, in a case where the first printing determining part has determined that the first number of pages has exceeded the threshold;
- a second printing cumulatively counting part that cumulatively counts a second number of pages for which image forming has been executed by using only the black toner;
- a second printing determining part that determines whether the second number of pages cumulatively counted by the second printing cumulatively counting part has exceeded a threshold; and
- a mode determining part that determines whether the first mode or the second mode has been set, before a start of a job, wherein:
- the requesting part generates an execution request to execute the correcting process for image forming that uses only the black toner, in a case where the second printing determining part has determined that the second number of pages has exceeded the threshold, and
- the correction control part determines whether to execute a determination as to whether the execution request to execute the correcting process for image forming that uses the toners of plural colors exists or a determination as to whether the execution request to execute the correcting process for image forming that uses only the black toner exists, according to a determination result of the mode determining part, and controls to execute the correcting process according to a determination result of the correction control part.

3. The image forming apparatus as claimed in claim 2, wherein:
the correction control part determines whether to execute a determination as to whether the execution request to execute the correcting process for image forming that uses only the black toner exists or a determination as to whether the execution request to execute the correcting process for image forming that uses the toners of plural colors exists, according to the setting of the first mode or the second mode, and controls to execute the correcting process according to a determination result of the correction control part, after the job has been finished.

4. The image forming apparatus as claimed in claim 2, wherein:
the correction control part determines whether to execute a determination as to whether the execution request to execute the correcting process for image forming that uses only the black toner exists or a determination as to whether the execution request to execute the correcting process for image forming that uses the toners of plural colors exists, according to the setting of the first mode or the second mode, and controls to execute the correcting process according to a determination result of the correction control part, every time when one page of image forming has been finished.

5. The image forming apparatus as claimed in claim 4, wherein:
the correction control part determines whether the execution request to execute the correcting process for image forming that uses the toners of plural colors exists, in a case where a printing job is a printing job using the toners of plural colors, even in a case where the second mode has been set.

6. The image forming apparatus as claimed in claim 5, wherein:
the correction control part determines whether the execution request to execute the correcting process for image forming that uses only the black toner exists, in a case where the second mode has been set or an inhibition mode to inhibit image forming that uses the toner of plural colors has been set.

7. The image forming apparatus as claimed in claim 2, wherein:
the correction control part cancels the execution request to execute the correcting process for image forming that uses the toners of plural colors and the execution request to execute the correcting process for image forming that uses only the black toner in a case where the correcting process for image forming that uses the toners of plural colors has been executed, and cancels only the execution request to execute the correcting process for image forming that uses only the black toner in a case where the correcting process for image forming that uses only the black toner has been executed.

8. A correction control method, in an image forming apparatus for which a first mode for executing image forming that uses toners of plural colors including a black toner and a second mode for executing image forming that uses only the black toner can be set, the correction control method comprising:
- a first printing cumulatively counting step of cumulatively counting a first number of pages for which image forming has been executed by using the toners of plural colors;
- a first printing determining step of determining whether the first number of pages counted in the first printing cumulatively counting step has exceeded a threshold; and
- a controlling step of controlling not to execute a correcting process for image forming that uses the toners of plural colors , and controlling to execute a correcting process for image forming that uses only the black toner, when the second mode has been set in a case where it has been determined in the first printing determining step that the first number of pages has exceeded the threshold.

9. A non-transitory computer readable information recording medium embodying a correction control program which, when executed by a computer processor, performs a correction control method in an image forming apparatus for which a first mode for executing image forming that uses toners of plural colors including a black toner and a second mode for executing image forming that uses only the black toner can be set, the correction control method comprising:

a first printing cumulatively counting step of cumulatively counting a first number of pages for which image forming has been executed by using the toners of plural colors;

a first printing determining step of determining whether the first number of pages counted in the first printing cumulatively counting step has exceeded a threshold; and a controlling step of controlling not to execute a correcting process for image forming that uses the toner of plural colors, and controlling to execute a correcting process for image forming that uses only the black toner, when the second mode has been set in a case where it has been determined in the first printing determining step that the first number of pages has exceeded the threshold.

* * * * *